(12) United States Patent
Bianchi et al.

(10) Patent No.: US 11,636,160 B2
(45) Date of Patent: Apr. 25, 2023

(54) RELATED CONTENT IDENTIFICATION FOR DIFFERENT TYPES OF MACHINE-GENERATED DATA

(71) Applicant: Splunk Inc., San Francisco, CA (US)

(72) Inventors: Amy Katherine Hunnel Bianchi, Portland, OR (US); Sonya Chang, San Mateo, CA (US); Park Kittipatkul, Foster City, CA (US); Patrick Lin, Palo Alto, CA (US); Sarah Matarese, San Jose, CA (US); Clark Mullen, San Mateo, CA (US); Alexandra Victoria Nuttbrown, Los Altos, CA (US); Danika Patrick, San Francisco, CA (US); Justin Smith, San Francisco, CA (US); Harsh Vardhan Vashistha, San Jose, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 17/647,324

(22) Filed: Jan. 6, 2022

(65) Prior Publication Data
US 2022/0277042 A1    Sep. 1, 2022

Related U.S. Application Data

(63) Continuation of application No. 17/073,024, filed on Oct. 16, 2020, now Pat. No. 11,250,069.

(51) Int. Cl.
*G06F 16/00* (2019.01)
*G06F 16/904* (2019.01)
*G06F 11/32* (2006.01)
*G06F 16/9038* (2019.01)
*G06F 16/9035* (2019.01)

(52) U.S. Cl.
CPC .......... *G06F 16/904* (2019.01); *G06F 11/323* (2013.01); *G06F 16/9035* (2019.01); *G06F 16/9038* (2019.01)

(58) Field of Classification Search
CPC ................................................... G06F 16/904
See application file for complete search history.

(56) References Cited

U.S. PATENT DOCUMENTS

2008/0140481 A1 * 6/2008 Gold .................. G06Q 30/0242
                                                                   705/7.29

* cited by examiner

*Primary Examiner* — Ajith Jacob
(74) *Attorney, Agent, or Firm* — Knobbe, Martens, Olson & Bear, LLP

(57) ABSTRACT

A system can display content generated from one type of machine-generated data to a user via a graphical user interface. Based on an interaction with the machine-generated data, the system can determine an entity identifier associated with the machine-generated data and determine an entity type for the entity identifier. The system can map the entity type to one or more content generators associated with the entity type and communicate the entity identifier to the identified content generators. The content generators can determine if they have content associated with the machine-generated data. The system can generate and display a link to the related content via a graphical user interface.

20 Claims, 27 Drawing Sheets

| from service name | to service name | from span.kind | to span.kind | from region | to region | Request count |
|---|---|---|---|---|---|---|
| Service A | Service B | client | server | us-west | us-east | 2 |
| Service A | Service B | client | server | us-west | us-west | 1 |

1590 — (row 1)
1592 — (row 2)

FIG. 15

Edge_Health:

| from service name | to service name | from pod | to pod | from operation | to operation | request | error | Latency Bucket N | ts |
|---|---|---|---|---|---|---|---|---|---|
| frontend | product-catalog service | frontend-dalluytgq-dd58f | productcatalog service-18iodsfh27-r234t | /product | /GetProduct | 1 | 0 | 1 | 1576695520 |

Node_Health:

| svc_name | env | pod | code | operation | request | error | Root cause | Latency Bucket N | ts |
|---|---|---|---|---|---|---|---|---|---|
| frontend | prod | frontend-dalluytgq-dd58f | 200 | /product | 1 | 0 | 0 | 1 | 1576695520 |
| product catalog service | prod | productcatalongservice-18iodsfh27-r234t | 200 | /GetProduct | 1 | 1 | 0 | 1 | 1576695520 |

FIG. 16B

Node_Health Exemplars: 1630

| svc_name | env | pod | code | operation | trace_ids | Exemplar type |
|---|---|---|---|---|---|---|
| frontend | prod | frontend-d aliuytgq-d d58f | 200 | /product | "ff0558ae875 a250e" | request |
| product catalog service | prod | productcat alongservi ce-18iodsf h27-r234t | 200 | /GetProduct | "ff0558ae875 a250e" | request |

Edge_Health Exemplars: 1631

| from service name | to service name | from pod | to pod | from operation | to operation | trace_ids | Exemplar type |
|---|---|---|---|---|---|---|---|
| frontend | product catalog service | front end-d aliuy tgq -dd58f | product catalog service-18iodsfh 27-r234t | /Product | /GetProduct | "ff0558ae875 a250e" | request |

RELATED CONTENT IDENTIFICATION FOR DIFFERENT TYPES OF MACHINE-GENERATED DATA

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems preprocess data based on anticipated data analysis needs. In particular, specified data items may be extracted from the generated data and stored in a data system to facilitate efficient retrieval and analysis of those data items at a later time. At least some of the remainder of the generated data is typically discarded during preprocessing.

Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

The present disclosure is illustrated by way of example, and not limitation, in the figures of the accompanying drawings, in which like reference numerals indicate similar elements.

FIG. 15 is a table illustrating an exemplary manner in which selected tags for each service in a cross-service span pair may be mapped to tag attributes and stored as part of a memory-resident data object associated with an edge in the service graph, in accordance with embodiments of the present invention.

FIG. 16B illustrates the manner in which data in the metric events modality is persisted using an edge data object comprising a memory-resident table of tag attributes with associated counts and using a node data object comprising a memory-resident table of tags with associated counts, in accordance with an embodiment of the present invention.

FIG. 16C illustrates the manner in which data in the metric events modality is persisted using an edge data object comprising a memory-resident table of extracted indexed tag attributes with associated Trace IDs and using a node data object comprising a memory-resident table of extracted tags with associated Trace IDs, in accordance with an embodiment of the present invention.

FIGS. 18A and 18B illustrate examples of a GUI displaying a stream of log, trace, and/or metrics data.

DETAILED DESCRIPTION

Figure 1A:
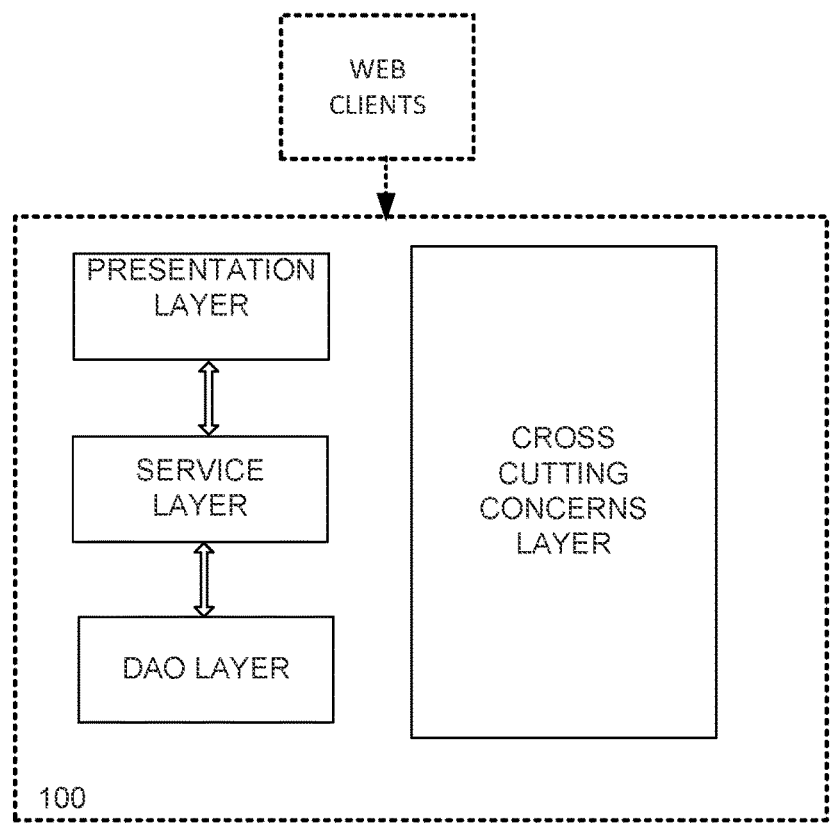
FIG. 1A illustrates an exemplary monolithic multi-layer architecture.

Embodiments are described herein according to the following outline:
1.0. Terms
2.0. General Overview
3.0. Data Collection
3.1. Logs, Traces, and Metrics
3.2. Component Implementation
4.0. Multiple Modalities for Storing and Analyzing Data
4.1. Metric Time Series
4.1.1. Generating Metric Data Streams Using Span Identifiers
4.1.2. Real-Time Monitoring Using metric Time Series Data
4.2. Metric Events
4.2.1. Metric Events Data Generation and Persistence
4.3. High-Fidelity Data
5.0. Real-Time Data Stream
5.1. Real-Time Data Stream Interface
5.1. Real-Time Data Stream Flow
6.0. Related Content
6.1. Related Content User Interfaces
6.2. Related Content flow
7.0. Terminology
1.0. Terms The term "trace" as used herein generally refers to a record of the manner in which a single user request, also referred to as a transaction, propagates from one microservice (hereinafter interchangeably referred to as "service") to the next in a distributed application. A transaction is generally described as an end-to-end request-response flow, from the making of the user's initial request to receiving the final response. A transaction often involves the interaction of multiple services. A trace is a record of a transaction and each trace may be identified using a unique trace identifier ("Trace ID"). The trace follows the course of a request or transaction from its source to its ultimate destination in a distributed system. In one embodiment, a trace may be conceptualized as a highly dimensional structured log that captures the full graph of user-generated and background request execution within an application, and includes valuable information about interactions as well as causality.

The term "span" as used herein generally refers to the primary building block of a trace, representing an individual unit of work done in a distributed system. A trace is composed of one or more spans where a span represents a call within the request. It is appreciated that a call may be to a separate microservice or a function within a microservice. The trace represents the work done by each microservice which is captured as a collection of linked spans sharing the same unique Trace ID. Each component of the distributed system may contribute a span—a named, timed operation representing a piece of the workflow. A span may also include a unique span ID, a service name (e.g., "analytics"), an operation name (e.g., "start"), duration (latency), start and end timestamps and additional annotations and attributes (e.g., tags such as key:value pairs). The annotations and attributes can describe and contextualize the work being done under a span. For example, each span may be annotated with one or more tags that provide context about the execution, such as the user instrumenting the software, a document involved in the request, an infrastructure element used in servicing a request, etc.

The term "tags" as used herein generally refers to key: value pairs that provide further context regarding the execution environment and enable user-defined annotation of spans in order to query, filter and comprehend trace data. Tag information is typically included with each span and there may be different levels of tag information included in a span. Tag information (including the 'key' and corresponding 'value') is typically included with each span and there may be different levels of tag information included in a span.

"Global tags" generally represent properties of a user-request (e.g., tenant name, tenant level, client location, environment type, etc.) and may be extracted from any span of the trace based on configured rules. A global tag for a particular span in a trace may be attributed to the other spans in a trace, because each span within a single trace may comprise the same global attributes. For example, if one span within a trace comprises a tag relating it to a request from a "gold" level "tenant," it may be inferred that other spans in the same trace are associated with the same request and, accordingly, from the same "gold" level "tenant." Consequently, the "tenant:gold" key-value pair or tag may be attributed to the other spans in the same trace.

"Service-level tags" generally represent a non-global property of the service or the infrastructure that the associated span (which served a portion of the request) executed on, e.g., service version, host name, region, etc. Spans that executed on different services may have different values for the same tag, e.g., tag "region" may take different values in two services: a span in Service A may be attributed to "region:east" and a span in Service B attributed to "region: west". Also, multiple instances of the same service can serve different parts of the request and so the same service may be associated with different service-level tags in relation to those different parts.

"Span-level tags" comprise attributes that are specific to a particular span.

The term "root span" as used herein generally refers to the first span in a trace. A span without a parent is called a root span.

The term "child span" as used herein generally refers to a span that follows a root span, including a child of a child.

The term "parent span" as used herein generally refers to a span that executes a call (to a different service or a function within the same service) that generates another span, wherein the span executing the call is the "parent span" and the span generated in response to the call is the "child span." Each span may typically comprise information identifying its parent span, which along with the Trace ID, may be used to consolidate spans associated with the same user-request into a trace.

A "metric" as used herein generally refers to a single quantifiable measurement at a specific point in time. Combining the measurement with a timestamp and one or more dimensions results in a metric data point. A single metric data point may include multiple measurements and multiple dimensions. Metrics are used to track and assess the status of one or more processes. A metric typically comprises a numeric value that is stored as a timeseries. A timeseries is a series of numeric data points of some particular metric over time. Each time series comprises a metric plus one or more tags associated with the metric. A metric is any particular piece of data that a client wishes to track over time.

"Machine data" as used herein generally refers to data produced by a machine or component in an information technology (IT) environment and that reflects activity in the IT environment. For example, machine data can be raw machine data that is generated by various components in IT environments, such as servers, containers, pods, services, sensors, routers, mobile devices, Internet of Things (IoT) devices, etc. Machine data can include system logs, network packet data, sensor data, application program data, error logs, stack traces, system performance data, traces, spans, metrics, unstructured raw machine data, etc. In general, machine data can also include performance data, diagnostic information, and many other types of data that can be analyzed to diagnose performance problems, monitor user interactions, and to derive other insights.

2.0. General Overview

One of the fundamental shifts in modern day computing has been the shift from monolithic applications to microservices-based architectures. As previously mentioned, this is the shift from an application being hosted together (e.g., on a single system) to each piece of an application being hosted separately (e.g., distributed). FIG. 1A illustrates an exemplary monolithic multi-layer architecture. A monolithic application is traditionally built as a single unit. The monolithic application consists of a single self-contained unit in which code exists in a single codebase 100 and in which modules are interconnected. At deployment time, the entire codebase is deployed and scaling is achieved by adding additional nodes.

Figure 1B:
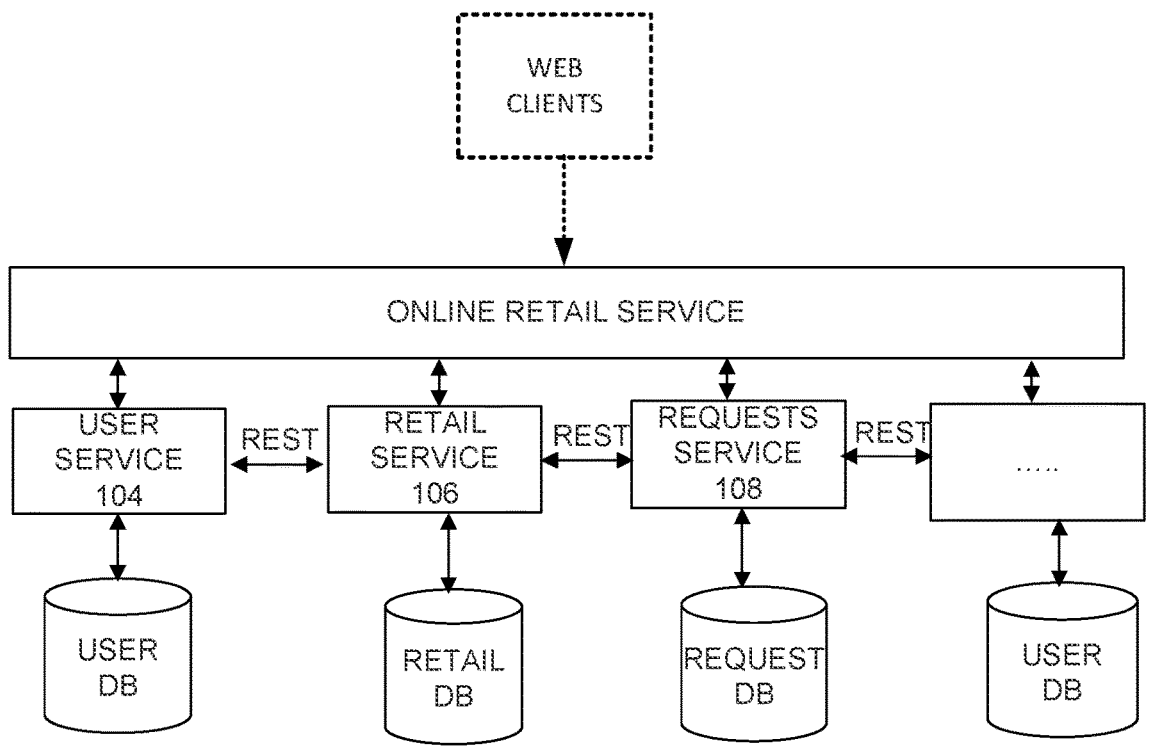
FIG. 1B illustrates an exemplary microservices architecture.

FIG. 1B illustrates an exemplary microservices architecture. A microservices architecture involves the building of modules (e.g., modules 104, 106 and 108) that address a specific task or business objective. As a result, these modules tend to exhibit low coupling and high cohesion. A microservices architecture is often achieved by decoupling a monolithic application into independent modules that each include the components necessary to execute a single business function. These services typically communicate with each other using language agnostic Application Programming Interfaces ("APIs") such as Representational State Transfer (REST).

Microservices were created in order to overcome the issues and constraints of monolithic applications. Monolithic applications have a tendency to grow in size over time. As applications become larger and larger, the tight coupling between components results in slower and more challenging deployments. Because of the tight coupling, the potential for a failure of the entire application due to a recently deployed feature is high. In some cases, deployments may take several months to a year, greatly reducing the number of features that may be rolled out to users. This tight coupling also makes it difficult to reuse and replace components because of the effect they may have on other components throughout the application.

Microservices address these issues by being small in scope and modular in design. Modular design results in components being loosely coupled, which offers enormous benefits from the standpoint of being both fault tolerant and independently deployable. This results in functionality that may be frequently deployed and continuously delivered. The attribute of loosely coupled modules without a central orchestrator in a microservices architecture, however, leads to considerable challenges in terms of monitoring, troubleshooting and tracking errors.

These challenges have led to the rise of observability, a new generation of monitoring, the foundation for which is built, in part, on distributed tracing. Distributed tracing, also called distributed request tracing, is an application performance monitoring (APM) method used to profile and monitor applications, especially those built using a microservices architecture. Distributed tracing helps pinpoint where failures occur and what causes poor performance. Distributed tracing, as the name implies, involves tracing user requests through applications that are distributed. A trace represents a single user request, also referred to as a transaction, and represents the entire lifecycle of a request as it traverses across the various services or components of a distributed system.

APM-based methods such as distributed tracing monitor the speed at which transactions are performed both by end-users and by the systems and network infrastructure that support a software application, providing an end-to-end overview of potential bottlenecks and service interruptions. This typically involves the use of a suite of software tools—or a single integrated SaaS or on-premises tool—to view and diagnose an application's speed, reliability, and other performance metrics in order to maintain an optimal level of service.

Figure 2A:
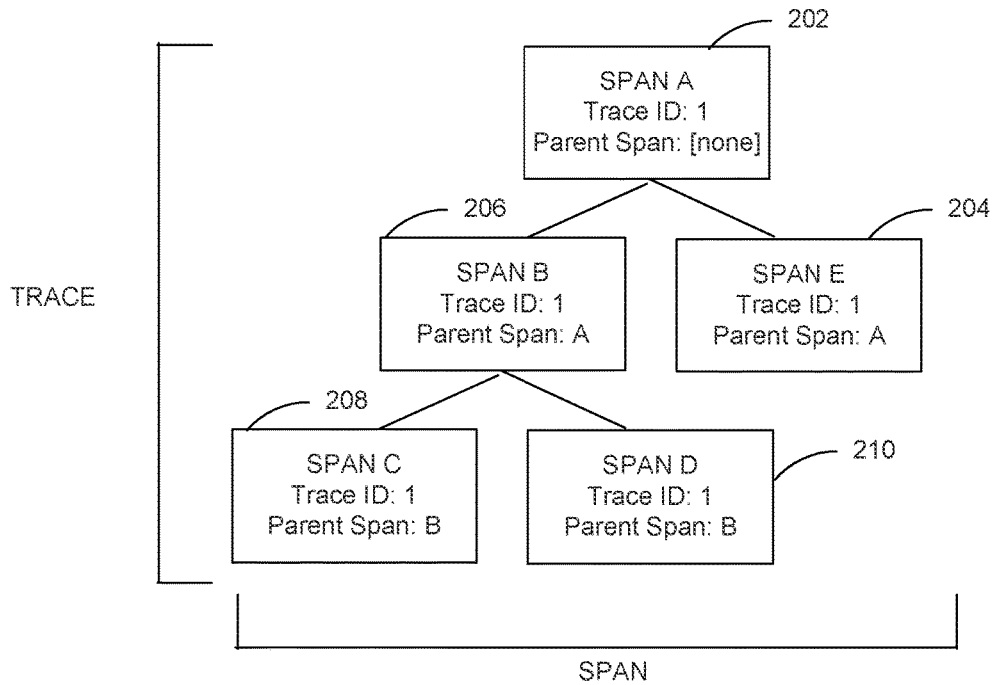
FIG. 2A illustrates an exemplary trace tree.

FIG. 2A illustrates an exemplary trace tree. The first span in the trace tree, Span A 202, is known as the root span. A trace tree typically comprises a root span, which is a span that does not have a parent. It may be followed by one or more child spans. Child spans may also be nested as deep as the call stack goes. Span B 206 and Span E 204 are child spans of the parent span, Span A. Further, Span C 208 and Span D 210 are child spans of the parent Span B 208.

Figure 2B:
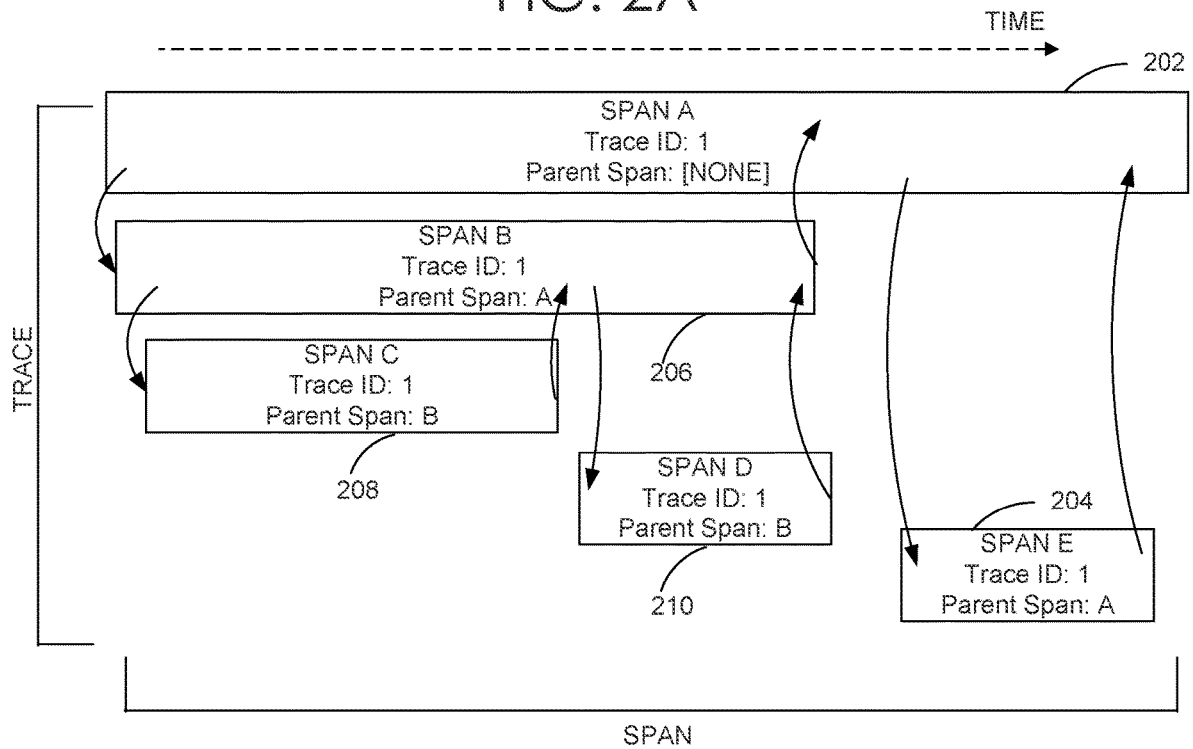
FIG. 2B illustrates an alternate view of the trace from FIG. 2A adjusted for timeline.

FIG. 2B illustrates an alternate view of the trace from FIG. 2A adjusted for timeline. The trace starts with the Span A 202, the root span, where the request starts. When the trace starts, a Trace ID is generated (e.g., Trace ID: 1 as shown in FIG. 2B), which follows the request as it propagates through the distributed system. A new span is generated for each logical chunk of work in the request, where the new span includes the same Trace ID, a new Span ID and a Parent Span ID, which points to the span ID of the new span's logical parent. The Parent Span ID creates a parent-child relationship between spans.

A given request typically comprises one span (e.g., the root Span A 202) for the overall request and a child span for each outbound call made to another service, database, or a function within the same microservice etc. as part of that request. For example, in the example of FIG. 2B, the Span A 202 is the root span for the overall request and generates several child spans to service the request. The Span A 202 makes a call to the Span B 206, which in turn makes a call to the Span C 208, which is a child span of the Span B 206. The Span B 206 also makes a call to the Span D 210, which is also a child span of the Span B 206. The Span A 202 subsequently calls the Span E 204, which is a child span of the Span A 202. Note, that the spans in a given trace comprise the same Trace ID. The Trace ID along with the Parent Span ID may be used to consolidate the spans together into a trace.

3.0. Data Collection

Distributed tracing data is generated through the instrumentation of microservices-based applications, libraries and frameworks. Software may be instrumented to emit spans and traces. The spans and traces may be generated according to an industry standard, such as the OpenTracing standard. Other common open source instrumentation specifications include OPENTELEMETRY and OpenCensus. Each span may be annotated with one or more tags that provide context about the execution, such as the user instrumenting the software, a document involved in the request, an infrastructure element used in servicing a request, etc.

The instrumentation handles the creating of unique trace and span IDs, tracking duration, adding metadata and handling context data. Handling context data, also known as context propagation is critical and is responsible for passing context such as the trace ID between function/microservice calls, thereby, enabling an observer to view the entire transaction at each step along the way. Context propagation may, for example, be based on REST. REST is header-based and requires a transaction to pass headers between service-to-service calls. In order to work properly, services within a request use the same context propagation format. Once the code has been instrumented and context propagation has been implemented using a standard format, the trace data generated by the services may be collected and analyzed to monitor and troubleshoot the microservices-based applications generating the trace data.

Figure 3:
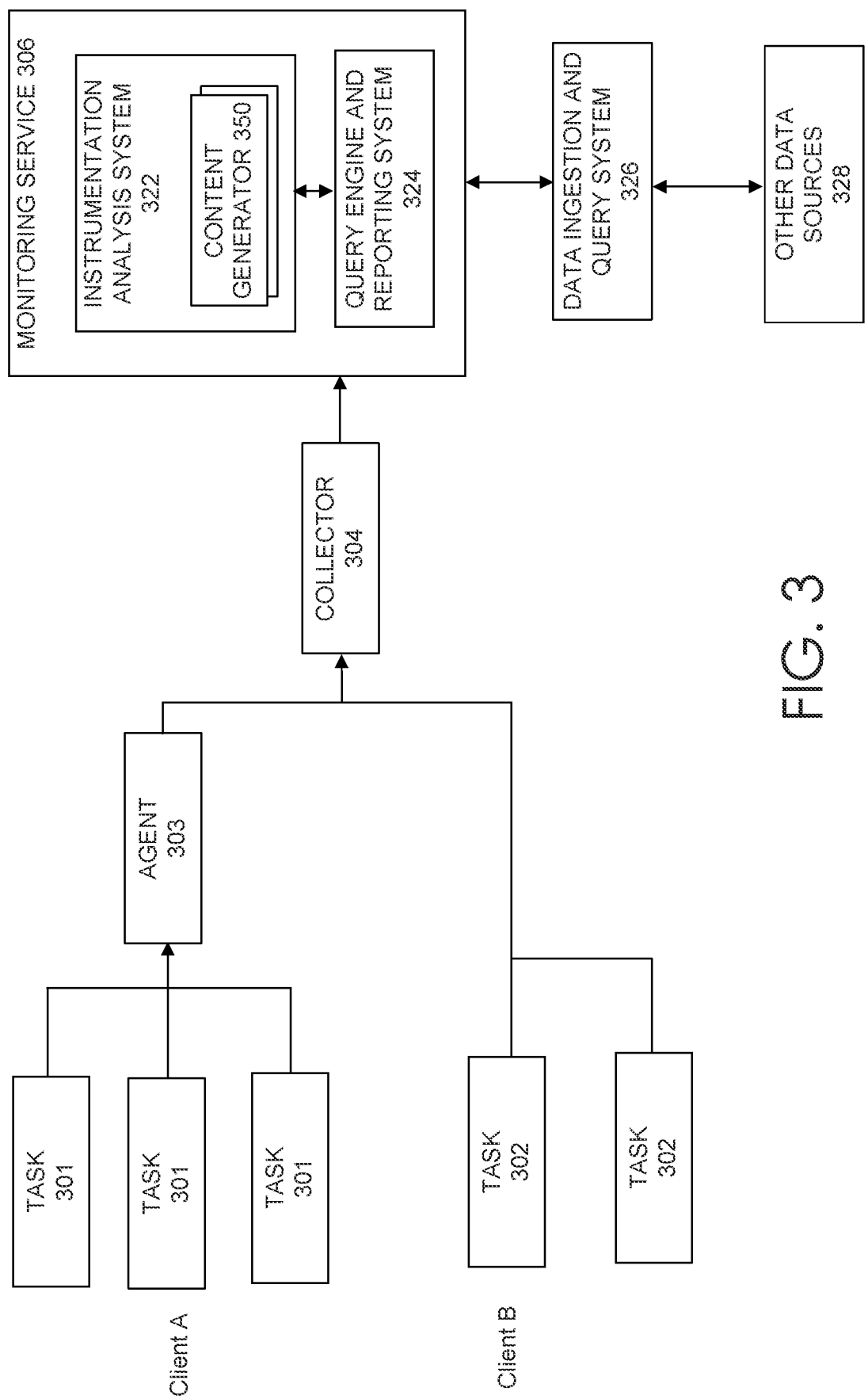
FIG. 3 is a data flow diagram that illustrates the manner in which trace data may be collected and ingested for further analysis within a computer system, in accordance with embodiments of the present invention.

FIG. 3 is a data flow diagram that illustrates the manner in which trace data may be collected and ingested for further analysis within a computer system, in accordance with an embodiment of the invention. Tasks 301 represent client applications that execute within a client data center for Client A. Similarly, tasks 302 represents client applications that execute within a client data center for Client B. The tasks 301 or 302 may comprise services or applications within a client's on-premises ("on-prem") software. Alternatively, they may comprise services or applications running in the cloud computing environment, e.g., in an AMAZON WEB SERVICES (AWS) Virtual Private Cloud (VPC).

The tasks 301 and 302 may be instrumented using open source or common commercial tracing libraries, from tracing applications (e.g., Jaeger or Zipkin), in-house formats, or auto-instrumentation. Each task may be configured to generate spans that describe the processing of a portion of a request as the request traverses through the various tasks (or services) on the client-side.

It should be noted that while the tasks 301 and 302 may comprise instrumented application software, the techniques disclosed herein are not limited to application software but are applicable to other kinds of software, for example, server software, software executing on customer devices, websites and so on. Furthermore, a client device (e.g., a device at a data center for Client A or Client B) may include any computing system that is configured to execute instrumented software, whether or not it is used for development of improved software. For example, the client device may be a computing system used for testing purposes, staging purposes, or any production system executing in an enterprise.

An agent 303 is typically configured at the client-side host or service for receiving spans collected from the various tasks on the client-side and transmitting the spans to a collector 304. For example, an agent 303 may be installed on a computing device or an isolated execution environment that is to be monitored or from which data is to be obtained/extracted. An agent 303 may receive generated spans locally using, for example, User Datagram Protocol (UDP). In certain cases, the agent 303 may be implemented one a separate device computing device or isolated execution environment from the client and may receive the spans via a network, etc. The tasks 302 may comprise instrumented tasks that are not using an agent and may be configured to span directly to the collector 304. While spans may be collected from the client-side tasks without configuring an agent (e.g., in the case of Client B), using an agent may provide benefits including batching, buffering and updating trace libraries.

Batches of span data collected by the agent 303 are periodically received at the collector 304. The collector may be implemented within a client's on-prem software or in the cloud computing environment (e.g., in an AWS VPC). Traces often generate duplicative data that is not relevant for monitoring or troubleshooting. The collector 304 may avoid redundancies by sampling the data before processing and storing it. The collector 304 runs the span data through a processing pipeline and may store it in a specified storage or analytics backend such a monitoring service 306. It should be noted that the collector 304 may interact with the monitoring service 306 through a network (not shown).

In an embodiment, the collector 304 may consolidate data from several client devices and combine the data to send to the monitoring service 306. For example, the collector 304 may comprise a server that receives data streams internally from different client devices and, periodically, sends the combined data in batch form to the monitoring service 306. This allows efficiency of external communication from the enterprise.

Although only one agent 303 is illustrated in FIG. 3, it will be understood that the environment can include multiple agents. In some cases, a particular client or computing device can include multiple agents 303 to obtain different types of data from the client-side host. In certain cases, additional agents 303 can be included to collect metrics data and/or log data. For example, a metric agent 303 can collect metric data from a client-side host and a log agent 303 can collect log data from the client-side host. The log data collected by the log agent 303 can include raw machine data or unstructured raw machine data.

The metric and log agents 303 can communicate their respective data to the collector 304. In some cases, rather than have specific metric and/or log agents 303, the collector 304 can collect the metric data and/or log data from the client-side host.

The collector 304 can perform some processing on the log, trace, and/or metric ("LTM") data. In some cases, the collector 304 can parse the log data to identify individual log entries (or log data entries). For example, the log data received by the collector 304 may not have any clear demarcation between individual log entries that were generated at different times for different reasons. In some such cases, the collector can parse the log data to identify different log entries. Each log entry can include a portion of a log file, include unstructured raw machine data, and reflect an interaction between the client-side host and another computing device within the IT environment. As such, the collector 304 can generate log entries from the log data. The log entries may be further processed by the collector 304 or another system, such as the data intake and query system 326, to generate events. In some cases, the generated events can include at least a portion or all of the unstructured raw machine data of the log entries and be associated with a timestamp. In certain cases, an agent 303 can process the log data to determine log entries and communicate the log entries to the collector 304.

In certain cases, the collector 304 can correlate the different types of LTM data, such log data or log entries with trace data and/or metric data. For example, the collector 304 can identify the traces (or spans) that resulted in a particular log entry and include an identifier or association between the particular log entry and respective traces (or spans) Similarly, the collector 304 can associate the particular log entry with metric data that was generated around the time that the particular log entry was generated. Similarly, the collector 304 can associate the trace data (or individual spans) with metric data that was generated around the time that the trace (or span) data was created.

In some cases, the collector 304 can correlate the different types of LTM data based on a shared identifier in the LTM data. For example, a log entry may include a span or trace ID that matches a span or trace ID in trace data. As another example, metrics data may include an isolated execution environment identifier (e.g., container name, virtual machine identifier, etc.) that is also in metadata associated with a log entry. Based on the shared identifier, the collector 304 can correlate the different types of machine-generated data. In certain cases, the correlation can be based on multiple criteria, such as time and an entity identifier. For example, the collector 304 may only correlate data that has a shared identifier and was received within a few seconds or minutes of each other.

In an embodiment, the monitoring service 306 receives and analyzes the LTM data for monitoring and troubleshooting purposes. It should be noted that, in addition to monitoring service 306, LTM data might also be simultaneously transmitted to other types of storage and monitoring back-end services, e.g., a data intake and query system 326.

In one embodiment, the monitoring service 306 may be a Software as a Service (SaaS) based service offering. Alternatively, in another embodiment, it may also be implemented as an on-prem application. The monitoring service 306 receives the observability data collected by the collector 304 and provides critical insights into the collected trace data to a client, who may be an application owner or developer. In an embodiment, the monitoring service 306 may be hosted on a computing system that includes one or more processors, memory, secondary storage and input/output controller. The computing system used for hosting the monitoring service 306 is typically a server class system that uses powerful processors, large memory resources and fast input/output systems.

The monitoring service 306 may comprise an instrumentation analysis system 322 (also referred to herein as an "analytics engine") and a query engine and reporting system 324. The instrumentation analysis system 322 receives data comprising, for example, trace information, span information, logs, and/or values of metrics sent by different clients. As noted previously, task or software program may be instrumented to generate spans with a common field in their data structures to designate spans that are part of a common trace. For example, the spans may include a trace identifier such that spans with the same trace identifier are a part of the same trace.

The tasks (or software) executing on the client device are configured to send information generated as a result of instrumenting the software to the instrumentation analysis system 322 of the monitoring service 306. For example, the tasks may send span information collected from the various services at the client end to the instrumentation analysis system 322. Alternatively, traces may be sampled to generate metric values, and the tasks may send values corresponding to various metrics as they are generated to the instrumentation analysis system 322. The tasks may send group values of metrics periodically to the instrumentation analysis system 322. Different tasks may send the same metric or different metrics at different rates. The same task may send different metrics at different rates.

In an embodiment, the tasks (e.g., tasks 301 and 302) and the collector 304 may send data to the monitoring service 306 by invoking an API supported by the monitoring service 306 and the instrumentation analysis system 322. In one embodiment, a customer name may be specified for the instrumented software. The instrumented software includes the customer name when it identifies a data stream associated with that particular customer. The ability to associate a data stream with a customer allows the instrumentation analysis system 322 to perform customer specific analysis, for example, report on usages of systems for each customer, identify customers reporting more than a threshold number of errors and so on.

In one embodiment, an application owner or developer may submit queries to the query engine and reporting system 324 to gain further insight into the spans and traces (or metrics) received and analyzed by the instrumentation analysis system 322. For example, the query engine and reporting system 324 within the monitoring service 306 may be configured to generate reports, render graphical user interfaces (GUIs) and/or other graphical visualizations to represent the trace and span information received from the various clients. The query engine and reporting system 324 may, for example, interact with the instrumentation analysis system 322 to generate a visualization, e.g., a histogram or an application topology graph (referred to interchangeably as a "service graph" herein) to represent information regarding the traces and spans received from a client. Alternatively, the query engine and reporting system 324 may be configured to respond to specific statistical queries submitted by a developer regarding one or more services within a client's application.

3.1. Logs, Traces, and Metrics

As mentioned above, the shift from monolithic applications to microservices-based architectures has increased the usefulness of analyzing traces in a distributed system. In addition, metrics data and log data can be useful in identifying and/or resolving errors in a distributed system. Alone each type of data entry can provide value and help ascertain different issues associated with a networked system or distributed system. Metrics, for example, can indicate that a problem exists (e.g., a server, a processing device, host device, or isolated execution environment, is experiencing a processing or memory overload, network issues, etc.), traces can identify where a problem is occurring within a microservices environment (e.g., which microservices may be responsible for or affected by the problem), and logs can indicate the source of the problem or indicate what caused the problem, such as a timeout error or unauthorized token, etc.

In some cases, the monitoring service 306 can receive log, trace, and/or metrics data ("LTM" data) from the collector 304. In certain cases, the LTM data received by the monitoring service 306 can be pre-associated, coupled, or correlated. For example, the LTM data received by the monitoring service 306 can include associations between the log, metric, and/or trace data, generated by the collector 304. As mentioned, the interrelationships between the LTM data can be determined by the collector 304 and be based on the time at which the LTM data was generated, a shared entity identifier in the LTM data, etc. In certain cases, the trace data may be coupled with log or other data from the data intake and query system 326. In one embodiment the data intake and query system 326 may be comprised within the monitoring service 306.

Examples of a data intake and query system 326 is the event-based data intake and query SPLUNK® ENTER- PRISE and SPLUNK® CLOUD systems (generically referred as the SPLUNK® system) developed by Splunk Inc. of San Francisco, Calif. The SPLUNK® system is the leading platform for providing real-time operational intelligence that enables organizations to collect, index and search machine-generated data from various data sources 328, for example, websites, applications, servers, networks and mobile devices that power their businesses. In one embodiment the other data sources 328 may be associated with the same clients (e.g., Client A and Client B) that generate the LTM data received by the monitoring service 306.

The SPLUNK® system is particularly useful for analyzing data which is commonly found in system log files, network data and other data input sources. In another example, the data intake and query system 326 may be an on-premises application or based on a distributed or cloud-based service. Non-limiting examples of a data intake and query system 326 are described in U.S. application Ser. No. 16/777,612, entitled GENERATING A MODIFIED COMPONENT FOR A DATA INTAKE AND QUERY SYSTEM USING AN ISOLATED EXECUTION ENVIRONMENT IMAGE, and Ser. No. 16/945,646, entitled INGESTION NODES IN A DATA INTAKE AND QUERY SYSTEM, each of which is incorporated herein by reference for all purposes.

In one embodiment, the LTM data may be ingested into the data intake and query system 326, or may be coupled with outputs from the data intake and query system 326 e.g., from searches that may be based on LTM data and run on the data intake and query system 326. In some embodiments, the data intake and query system 326 described above may be integrated with or into the monitoring service 306 that analyzes LTM data, e.g., the monitoring service 306. The monitoring service 306 may, accordingly, comprise a full suite of services including, for example, analyzing trace data, generating metrics data from the trace data, ingesting and analyzing log data, ingesting metrics data and providing insights generated from the metrics data, including aggregating and/or correlating trace data, log data and metrics data, in order to gain insights into a computing platform.

As described above, the LTM data received from the collector 304 may be sent to systems configured to ingest and search data, such as the data intake and query systems 326 described above. In some embodiments data intake and query system 326 may be configured to generate metrics data from the trace data received from the collector 304. Additionally, other embodiments may use a stream processor that may perform transformations and other operations on incoming data prior to, concurrently with, and/or as an alternative to, ingestion of the data. In some embodiments, the system may also be configured to ingest metrics data and may be optimized to ingest, query and generate insights from metrics data.

In other embodiments, metrics may be generated by instrumentation (e.g., from instrumenting client software and tasks, e.g., tasks 301, 302 etc. as described above) and sent to a SaaS-based processing system, e.g., the monitoring service 306. For example, software may be instrumented to send metrics to a gateway or to an instrumentation analysis engine, where metrics may be aggregated, queried and alerted.

As above, different types of LTM data may be associated or paired together. For example, traces may be associated or paired with metrics generated by instrumentation or logs, and correlated in various ways to provide insights. For example, as a broad-based correlation example, the metrics data may be used in a thresholding comparison to determine that there is an issue that needs attention, the trace data may be used to determine which component or microservice requires attention, and log data from the data intake and query system 326 may be used to determine exactly why the component or microservice needs attention. Other correlations and uses for the combination of metrics data, log data and event data are also contemplated herein. As noted above, the various features and services may be provided within an integrated monitoring platform (e.g., the monitoring service 306), wherein the platform comprises, among other things, an instrumentation analysis system (e.g., the instrumentation analysis system 322), a query engine and reporting system (e.g., the query engine and reporting system 324) and a data intake and query system (e.g., the data intake and query system 326).

In some cases the, monitoring service 306 (e.g., via the query engine and reporting system 324) can provide one or more user interfaces to enable a user to analyze and understand the LTM data. In addition, the monitoring service 306 can enable a user to navigate between the LTM data to better understand the relationship between the data and identify system problems within the IT environment. For example, the monitoring service 306 can include a user interface that enables a user to view log entries or log data, select a particular log entry, and navigate from the particular log entry to metrics or traces associated with the particular log entry. In this manner, the monitoring service 306 can enable a user to discover relationships between the data, identify system issues or failures, and take corrective action.

Once the monitoring service 306 has processed the data, it can communicate it to another system, such as the data intake and query system 326, where the data can be further processed, grouped, and stored. Accordingly, in some embodiments, the monitoring service 306 may not permanently store any of the data that it processes. Rather, the monitoring service 306 can be used to perform real-time processing on the data, provide user interfaces to interact with the streaming data, and provide access to the data that is stored in a different system, such as the data intake and query system 326. In certain cases, the monitoring service 306 can store some or all of the LTM data.

To facilitate processing the different types of data, in some cases, the monitoring service 306 (or instrumentation analysis system 322) can include one or more content generators 350 that generate content based on the different types of data. For example, the monitoring service 306 can include a metrics content generator 350 that generates content based on metrics data, a log content generator 350 that generates content based on log data, a trace content generator 350 that generates content based on trace data, and/or a services content generator 350 that generates content based on service data. The monitoring service 306 can include fewer or more content generators 350, or some of the aforementioned content generators 350 can be combined, as desired. For example, in some cases, the trace content generator 350 can generate content based on trace data and service data and/or generate trace content and service content based on trace data. In certain cases, the various content generators 350 can be implemented on the same computing device or combined as desired.

Each content generator 350 can generate content based on the type of data that it receives and processes. As a non-limiting example, a log content generator 350 can generate log-related content based on log data entries. The log-related content can be displayed on one or more GUIs. In some cases, the log-related content can include various log data entries, information about individual log entries, and content generated from a group of log data entries, such as a time bar graph, etc. In addition, the log content generator 350 can generate and/or display statistics about the different logs that it processes, etc.

In a similar fashion, a metrics content generator 350 can generate metrics-related content based on metrics data entries. As described herein, the metrics data entries can include information regarding individual host devices, pods, containers, services, or other components of a shared computing environment. The information may include memory usage, processor usage, network status, number of containers in a pods, number of pods executing in a host device, etc. As such, the metrics content generator 350 can generate content related to host devices, pods, containers, services, or other components of a shared computing environment, or other computing environments. The generated content can include time series graphs or other information showing the status of the various components relative to a given metric. In some cases, the generated content can include information at an individual container or pod level or at a host or cluster level, etc.

The trace content generator 350 can generate trace-related content based on trace data entries. As described herein, certain trace data entries can include information regarding individual spans, traces, and services associated with the traces and spans. Accordingly, the trace content generator 350 can generate content that identifies the related spans of a particular trace, services associated with the particular trace and spans, and/or services related to one or more traces, spans, etc. The content can include graphs, data flows, or metrics illustrating the relationship and status of various services, spans, and traces.

In addition to generating unique content as compared to the other content generators 350, in some cases, the content generators 350 can generate similar content. For example, each content generator 350 can generate one or more alerts based on incoming data, etc. While each content generator 350 can generate alerts, in some cases, the alerts generated by a particular content generator 350 can relate to the type of data that the content generator 350 processes. For example, the metrics content generator 350 can generate metrics-related alerts or alerts based on metrics data entries (e.g., metrics-based alerts). Similarly, the trace content generators 350 can generate trace-related alerts or alerts based on trace data entries (e.g., trace-based alerts). In like manner, the log content generator 350 can generate log-related alerts or alerts based on log data entries, etc. (e.g., log-based alerts).

In certain cases, each content generator can generate and/or display content independent of each other. For example, the log content generator 350 can generate log content independent of the metrics content generator 350 or metrics data and independent of the trace content generator 350 or trace data. Similarly, the trace content generator can generate trace and/or services content independent of the metrics or log content generators 350 and independent of the log data or metrics data.

In some cases, content generated from multiple content generators 350 can be aggregated together. For example, content generated by the metrics content generator 350, traces content generator 350 and/or log content generator 350 can be aggregated together to form a dashboard that shows some information generated from multiple content generators 350.

In addition to processing different types of data entries, the content generators 350 can obtain the data from different sources. For example, the log content generator 350 may obtain the log data entries that it processes from a separate system, such as the data intake and query system 326. Similarly, the metrics content generator 350 may obtain its data from a metrics processing system and the trace content generator 350 may obtain its data from a trace processing system. In certain cases, the content generators 350 can obtain their respective data from the same source, such as from the collector 304 and/or the monitoring service 306. For example, the monitoring service 306 can communicate or make available trace data entries to the trace content generator 350, metrics data entries to the metrics content generator 350, and log data entries to the log content generator 350, etc. Any one or any combination of the aforementioned mechanisms can be used to provide data to the respective content generators 350.

The monitoring service 306 can use different GUIs to display the content generated by the different content generators 350. In some cases, the monitoring service 306 can use a different GUI for each content generator 350 and/or for each type of content generated by the content generators 350. For example, the monitoring service 306 can use one GUI to display metrics-related content and other GUIs to display log-related content, trace-related content, and/or services-related content, respectively.

3.2. Component Implementation

The various components described herein with reference to FIG. 3 that are used to obtain, collect and process the data from the clients, such as, but not limited to, the collector 304, monitoring service 306, instrumentation analysis system 322, query engine and reporting system 324, the content generators 350, etc., can be implemented using one or more computing devices, processors, or isolated execution environments (e.g., virtual machine, container, pod, etc.). In certain cases, each component (including each content generator 350) is implemented in a distinct computing device. In some cases, multiple components (including multiple content generators 350) are implemented on the same computing device as different processes or isolated execution environments sharing the resources of an underlying host device, etc.

In certain embodiments, one or more of the aforementioned components can be implemented in a shared computing resource environment. In this context, a shared computing resource environment or cloud-based service can refer to a service hosted by one more computing resources that are accessible to end users over a network, for example, by using a web browser or other application on a client device to interface with the remote computing resources. For example, a service provider may provide one or more of the aforementioned components by managing computing resources configured to implement the various aspects described herein and by providing access to the components to end users via a network. Typically, a user may pay a subscription or other fee to use such a service. Each subscribing user of the cloud-based service may be provided with an account that enables the user to configure a customized cloud-based system based on the user's preferences.

When implemented in a shared computing resource environment, the underlying hardware (non-limiting examples: processors, hard drives, solid-state memory, RAM, etc.) on which the components execute can be shared by multiple customers or tenants as part of the shared computing resource environment. In addition, when implemented in a shared computing resource environment as a cloud-based service, the various components can be implemented using containerization or operating-system-level virtualization, or other virtualization technique. For example, one or more of the components can be implemented as separate software containers or container instances. Each container instance can have certain computing resources (e.g., memory, processor, etc.) of an underlying hosting computing system (e.g., server, microprocessor, etc.) assigned to it, but may share the same operating system and may use the operating system's system call interface. Each container may provide an isolated execution environment on the host system, such as by providing a memory space of the hosting system that is logically isolated from memory space of other containers. Further, each container may run the same or different computer applications concurrently or separately, and may interact with each other. The containers can, in some cases, be grouped together as pods or groups of isolated execution environments, etc.

Although reference is made herein to containerization and container instances, it will be understood that other virtualization techniques can be used to provide the isolated execution environments and/or groups of isolated execution environments. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

4.0. Multiple Modalities for Storing and Analyzing Data

Historically, there have been several challenges associated with implementing an analytics tool such as the monitoring service 306 within a heterogeneous distributed system. One of the challenges associated with microservices architectures, for example, is efficiently ingesting and aggregating significant amounts of span and trace data generated by various services in an architecture. Conventional tracing and monitoring systems are typically unable to ingest the vast amounts of span and tracing data generated by clients' application and have to resort to sampling the data intelligently to reduce the volume of stored trace data. Using sampling exclusively, however, results in loss of data and, as a result, conventional monitoring tools do not allow clients access to all the traces generated by their application. Furthermore, conventional monitoring tools may calculate metrics (e.g., requests, errors, latency, etc.) based on the sampled set of data and, accordingly, the calculations may be approximate at best and inaccurate at worst.

Advantageously, embodiments of the present invention allow clients of a monitoring platform the ability to ingest up to 100% of the spans and create streams of metric data using the ingested spans prior to consolidating the spans into traces (through a sessionization process). The metric time series provide valuable real-time information pertaining to services or endpoints within an application and also allow alerts to be configured to manage anomalous behavior on the endpoints.

Embodiments of the present invention also sessionize and store up to 100% of the spans received from the client in real time. Embodiments of the present invention comprise an ingestion streaming pipeline that is able to ingest and consolidate the incoming spans into traces, and is further able to use advanced compression methods to store the traces. Additionally, because incoming trace and span information may be efficiently ingested and aggregated in real time, a monitoring platform configured, in accordance with embodiments of the present invention, is able to advantageously convey meaningful and accurate information regarding throughput, latency and error rate (without the need for sampling) for the services in the microservices-based application. High-cardinality metrics pertaining to throughput, latency and error rate may be calculated with a high degree of accuracy because all incoming data is accounted for and there is no data loss as a result of sampling.

Embodiments of the present invention further allow a client to store and analyze the trace data using multiple modalities of analysis. In one embodiment, a first modality comprise converting incoming spans from one or more clients into a plurality of metric data streams (also referred to as metric time series) prior to sessionizing the spans. Each metric time series is associated with a single span identity, where a base span identity comprises a tuple of information corresponding to an associated type of span. Each metric time series in this modality (referred to herein as "metric time series modality") represents a plurality of tuples, each tuple representing a data point. Key performance metrics (KPIs) can be extracted directly from the metric time series in real-time and reported to a user. Because the metric time series are created without paying a time penalty associated with sessionization, they can be used to perform real-time monitoring with sub-second resolution and generate alerts within two to three seconds if a condition is violated.

In one or more embodiments, a second modality of analysis sessionizes the incoming spans and supports deriving higher-cardinality metrics (as compared with metric time series data) for a selected set of indexed tags, e.g., user-selected tags, global tags of the trace, etc. over selected time durations (referred to herein as the "metric events modality"). This modality is particularly useful for clients that need accurate SLI information for a larger set of high-value indexed tags. The metric events modality enables developers to aggregate metrics that have been pre-generated using the sessionized trace data to efficiently respond to queries submitted by a client. The aggregated metrics provide a user visibility into the performance of services within a microservices-based application. The metric events modality may deprioritize speed as compared to the metric time series to provide a user resolution into a larger set of indexed tags. As such, responses provided by the metric events modality are typically slightly slower (e.g., 45 seconds to 1 minute) as compared with the sub-second response rates of the metric time series.

In one or more embodiments, the metric events modality may also keep track of exemplary traces associated with a pre-configured set of indexed tags. The tags to be indexed may be pre-selected by the user or the monitoring platform. The Trace IDs may be used to retrieve the associated traces and analysis on the actual traces may be performed to generate more particularized information, e.g., span duration, span count, span workload percentage, etc. for each span in a given trace. In one embodiment, once the traces are retrieved, an analysis may be run on an arbitrary set of tags (in addition to the pre-configured indexed tags).

Additionally, in one or more embodiments, a third modality of analysis may comprise a "full-fidelity" modality where a full-fidelity analysis may be conducted on any dimension or attribute of data to gauge the performance of services in the microservices-based application. The full-fidelity modality allows clients to search most or all of the incoming trace data that was ingested by the monitoring platform without relying on sampling. The full-fidelity mode may sacrifice speed for accuracy, and may be used by clients that need a more thorough analysis of the services across every dimension or attribute.

In an embodiment, the three modalities may be supported by the monitoring platform simultaneously by storing ingested trace data using three different formats, wherein each format corresponds to one of the three available modalities of analysis. Note that embodiments of the present invention are not restricted to three discrete data sets. The data sets for the different modalities may overlap or may be saved as part of a single data set. When a user submits a query, the monitoring platform may determine which of the data sets is most suitable for addressing the query. Thereafter, the monitoring platform executes the query against the selected data set to deliver results to the user. By comparison, conventional monitoring systems typically focus on a single modality and do not provide clients the ability to seamlessly navigate between different modalities. Conventional monitoring systems also do not provide the ability to automatically select the most appropriate modality based on the content, structure, syntax or other specifics pertaining to an incoming query.

Figure 4:
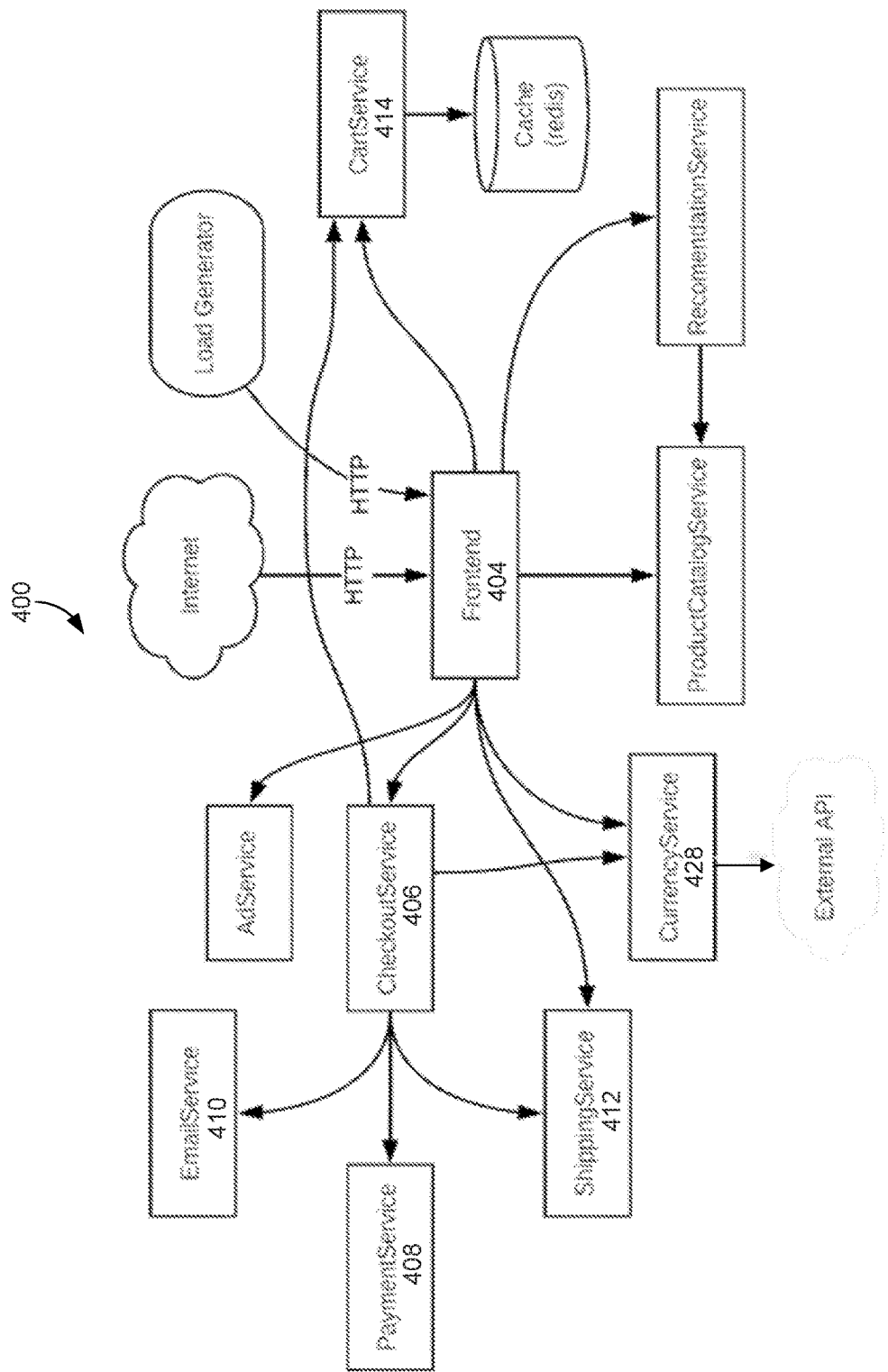
FIG. 4 illustrates components of an exemplary microservice application for an online retailer.

FIG. 4 illustrates components of an exemplary microservice application for an online retailer. A user needing to conduct a transaction may visit the website of the online retailer which would initiate a call to the retailer's Front-end service 404 on a server. The call to the Front-end service 404 may subsequently trigger a chain of calls on the retailer's back-end that would not be transparent to the user. For example, if the user proceeds to complete the transaction by checking out, several calls may be made to the back-end to services such as a CheckOutService 406, a PaymentService 408, an EmailService 410, a ShippingService 412, a CurrencyService 428 and a CartService 414 that may be involved in processing and completing the user's transactions. Note, that a given request submitted by a user to the website would involve a subset of the services available and, typically, a single request would not result in a call to each of the services illustrated in FIG. 4.

As mentioned above, a request that the user initiates would generate an associated trace. It is appreciated that each user request will be assigned its own Trace ID, which will then propagate to the various spans that are generated during the servicing of that request. Each service may process a portion of the request and generate one or more spans depending on the manner in which instrumentation is configured for a respective service. The Trace ID may then be used by the server to group the spans together into a trace with that Trace ID. So, for example, the user's checkout transaction may generate a call at the Front-end service 404, which may in turn generate calls to various microservices including the CheckoutService 406. The CheckoutService 406 may, in turn, generate calls to other services such as the PaymentService 408, the EmailService 410 and the ShippingService 412. Each of these calls passes the Trace ID to the respective service being called, wherein each service in the call path could potentially generate several child spans.

It should be noted that a service does not necessarily need to make calls to other services—for instance, a service may also generate calls to itself (or, more specifically, to different operations and sub-functions within the same service), which would also generate spans with the same Trace ID. Through context propagation then, each of the spans generated (either by a service making a call to another service or a service making a call to various operations and sub-functions within itself) is passed the Trace ID associated with the request. Eventually, the spans generated from a single user request would be consolidated (e.g., by the collector 304 or the monitoring service 306 of FIG. 3) together using the Trace ID (and the Parent Span IDs) to form a single trace associated with the request.

As noted above, conventional distributed tracing tools are not equipped to ingest the significant amounts of span and tracing data generated by clients' application and have to resort to sampling the data intelligently to reduce the volume of stored trace data. Further, conventional distributed tracing tools do not provide application owners multiple modalities of storing and querying trace data with the flexibility of switching between the different modalities depending on the level of detail required to respond to a user's query.

Referencing FIG. 4 again, an owner of the application 400 may, for example, need varying degrees of detail regarding the services in the application. For example, the application owner may need to monitor certain metrics (e.g., RED metrics associated with Request, Errors, Durations) in real-time associated with a particular service, e.g., CheckoutService 406. Assuming there are errors generated by a call made from the Frontend service 404 to the CheckoutService 406, the owner may require further information pertaining to additional tags (indexed or non-indexed) associated with CheckoutService 406. The application owner may also need to access the full trace(s) associated with the request from the Frontend service 404 to the CheckoutService 406 to perform a more detailed analysis. Each of the requests requires a different degree of detail extracted from the span and trace information.

In one embodiment, the metric time series modality allows the user to monitor RED metrics associated with a given service, e.g., CheckoutService 406 in the online retailer's application in real-time. In one embodiment, the metric time series modality can also be configured to deliver real-time alerts to a user based on each of the RED metrics, e.g., anomalies related to the request rate, error rate, or latency (duration).

If the user needs Service Level Indicators (SLIs) pertaining to certain indexed tags related to the call between Frontend service 404 and CheckoutService 406 for a given time duration, the metric event modality may enable the user to perform aggregations of metrics data computed from the indexed tags associated with the spans generated by the call between the Frontend service 404 and the CheckoutService 406. The metrics aggregation may be a numeric summation, for example, and may be performed relatively quickly.

The metric event modality, in accordance with embodiments of the present invention, associates the selected tags indexed from the incoming span data (e.g., the same indexed tags used for performing metrics extraction) with Trace IDs for exemplary traces. The Trace IDs may be used to retrieve the exemplary traces associated with indexed tags. Thereafter, the monitoring platform may analyze the exemplary traces to generate more particularized information, e.g., span duration, span count, span workload percentage, etc. for each span in a given trace. For the example of FIG. 4, if the user requires a performance summary for the spans generated by the call made from the Frontend service 404 to the CheckoutService 406, the associated query submitted by the user may access the data set associated with the metric event modality. Using the Trace IDs corresponding to the indexed tags, the monitoring platform may then perform the computations necessary on the corresponding exemplary traces to provide the user further information regarding the span performances. In an embodiment, the user may also be able to extract meaningful information from the unindexed tags associated with the spans generated by the call using the exemplary traces.

If the user wants to search all the incoming trace data associated with the call between Frontend service 404 to the CheckoutService 406, embodiments of the present invention provide a third modality of analysis. In the full-fidelity modality, a full-fidelity analysis may be conducted on any dimension or attribute of the trace data. For example, the user may be able to search previously indexed or unindexed tags across each of the traces associated with the call the between the Frontend service 404 and the CheckoutService 406. The full-fidelity modality allows an analysis to be performed across any relevant trace. Conventional tracing systems are unable to provide that level of flexibility and detail for developers or application owners needing to investigate performance issues with their applications. Note that this modality of analysis may be more time-consuming because trace data may be detailed and require significant storage space.

Embodiments of the present invention ingest and aggregate the span information from the online retailer's application. Further, embodiments of the present invention extract information from the incoming span data and store the information using multiple formats to support multiple modalities of data analysis for a user. Each modality is configured to allow the users access to a different format in which incoming trace information may be represented and stored, where each format conveys a different degree of resolution regarding the ingested traces to a user and, accordingly, may occupy a different amount of storage space.

Figure 5:
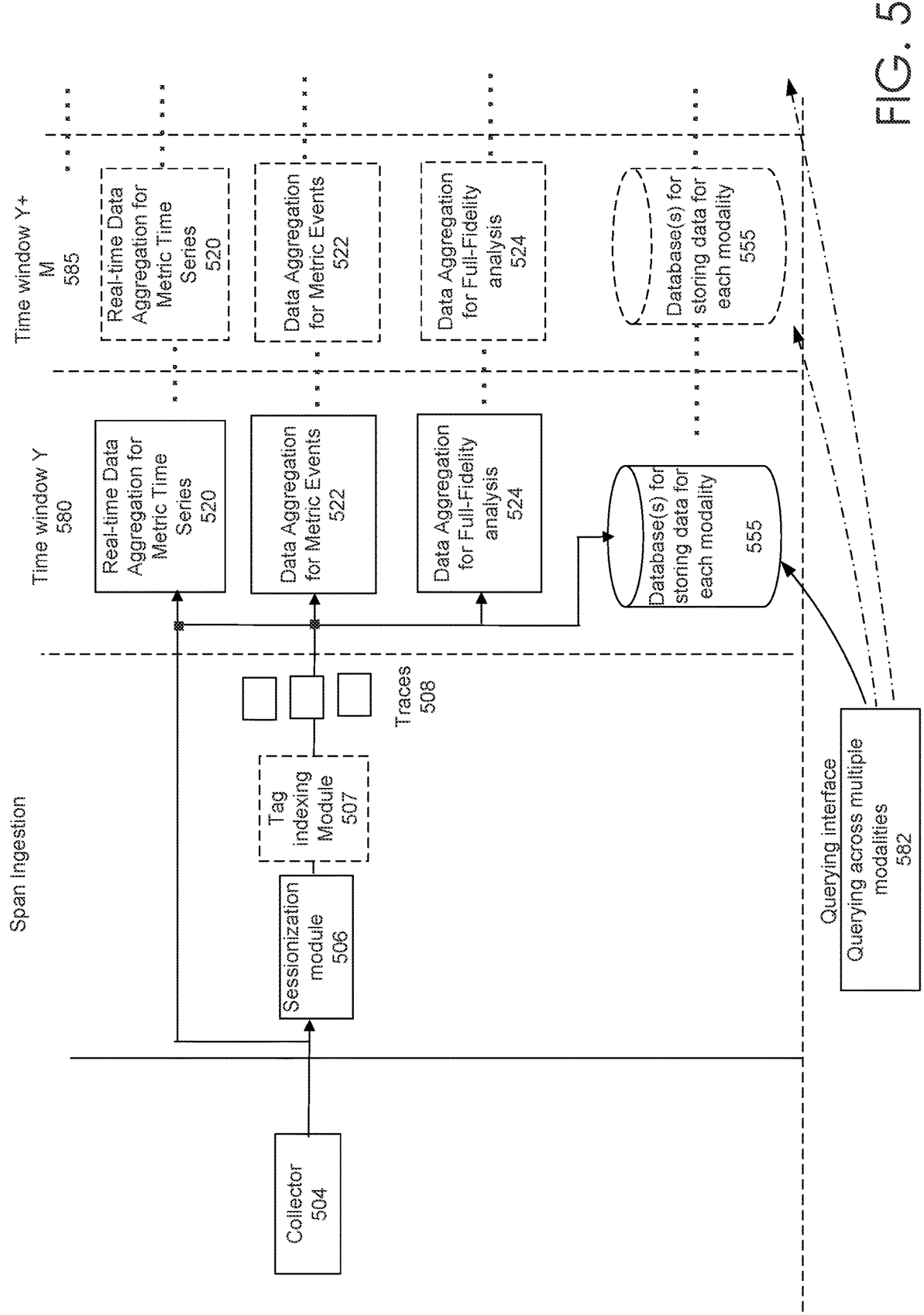
FIG. 5 is a flow diagram that illustrates an exemplary method of ingesting and aggregating span information to support multiple modalities of analysis, in accordance with embodiments of the present invention.

FIG. 5 is a flow diagram that illustrates an exemplary method of ingesting and aggregating span information to support multiple modalities of analysis, in accordance with embodiments of the present invention. As mentioned in connection with FIG. 3, span information is received at the monitoring service 306 from the collector (e.g., the collector 504 in FIG. 5).

As noted previously, in one embodiment, incoming spans from one or more clients are converted into a plurality of metric data streams prior to consolidating the spans into traces through a sessionization process. The incoming spans are received and the metric data streams are generated by module 520 prior to the spans being sessionized. Because the metric time series are created without paying a time penalty associated with sessionization, they can be used to perform real-time monitoring and alerting.

The incoming spans are also sessionized where the span information is combined into traces in a process called sessionization. The sessionization module 506 is responsible for stitching together or combining the traces 508 using, among other things, the Trace IDs associated with each user-request (and typically also the Parent Span IDs of each span). Note that, in one embodiment, the sessionized traces may also be inputted to the module 520 to create metric time series to track traces (separately from the time series created to track spans).

In addition to a Trace ID, each trace also comprises a time-stamp; using the time-stamps and the Trace IDs, the sessionization module 506 creates traces 508 from the incoming spans in real time and sessionizes them into discrete time windows. For example, the sessionization process may consolidate traces (from spans) within a first time window (associated with time window Y 580) before transmitting the traces to modules 520, 522, or 524. Thereafter, the sessionization process may consolidate traces within the subsequent time window (associated with time window "Y+M" 585) before transmitting those traces to the modules 520, 522, or 524. It should be noted that the time windows associated with each of the modules 520, 522, and 524 may be different. In other words, the metric time series data may be collected over short time windows of 10 seconds each. By comparison, traces for the metric events modality (associated with the module 522) may be collected over 10 minute time windows.

In some embodiments of the present invention, the sessionization module is able to ingest, process and store all or most of the spans received from the collector 504 in real time. By comparison, conventional monitoring systems do not accept all of the incoming spans or traces; instead, they sample incoming spans (or traces) to calculate SLIs at the root level of a trace before discarding the spans. Embodiments of the present invention, by comparison, comprise an ingestion streaming pipeline that is able to ingest and consolidate all the incoming spans into traces in real time, and is further able to use advanced compression methods to store the traces. Further, embodiments of the present invention are able to generate metric time series from the span data (prior to sessionizing the spans) to provide real-time monitoring and alerting of certain KPIs.

As noted above, the sessionization module 506 has the ability to collect all the traces within a first time window Y 580 using the time-stamps for the traces. Subsequently, the sessionized traces are fed to the modules 522 and 524, for the respective modes (metric events and full-fidelity) for extraction and persistence.

In one embodiment, subsequent to consolidation, the trace data is indexed by an optional tag indexing module 507, which indexes one or more tags in the trace data. The tags may be user-selected tags or tags that the monitoring platform is configured to index by default. In a different embodiment, tag indexing may be performed as part of data aggregation, e.g., by module 522 associated with metric events.

In an embodiment, data sets associated with each of the modalities may be persisted in one or more databases 555. As noted previously, the data sets for the respective modalities may be separate data sets, overlapping data sets or a single data set that supports all the modalities. Note that the databases 555 may be a single database that stores data sets corresponding to all three modalities. Alternatively, the databases 555 may represent different respective databases for each of the three modalities. Furthermore, the databases 555 may also represent distributed databases across which relevant information for each of the three modalities is stored.

In one embodiment, data associated with each of the three modalities is generated at the time of ingestion and stored separately from each other. The structure, content, type or syntax of query submitted by a user will typically dictate which of the three modalities and corresponding data set will be selected. In one embodiment, an interface through which the query is submitted may also determine which of the three modalities and corresponding data set is selected. In an embodiment, there may be some commonality in the data for the three modalities in which case the storage for the data may overlap. An alternative embodiment may also comprise one or two of the three modalities (instead of all three) described above.

A client may send in a request to retrieve information pertaining to an application through query interface 582. The underlying querying engine (e.g., the query engine and reporting system 324 from FIG. 3) will analyze the structure, content, type and/or syntax of the query, and also the interface through which the query is submitted, to determine which of the three modalities and respective data set to access to service the query. In an embodiment, the three data sets corresponding to the three modalities are structured in a way that allows the querying engine to navigate between them fluidly. For example, a client may submit a query through the query interface 582, which may potentially result in the query engine accessing and returning data associated with the metric events modality. Thereafter, if the client requires more in-depth information, the querying engine may seamlessly navigate to data associated with a different mode (e.g., full-fidelity) to provide the user with further details. Conventional monitoring systems, by comparison, do not provide more than a single modality or the ability to navigate between multiple modalities of data analysis.

4.1. Metric Time Series

Embodiments of the present invention allow trace data to be stored and analyzed using multiple modalities of analysis. In one embodiment, incoming spans from one or more clients are converted into a plurality of metric data streams (also referred to as metric time series) and transmitted to the analytics engine (e.g., the instrumentation analysis system 322) for further analysis. Most of the metric data streams are created directly from the incoming spans prior to the sessionization process to generate metric time series related to spans. Each metric time series is associated with a single "span identity," where a base span identity comprises a tuple of information corresponding to an associated type of span. Each metric time series in the metric time series modality represents a plurality of tuples with each tuple representing a data point. KPIs can be extracted in real-time directly from the metric time series and reported to a user. Because the metric time series are created without paying a time penalty associated with sessionization, they can be used to perform real-time monitoring with sub-second resolution and generate alerts within two to three seconds if some condition is violated.

4.1.1. Generating Metric Data Streams Using Span Identifiers

A client application associated with, for example, an online retailer's website may potentially generate millions of spans from which a monitoring platform may need to extract meaningful and structured information. To organize the significant amounts of incoming span data, in an embodiment, incoming spans may be automatically grouped by mapping each span to a base "span identity," wherein a base span identity comprises some key attributes that summarize a type of span. An exemplary span identity may be represented as the following exemplary tuple: {operation, service, kind, isError, httpMethod, isServiceMesh}, where the operation field represents the name of the specific operation within a service that made the call, the service field represents the logical name of the service on which the operation took place, the kind field details relationships between spans and may either be a "server" or "client," the isError field is a "TRUE/FALSE" flag that indicates whether a span is an error span, the httpMethod field relates to the HTTP method of the request for the associated span and the isServiceMesh field is a flag that indicates whether the span is part of a service mesh. A service mesh is a dedicated infrastructure layer that controls service-to-service communication over a network. Typically, if software has been instrumented to send data from a service mesh, the trace data transmitted therefrom may generate duplicative spans that may need to be filtered out during monitoring. Accordingly, the 'isServiceMesh' flag allows the analytics engine to filter out any duplicative spans to ensure the accuracy of the metrics computations.

In some embodiments, the tuple used to represent the span identity may include other identifying dimensions as well. For example, if a user needs visibility into metadata tags from the spans in addition to the dimensions extracted for a base span identity by default (e.g., service, operation, kind, etc.), an extended identity may be created. An extended identity supports custom dimensionalization by a user, where dimensionalization refers to the ability to extract information pertaining to additional tags or metadata in a span. An extended identity provides a customer the ability to dimensionalize the span using pre-selected dimensions. Conventional methods of monitoring by comparison did not offer customers the flexibility to add custom dimensions to streams of metric data. An extended identity comprises the span's base identity and additionally a map of the span's tag key:value pairs that matched a user's configuration settings. An exemplary extended identity may be represented as the following exemplary tuple: {operation, service, kind, isError, httpMethod, isServiceMesh, keyValueMap . . . }, where the keyValueMap field represents one or more additional tags or dimensions configured by the user to be extracted as part of the span's identity, e.g., customer name, member ID, etc.

By extracting information related to additional tags, higher cardinality metrics may be computed using the metric time series modality. Further, a user is able to configure alerts on the custom dimensions as well, wherein the alerts inform a user if a particular dimension has crossed some critical threshold. In alternate embodiments of the present invention, the tuple used to represent a span's base or extended identity may contain fewer elements.

If the tuple of information of an incoming span happens to be the same as another span, both spans relate to the same identity. In an embodiment, spans with the same base identity may be grouped together. A fixed size bin histogram is generated for each span identity to track metrics associated with the span identity. In this way the same type of spans are organized together and the user can track one or more metrics associated with each group of spans sharing a common identity. In an embodiment, a fixed size bin histogram is generated for each unique span identity. The fixed size bin histogram may be a data structure, for example, that is preserved in memory.

As noted above, each span identity may be tracked with a respective histogram. The histograms associated with the corresponding span identities, in one embodiment, are generated and updated in fixed time duration windows. For example, histogram data may be generated for the incoming spans in memory every 10 seconds. At the end of each fixed duration, metrics associated with the histograms are emitted and the histogram is reset for the next time window. By emitting metrics for each time duration, data streams of metrics may be generated from the histogram data. The streams of metric data associated with each span identity, in one embodiment, may be aggregated by a monitoring platform to provide a user meaningful information regarding the application being monitored.

Figure 6:
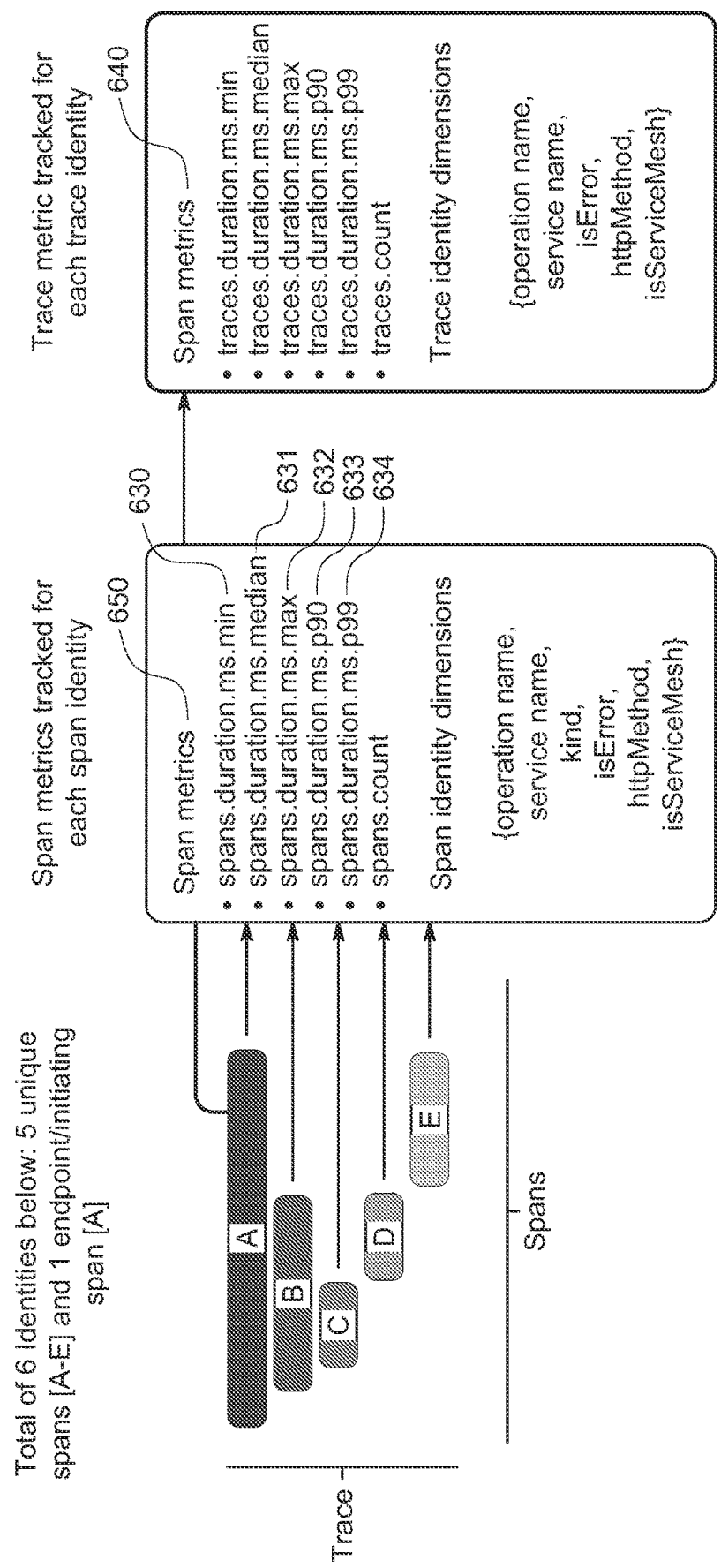
FIG. 6 illustrates the manner in which span metrics and trace metrics are generated, in accordance with embodiments of the present invention.

FIG. 6 illustrates the manner in which span metrics and trace metrics are automatically generated, in accordance with embodiments of the present invention. FIG. 6 illustrates 5 unique spans (A-E) including a root span (an initiating span) A. In an embodiment, each group of spans identified by the same span identity is associated with one or more span metrics 650. For example, a minimum span duration 630, a median span duration 631, a maximum span duration 632, a p90 latency value 633, a p99 latency value 634 and a span count (how many times a particular identity was counted) may be tracked for each span identity. A histogram corresponding to the span identity may track these metrics over fixed sized durations, e.g., 10 seconds. For example, over a 10 second window, the histogram may comprise fixed size bins that track a minimum span duration, a median span duration, a maximum span duration, a p90 value, a p99 value and a count of all spans received corresponding to a given identity. At the end of each duration, the metrics are emitted and the histogram is reset. The emitted metrics are used to generate streams of metrics data corresponding to each span identity. Each data point on a metric data stream comprises the span identity dimensions or the extended identity dimensions if the user has configured additional metadata to be extracted from the spans.

As shown in FIG. 6, in an embodiment, the initiating span A comprises a trace identity that is used to emit trace metrics 640. The initiating span A helps define an identity for a trace which allows the monitoring platform to logically group together all traces that represent the same flow through an endpoint of the application. The duration of the identity for a trace is calculated as the end time of the latest span in the trace minus the start time of its initiating span. An exemplary trace identity may be represented as the following exemplary tuple: {operation, service, isError, httpMethod, isServiceMesh}, where the operation field represents the name of the specific operation within a service that made the call, the service field represents the logical name of the service on which the operation took place, the isError field is a "TRUE/FALSE" flag that indicates whether the trace is associated with an error, the httpMethod field relates to the HTTP method of the request for the associated trace and the isServiceMesh field is a flag that indicates whether the trace is part of a service mesh. The trace metrics 640 are computed after the spans have been consolidated into a trace following a sessionization process. The trace metrics are also turned into streams of metric data similar to the metric time series associated with the spans.

Figure 7:
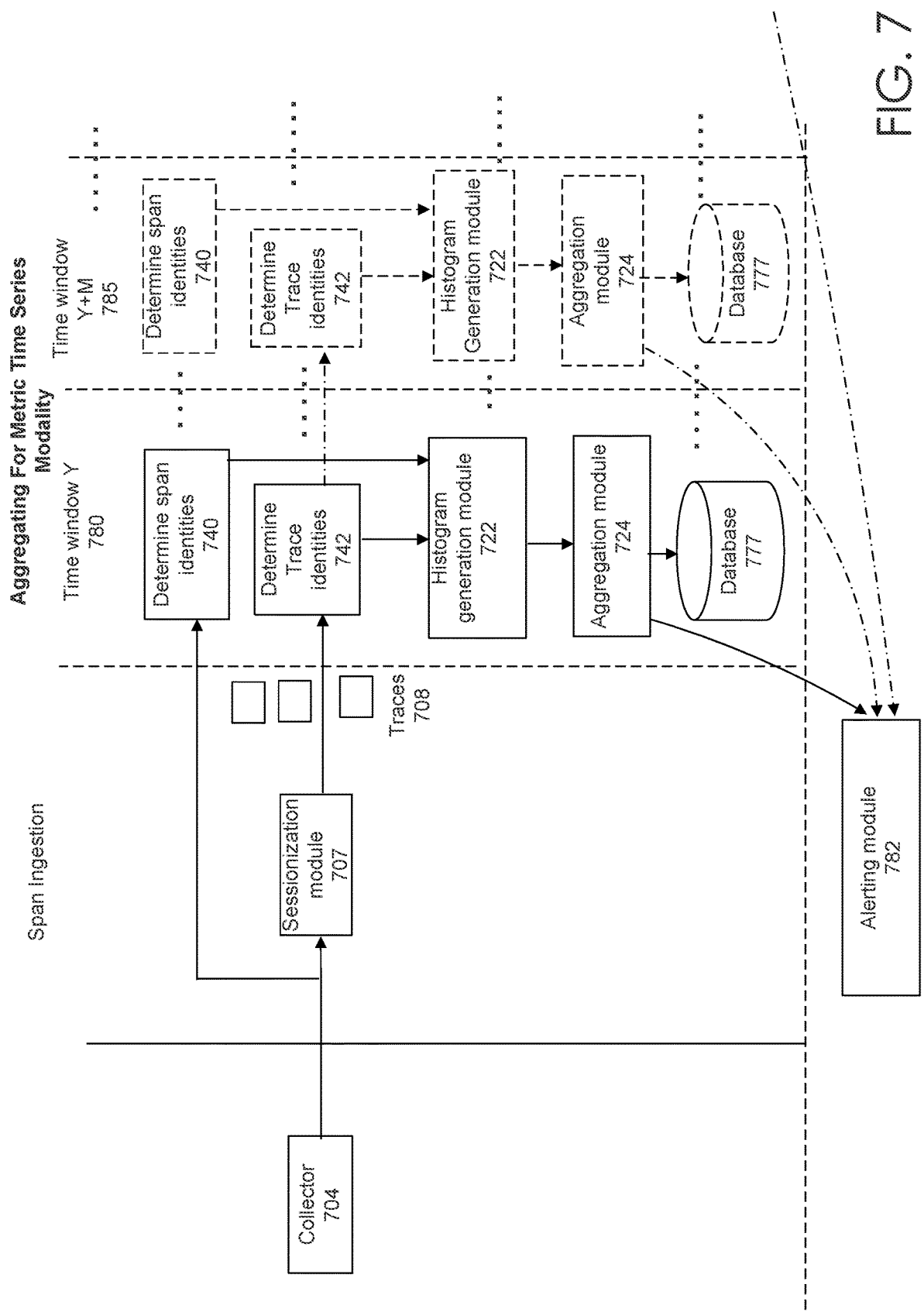
FIG. 7 is a flow diagram that illustrates an exemplary method of generating metric time series from ingested spans, in accordance with embodiments of the present invention.

FIG. 7 is a flow diagram that illustrates an exemplary computer implemented method of generating metric time series from ingested spans, in accordance with embodiments of the present invention. As mentioned previously, incoming spans are received at a monitoring service 306 from a collector 704. Prior to being sessionized, span identities are generated for the spans and the spans with identical base identities are grouped together by module 740.

In one embodiment, a histogram generation module 722 generates a histogram respective to each span identity. The histogram may represent a distribution of durations for a set of spans. Information from each incoming span (e.g., span duration information) corresponding to a given span identity is added to the fixed size bins of the respective histogram for the identity. The histogram is maintained for a fixed sized time window Y 780 (e.g., 10 seconds) after which the histogram generation module 722 emits the aggregated metrics and resets all the counters in the histogram for the next segment. Subsequently, the histogram generation module 722 generates metrics for the next duration of time Y+M 785, and emits metrics corresponding to that time window. In this way, histogram generation module periodically emits one or more metrics (e.g., six span metrics as seen in FIG. 6), including user-configured custom metrics, corresponding to each type of span to the analytics engine.

In one embodiment, the span information is also combined into traces 708 using a sessionization module 707 as discussed in connection with FIG. 5. The sessionization process may consolidate traces (from spans) within a first minute window (associated with time window Y 1480). Thereafter, the sessionization process may consolidate traces within the subsequent window (associated with time window "Y+M" 1485). Trace identities are determined for the sessionized traces 708 using module 742 after which the trace metrics (as discussed in connection with FIG. 6) are determined using the histogram generation module 722 in a process similar to the manner in which span metrics are generated.

In an embodiment, an aggregation module 724 may aggregate the periodic metric data from the histogram generation module 722 and create metric time series from the data for each span identity. In some embodiments, the aggregation module 724 may generate quantized data streams from the metric data received from the histogram generation module 722. The quantized data stream has data values occurring periodically at fixed time intervals.

In one embodiment, the aggregation module 724 may identify a function for aggregating the metric for which values are provided by one or more input data streams. The aggregation module 724 generates the quantized data streams by determining an aggregate value for each input data stream for each fixed time interval by applying the identified function over data values of the input data stream received within the fixed time interval. The aggregation module 724 may further receive a request to evaluate an expression based on the data values from the input data streams. The system periodically evaluates the expression using the data values of the quantized data streams In one embodiment, the aggregation module 724 may, for example, perform aggregations on the various metric time series to provide real-time monitoring of certain higher priority endpoints in the application. For example, aggregations may be performed to determine request, error and latency metrics for certain designated services. In order to do that, the aggregation module 724 may, for example, aggregate values across all span identities that are associated with the designated service.

Further, in some embodiments, alerting module 782 may monitor one or more metric time series from the aggregation module 724 and may be configured to generate alerts if certain metrics being monitored exhibit anomalous behavior. For example, if a maximum span duration associated with a given span identity crosses over a certain threshold, an alert configured using the alerting module 782 may be triggered. The alert may, for example, be responsive to a metric time series associated with span metric 632 from FIG. 6, wherein the alert is triggered if the maximum span duration exceeds a given threshold.

In one embodiment, the histograms generated by the histogram generation module 722 may be stored in database 777. In an embodiment, the histogram data may be stored as parquet-formatted files.

In an embodiment, the instrumentation analysis system 322 compares durations of a set of similar spans (e.g., spans for the same span identity) with the tags associated with these spans and determines whether there are any patterns for a given tag. As discussed above, the analysis system 322 generates a histogram that may represent a distribution of durations for a set of spans. For a given tag, the analysis system calculates a p-value indicating the likelihood that the ranks of the spans for that tag in the distribution arose by chance. In particular, the analysis system may calculate a p-value of the Mann-Whitney U-statistic comparing the ranks of the durations of the traces having the tag to the other traces in the distribution. A larger U-statistic indicates that the spans for that tag skew rightward, i.e., that they tend to have long durations relative to other spans in the distribution. The analysis system can provide alerts regarding the tags whose spans have relatively long duration. Long duration spans may be indicative of configuration problems at the instrumented systems. The analysis system may correct the p-value for the number of hypotheses tested, for example by multiplying the p-value by the total number of tags. This procedure defines a map from tags to non-negative real numbers. The analysis system sorts the tags by the associated p-value (e.g., in ascending order) and returns those with p-value less than or equal to some threshold, e.g., 0.01.

4.1.2. Real-Time Monitoring Using Metric Time Series Data

Figure 8:
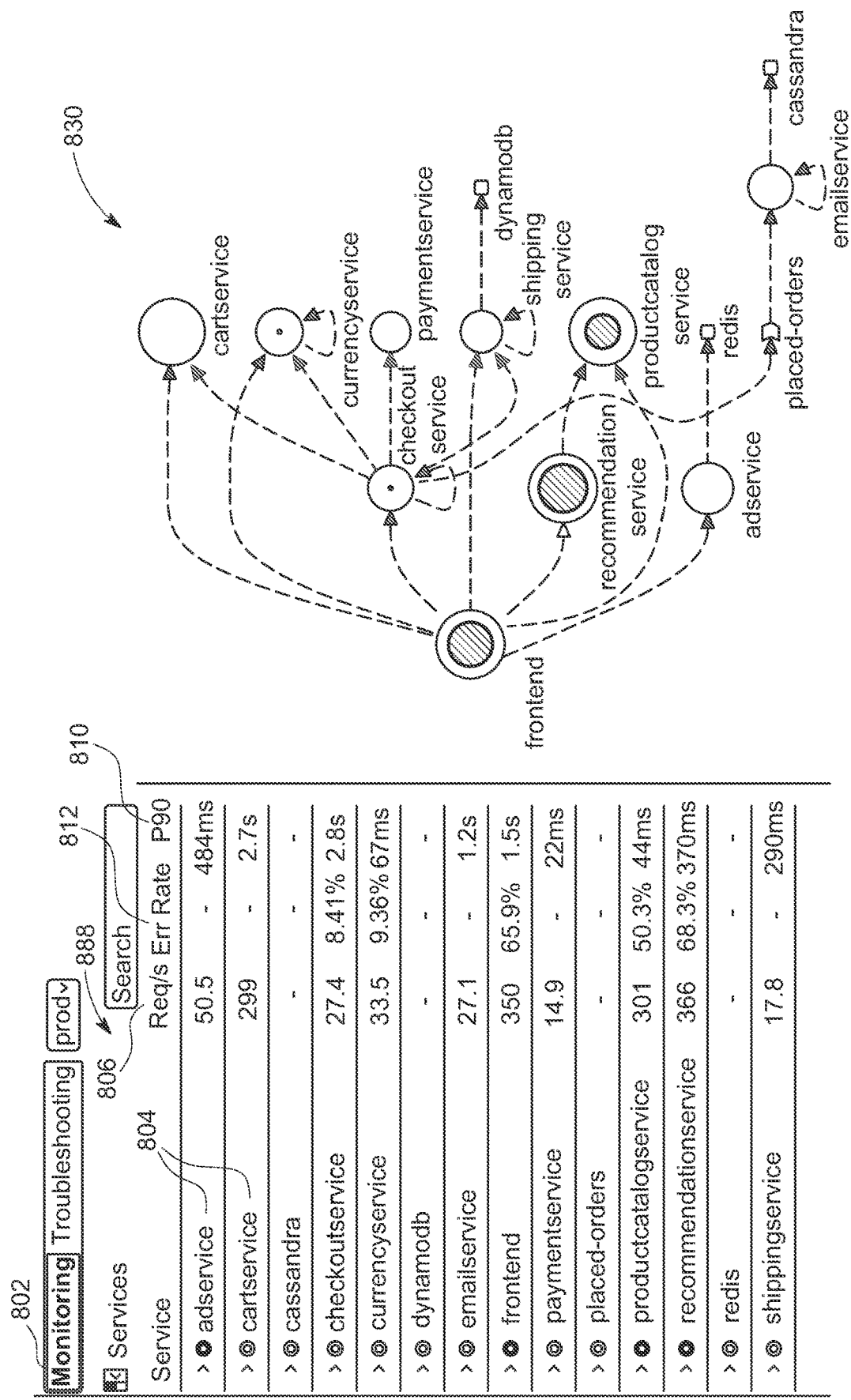
FIG. 8 illustrates an exemplary on-screen GUI illustrating a monitoring mode for an application displaying metric values aggregated from metric time series data, in accordance with embodiments of the present invention.

FIG. 8 illustrates an exemplary on-screen GUI illustrating a monitoring mode for an application displaying metric values aggregated from metric time series data, in accordance with embodiments of the present invention. In one embodiment, the GUI of FIG. 8 displays a monitoring mode indication when a corresponding monitoring mode option 802 is selected. The monitoring mode displays a panel 888 listing services 804 comprised within the application being monitored. Each service is displayed alongside metrics pertaining to requests/second 806, error rate 812 and P90 latency values 810. The metrics data displayed in the panel 888 is computed in real-time and is aggregated using the metric time series data. In an embodiment, an aggregation module similar to the aggregation module 724 discussed in connection with FIG. 7 performs the necessary aggregations from the various metric time series to display metrics associated with each of the services. The service level KPIs may be computed through the real-time aggregation pipeline discussed in connection with FIG. 7 before the histogram metadata is stored in the backend of the analytics engine.

The monitoring mode also comprises an application topology graph 830. The service graph 830 facilitates visualizing cross-service relationships between services comprised within the application and external to the application (as will be discussed further in connection with the metric events modality). In an embodiment, the service graph may be created using information gleaned from the metric time series data aggregated by the aggregation module 724 discussed in connection with FIG. 7.

By ingesting up to 100% of the incoming spans from the client software and implementing monitoring service 306 as a Software as a Service (SaaS) based service offering, embodiments of the present invention advantageously retain valuable information pertaining to the spans that is further analyzed in the SaaS backend. Span identities and histogram information (e.g., various counts and metrics data) associated with the incoming spans that are stored may be used to conduct further analysis. For example, metadata may be analyzed to identify certain offending services or operations, and data regarding those services or operations may be surfaced for further analysis.

Conventional monitoring systems typically expunged the span data after extracting the relevant metrics from them. By comparison, embodiments of the present invention retain high-fidelity information related to all the incoming spans for deeper analysis. The metadata retained provides a user the ability to filter based on certain dimensions and services that would not have been possible using conventional monitoring systems. Further, the metadata retained may be used in conjunction with data sets for other modalities such as metric events and full-fidelity to allow a user to provide a thorough investigation of an alert.

In one embodiment, using, for example, the "service," "operation," and "kind" fields in the tuple, the aggregation module 724 (from FIG. 7) may be able to determine span identities associated with cross-service calls. Spans associated with inter-service calls are of interest to a user because they provide user information regarding the manner in which two services within an application are interacting.

Embodiments of the present invention are able to advantageously use the metadata saved for the metric time series to perform post-processing and determine services associated with inter-services calls. For example, the value of the "kind" field related to a span identity may be either "client" or "server" where the analytics engine may be able to use that information in post-processing to determine if the span is related to a cross-service call.

If it is determined that a particular span is related to a cross-service call, those spans could be processed through the analytics engine to discover further information regarding the dependencies. For example, in one embodiment, if a user identifies a span identity associated with a cross-service call or a span identity associated with a high value operation, the user may create an extended identity for the corresponding span identities and supplement those identities with additional custom dimensions to be monitored. For example, the user may want to monitor a customer name association with such spans. The user may simply reconfigure the analytics engine to extract the additional customer name dimension as part of the spans' extended identity.

Retaining span information associated with incoming spans provides a user additional metadata to perform intelligent processing. In an embodiment, the user may only collect data pertaining to select operations. In other words, the user may filter out data pertaining to select operations that are of less interest to a user.

The number of unique span identities may typically roughly correlate with the number of unique operation names present on the span. In an embodiment, the user is able to turn off or filter out span identities associated with certain operations if they are not particularly useful. In other words, the monitoring platform can be configured to turn off metric generation related to selected span identities. This advantageously reduces loads on the metrics analytics engine because it does not need to track and store metric time series for spans that are of little interest to a user. For example, spans associated with calls that a service makes to operations internal to the service do not convey information and can be filtered. Accordingly, additional resources can be directed towards processing spans associated with services and operations that are of greater interest to a user. Conventional monitoring systems by comparison would not have the flexibility to selectively focus on spans associated with high value services or operations by filtering out the less valuable spans.

Figure 9:
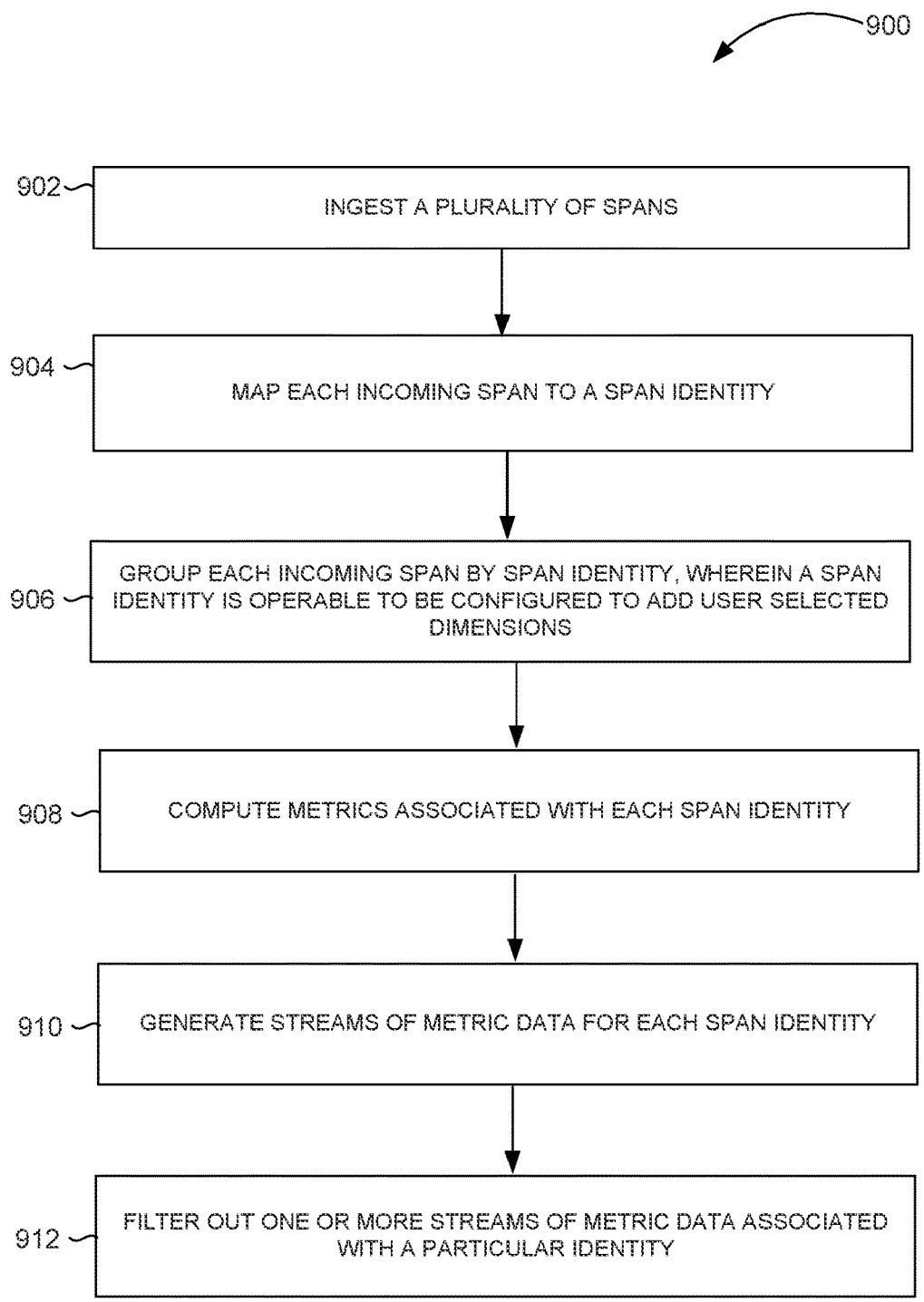
FIG. 9 presents a flowchart illustrating a computerized process to create a trace error signature starting with a root cause error span, in accordance with embodiments of the present invention.

FIG. 9 presents a flowchart illustrating a computerized process to create a trace error signature starting with a root cause error span, in accordance with embodiments of the present invention. Blocks 902-912 describe exemplary steps comprising the process 900 depicted in FIG. 9, in accordance with the various embodiments herein described. In one embodiment, the process 900 is implemented at least in part as computer-executable instructions stored in a computer-readable medium and executed in one or more processing devices.

At block 902, a plurality of spans are ingested into a cloud-based monitoring platform. At block 904, each incoming span is associated with a unique span identity. At block 906, spans are grouped by span identity, where a span identity can be extended to include additional custom configured dimensions.

At block 908, a histogram associated with each span identity is generated to compute metrics (e.g., six metrics discussed in connection with FIG. 6) for each span identity. At block 910, streams of metric data (metric time series) can be generated for each span identity.

At block 912, metric data pertaining to certain operations of no interest to a user may be filtered out. This way metrics data pertaining to only high value operations may be aggregated.

4.2. Metric Events

The metric event modality generates and stores aggregated rows of metrics values for selected indexed tags from the incoming trace data for given time durations. The selected tags may, for example, be indexed from the incoming spans when the spans are ingested. Metrics data may, for example, comprise, but is not limited to, number of requests (e.g., between two services), number of errors and latency. The aggregated rows of metrics data are stored efficiently for fast aggregation. The metric events data may be rapidly vectorized and aggregated in response to queries from a user.

Figure 10:
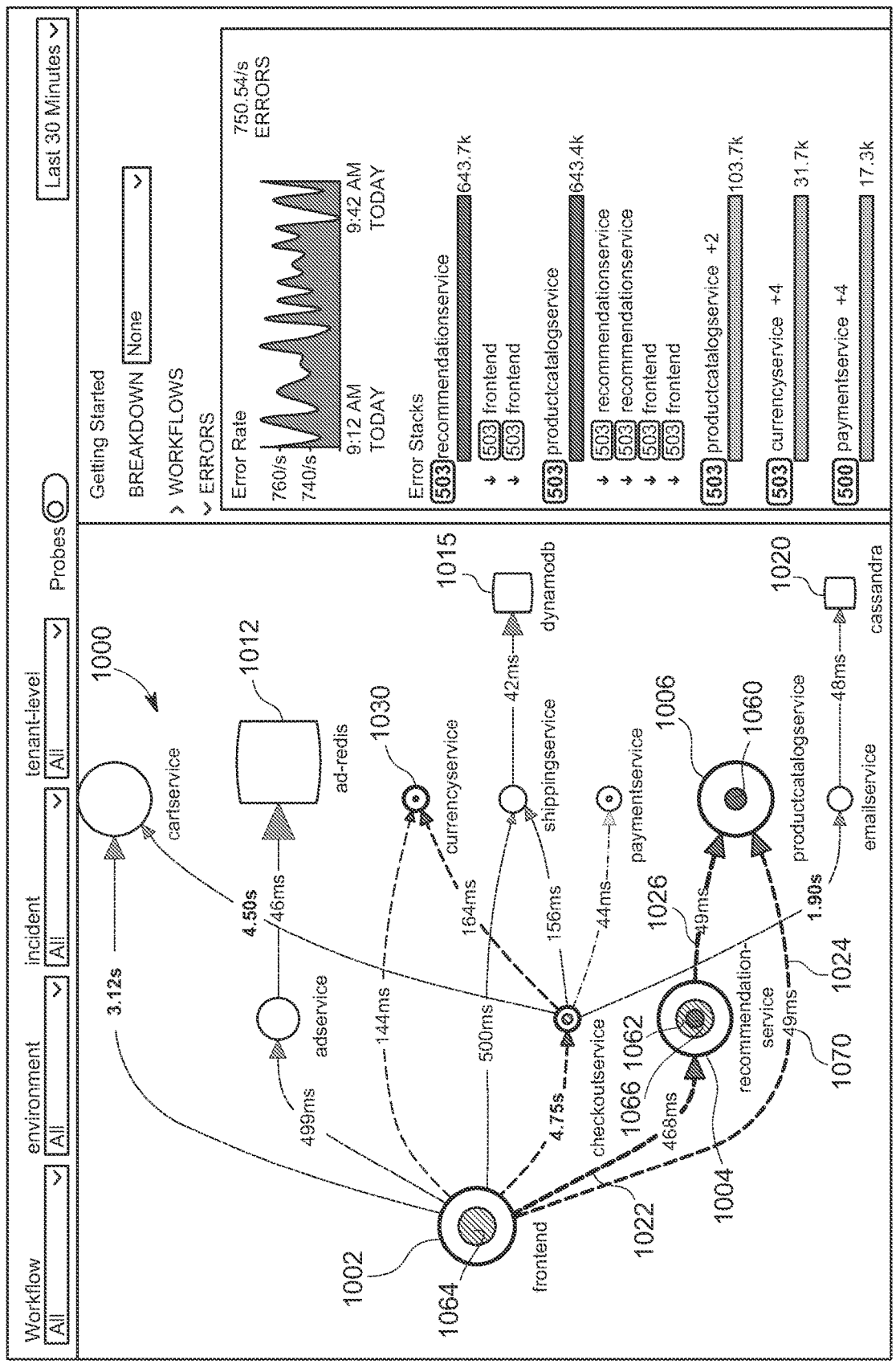
FIG. 10 illustrates an exemplary on-screen GUI comprising an interactive topology graph for an application created from the aggregated metric events data, in accordance with embodiments of the present invention.

Embodiments of the present invention use the aggregated rows of metrics data created in association with the metric events modality to generate a full-context application topology graph using the metric events data (e.g., by module 522 in FIG. 5). FIG. 10 illustrates an exemplary on-screen GUI comprising an interactive topology graph for an application created from the aggregated metric events data, in accordance with embodiments of the present invention. The service graph facilitates visualizing cross-service relationships between services comprised within the application and external to the application. The exemplary GUI of FIG. 10 also enables customers to track the causal chain of operations resulting in an error.

It should be noted that the service graph may also be generated using the metric time series data as noted earlier, however, storage for the metric events data set may be significantly less because it does not need to store as much metadata as metric time series data. Accordingly, generating the service graph using metric events data is more efficient from a storage standpoint.

FIG. 10 illustrates an on-screen GUI comprising an interactive full-context service graph 1000, which is constructed for an exemplary microservices-based application using the metrics data generated in connection with the metric events modality. Each circular node (e.g., nodes associated with services 1002, 1004 and 1006 of FIG. 10) represents a single microservice. Alternatively, in an embodiment, a circular node may also represent a group of multiple microservices, where the GUI for the monitoring platform (associated with, for example, the monitoring service 306) provides a client the ability to expand the node into its sub-components.

In an embodiment, services that are part of the client's application may be represented differently from services that are external to the client's application. For example, circular nodes (e.g., nodes associated with services 1002, 1004 and 1006) of the exemplary application represented by service graph 1000 are associated with services comprised within the client's application. By contrast, squarish nodes (e.g., nodes associated with databases dynamodb 1015, Cassandra 1020, ad-redis 1012) are associated with services or databases that are external to the client's application.

A user may submit a request at the front-end service 1002; the user's request at the front-end service 1002 may set off a chain of subsequent calls. For example, a request entered by the user at the front end of the platform may generate a call from the front-end service 1002 to the recommendation service 1004, which in turn may generate a further call to the product catalog service 1006. As noted previously, a chain of calls to service a request may also comprise calls that a service makes to internal sub-functions or operations within the same service.

Each edge in the service graph 1000 (e.g., the edges 1022, 1024 and 1026) represents a cross-service dependency (or a cross-service call). The front-end service 1002 depends on the recommendation service 1004 because it calls the recommendation service 1004 Similarly, the recommendation service 1004 depends on the product catalog service 1006 because it makes a call to the product catalog service 1006. The directionality of the edge represents a dependency of a calling node on the node that is being called. Each of the calls passes the Trace ID for the request to the respective service being called. Further, each service called in the course of serving the request could potentially generate several spans (associated with calls to itself or other services). Each of the spans generated will then carry the Trace ID associated with the request, thereby, propagating the context for the trace. Spans with the same Trace ID are, thereafter, grouped together to compose a trace.

In some embodiments, the GUI comprising service graph 1000 may be configured so that the nodes themselves provide a visual indication regarding the number of errors that originated at a particular node versus errors that propagated through the particular node but originated elsewhere. In an embodiment, the high-cardinality metrics data aggregated in association with the metric events modality may be used to compute the number of errors that are used to render the nodes of the service graph.

For example, as shown in the service graph of FIG. 10, the front-end service 1002 makes calls to the recommendation service 1004. Errors may be generated at the recommendation service 1004 not only in response to calls from the front-end service 1002, but also in response to calls that the recommendation service 1004 makes to itself (e.g., in response to sub-functions or operations that are part of recommendation service). For such errors, the recommendation service 1004 would be considered the "originator" for the error. The recommendation service 1004 also makes calls to the product catalog service 1006 and these calls may result in their own set of errors for which the product catalog service 1006 would be considered the error originator. The errors originating at the product catalog service 1006 may propagate upstream to the front-end service 1002 through the recommendation service 1004; these errors would be observed at the recommendation service 1004 even though the recommendation service 1004 is not the originator of those errors.

It is appreciated that conventional monitoring technologies would not provide adequate means for a client to distinguish between errors that originated at the recommendation service 1004 versus errors that propagated through the recommendation service 1004 but originated elsewhere. By performing computations using the metrics data associated with the metric events modality, embodiments of the present invention are able to render a service graph that visually indicates critical information regarding the services in an architecture, e.g., number of requests between services, the number of errors generated by a service, number of errors for which the service was the root cause, etc. The service graph 1000 allows clients the ability to visually distinguish between errors that originated at the recommendation service 1004 as compared with errors that simply propagated through the recommendation service 1004. As shown in FIG. 10, the node associated the recommendation service 1004 comprises a solid-filled circular region 1066 and a partially-filled region 1062, where the region 1066 represents errors that originated at the recommendation service 1004 while the region 1062 represents errors that propagated through the recommendation service 1004 but originated elsewhere (e.g., at the product catalog service 1006).

Similarly, solid-filled region 1060 within the node associated with the product catalog service 1006 represents the errors that originated at the product catalog service. Note that the errors returned by the product catalog service 1006 originated at the product catalog service. In other words, the product catalog service 1006 does not have errors from another downstream service propagating through it because it does not make calls to another service that is further downstream in the execution pipeline. Conversely, the front-end service 1002 comprises a partially-filled region 1064 because the errors observed at the front-end service 1002 propagated to it from other downstream services (e.g., the recommendation service 1004, the currency service 1030, the product catalog service 1006, etc.) The front-end service 1002 was not the originator of errors in the example shown in FIG. 10. Note that in other embodiments solid-filled regions (e.g., region 1066) and partially-filled regions (e.g., region 1064) may be represented differently. For example, different shades, patterns, or colors may be used to distinguish these regions from each other.

Embodiments of the present invention use the aggregated rows of metrics data created for the metric events modality to determine full-fidelity SLIs associated with the services in an application (e.g., by the module 522 in FIG. 5). An SLI is a service level indicator—a defined quantitative measure of some aspect of the level of service that is provided. The SLIs are aggregated and extracted for the various services in a microservices architecture so that the behavior of applications may be understood. Most clients consider request latency—how long it takes to return a response to a request—as a key SLI. Other common SLIs include the error rate (often expressed as a fraction of all requests received) and system throughput, typically measured in requests per second. The measurements are often aggregated over a measurement window using the metrics data associated with the metric events modality and then turned into a rate, average, or percentile.

In one embodiment, the GUI comprising service graph 1000 is interactive, thereby, allowing a developer to access the SLIs associated with the various nodes and edges within the application by interacting with respective portions of the service graph. Referring to FIG. 10, in an embodiment, a client may be able to hover their cursor over various regions of the on-screen displayed service graph 1000, including but not limited to the nodes (e.g., the nodes associated with services 1004, 1006 etc.) and edges (e.g., the edges 1022, 1026, etc.), to receive SLI-related information for the associated microservices through a pop-up window or other interface.

Figure 11:
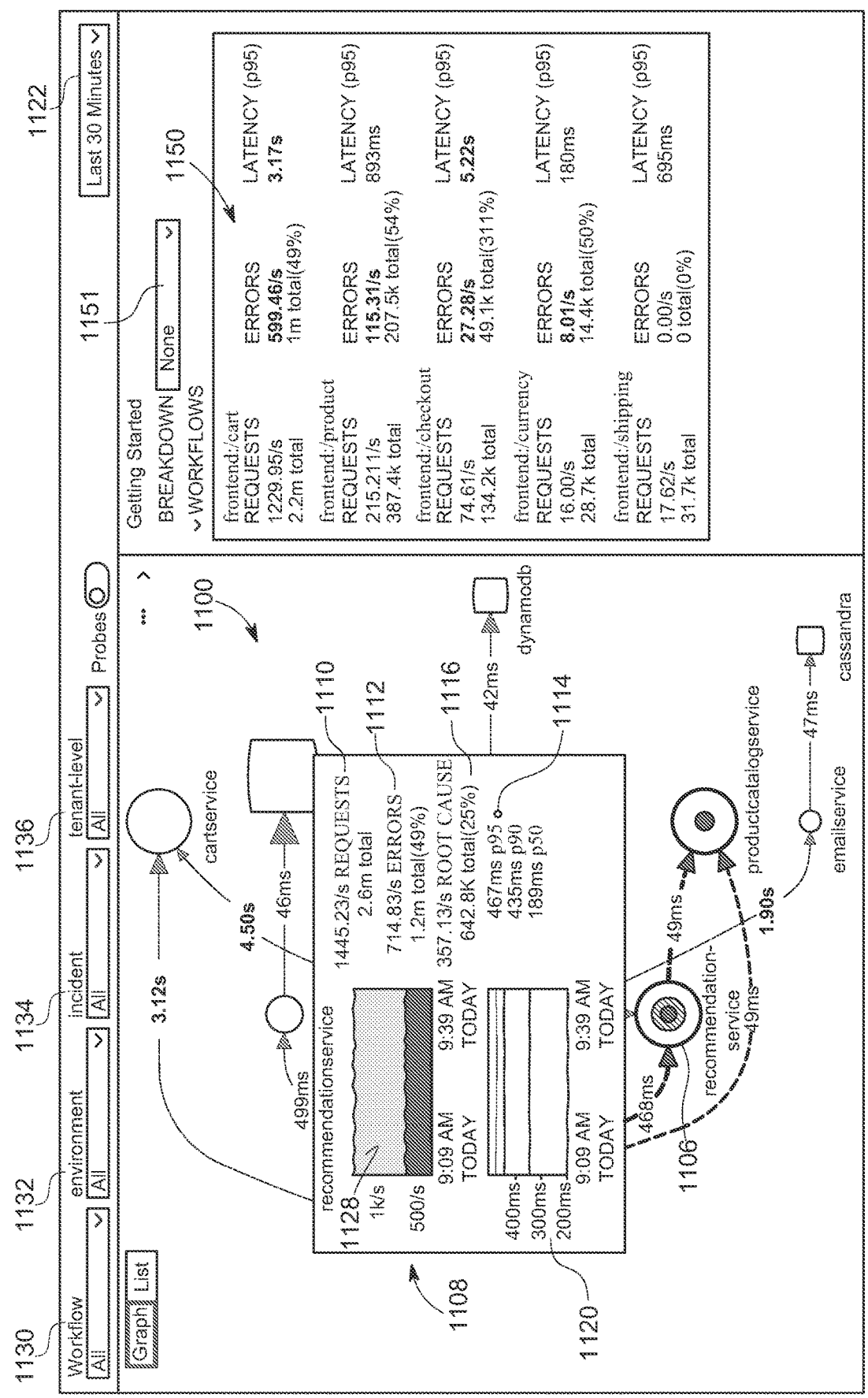
FIG. 11 illustrates an exemplary on-screen displayed GUI showing the manner in which a client may access SLIs pertaining to a service within an interactive topology graph, in accordance with embodiments of the present invention.

FIG. 11 illustrates an exemplary on-screen displayed GUI showing the manner in which a client may access SLIs pertaining to a service within an interactive topology graph, in accordance with embodiments of the present invention. As shown in FIG. 11, when a client hovers the cursor over the node associated with, for example, the recommendation service 1106, a pop-up window 1108 is overlaid on the service graph 1100 comprising SLIs pertaining to the recommendation service 1106. Specifically, SLIs pertaining to Requests 1110, Errors 1112 and Latency percentiles 1114 are provided. Furthermore, in an embodiment, information pertaining to Root Cause 1116 is also provided to the client.

For example, the SLIs related to Requests 1110 comprise information regarding the rate of requests and number of requests serviced by the recommendation service 1106 during a specific time duration. The time duration over which the SLIs are calculated may be adjusted using drop-down menu 1122. The time duration over which SLIs are calculated may vary, for example, from 1 minute to 3 days. As indicated by the time axis on hover chart 1128, for this example, a time window of 30 minutes (from 9:09 to 9:39 a.m.) is selected.

In an embodiment, the pop-up window 1108 also provides the client information pertaining to SLIs related to Errors 1112. In the example of FIG. 11, the pop-up window 1108 provides information regarding the error rate and the total number of errors that occurred during the specified time duration. The client is also provided information regarding what percentage of the total number of requests resulted in errors.

In an embodiment, the pop-up window 1108 also provides the client information pertaining to Latency Percentiles 1114 and a graphical representation 1120 of the same. For example, SLI p95 indicates that for 95% of the users, the latency for servicing the requests was less than 467 ms. Latency-related SLIs also include information regarding p90 and p50 percentiles. The graphical representation 1120, in the example of FIG. 11, shows the latency information regarding the p95 percentile graphically.

In one embodiment of the present invention, the pop-up window 1108 also displays information pertaining to errors for which the selected service was the root-cause. The Root Cause information 1116 includes the number of errors for which the selected service (e.g., the recommendation service 1106 in the example of FIG. 11) was the originator, the associated error rate and the percentage of the total number of requests that represents. In this way, embodiments of the present invention, in addition to providing clients visual cues for identifying root cause error originators, are also able to provide meaningful and accurate quantitative information to help clients distinguish between root cause-related errors and errors associated with downstream causes.

Note that the SLIs displayed in the pop-up window 1108 are computed accurately using the metrics data gathered for the metric events modality. Because embodiments of the present invention are able to ingest up to 100% the incoming span data (without sampling), the SLIs are computed factoring in all the incoming data, which results in accurate measurements. For the example of FIG. 11, there were a total of 2.6 million requests served by the recommendation service 1106 at a rate of 1445.23 requests/second ("sec"). Of these, 1.2 million of the requests resulted in errors at a rate of 714.83/sec, which represents approximately 49% of the total number of requests. In this way, embodiments of the present invention provide a modality of analysis that enables a client to gather critical SLIs pertaining to the recommendation service 1106 including an indication of how many of the errors originated at the recommendation service 1106.

Figure 12:
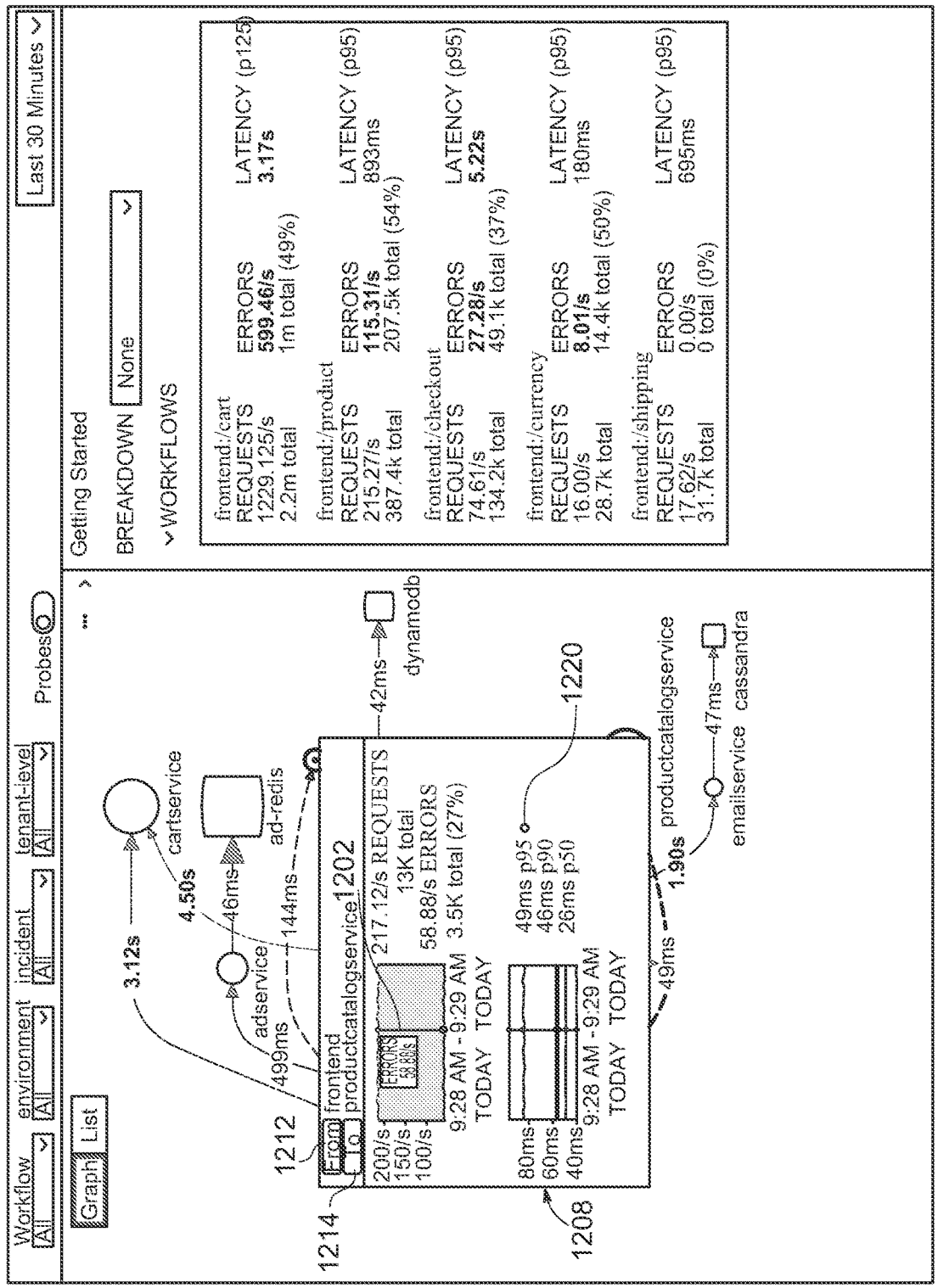
FIG. 12 illustrates an exemplary on-screen GUI showing the manner in which a client may access SLIs pertaining to an edge within an interactive topology graph, in accordance with embodiments of the present invention.

FIG. 12 illustrates an exemplary on-screen GUI showing the manner in which a client may access SLIs pertaining to an edge within an interactive topology graph, in accordance with embodiments of the present invention. The SLIs pertaining to edges are also computed using the metrics data associated with the metric events modality. As shown in FIG. 12, if a user hovers over or selects a particular edge, e.g., the edge 1024 (as shown in FIG. 10) (which represents the cross-service dependency of the front-end service 1002 on the product catalog service 1006) a pop-up dialog box 1208 opens up on-screen that reports SLIs specific to the dependency. The "From" field 1212 represents the service that executes the call and the "To" field 1214 represents the service that is called (the service that the calling service depends on). As shown in the dialog box 1208, SLIs pertaining to the number of requests (or calls) that were made, the number of those that returned in errors, and the latency associated with servicing the requests are provided. It should be noted that a latency value 1220 of 49 ms shown in FIG. 12 for this particular dependency may be annotated directly on the edge of the service graph. For example, as shown in service graph 1000 of FIG. 10, edge 1024 of the service graph 1000 in FIG. 10 indicates the latency value 1070 (e.g., 49 ms) directly on the edge in the service graph allowing a client to efficiently gather information regarding latency associated with the dependency.

In an embodiment, as shown in FIG. 10, the edges within the application topology graph are annotated with their corresponding latency values. In this way, embodiments of the present invention efficiently compute SLI data from the metrics information aggregated for this modality and advantageously enable developers to gather meaningful and accurate information regarding cross-service dependencies directly from the service graph 1000.

In one embodiment, the metrics data associated with the metric events modality are used to compute accurate SLIs across multiple dimensions. Further, embodiments of the present invention support high dimensionality and high cardinality tags for the metric events modality. In one embodiment, the GUI of FIG. 11 may display one or more attribute (or tag) categories that comprise dimensions that may be varied across the service graph 1100. For example, attribute categories (e.g., Workflow 1130, environment 1132, incident 1134 and tenant-level 1136) may be depicted within the GUI, each of which may correspond to attributes that may be varied to compute SLIs and error-related information for different combinations of the attributes. The categories of dimensions across which the SLIs may be computed, include, but are not limited to, workflow 1130, environment 1132, incident 1134 and tenant-level 1136. Each of the categories comprises a drop-down menu with options for the different dimensions. The metrics events data allows users to easily and rapidly compute measurements across various cross-combinations of tags or attributes.

In an embodiment, the GUI may include a panel 1150 that may display SLIs across the various workflows. Further, the GUI allows users the ability to break down the workflows across multiple different attributes using drop down menu 1151. The computations for each of the break-downs may be efficiently determined using the metrics data aggregated for the metric events mode.

Figure 13:
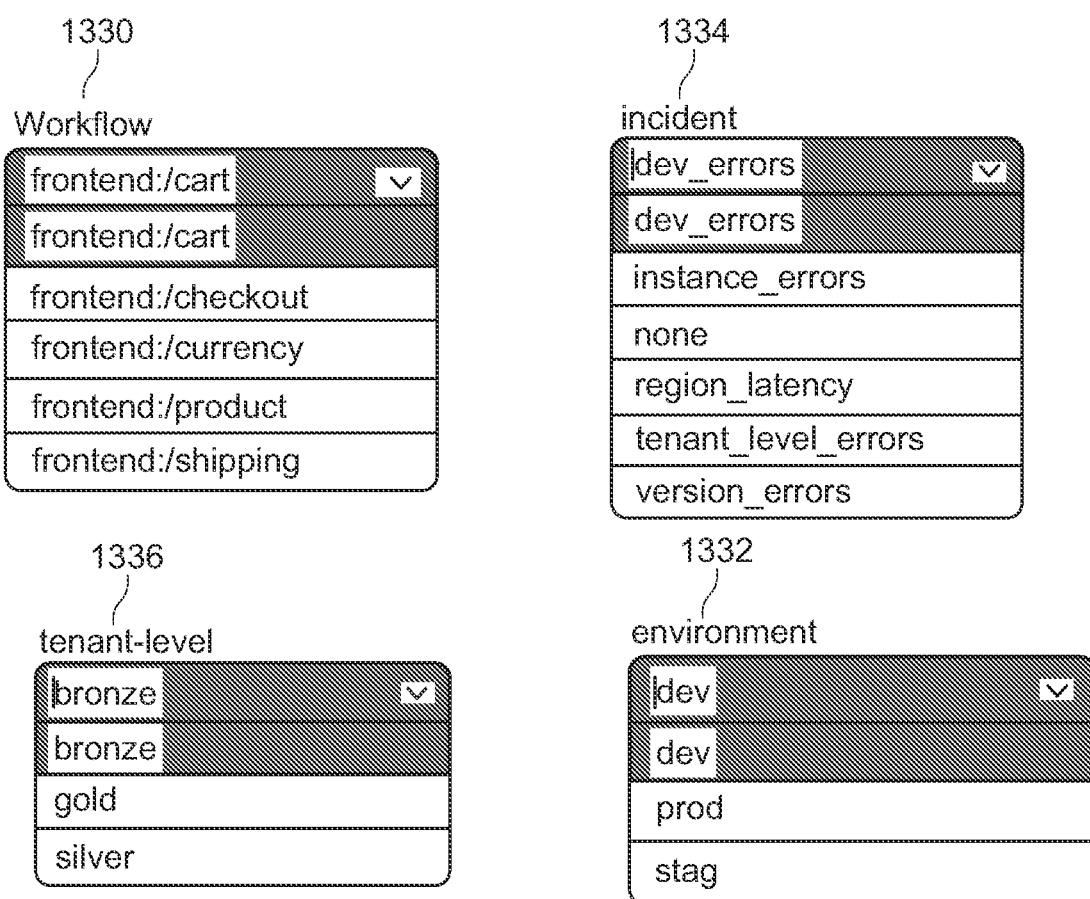
FIG. 13 illustrates on-screen displays that represent exemplary categories of dimensions across which SLIs may be computed, in accordance with embodiments of the present invention.

FIG. 13 illustrates on-screen displays that represent exemplary categories of dimensions across which SLIs may be computed, in accordance with embodiments of the present invention. The exemplary category of dimensions corresponds to the categories associated with drop-down menus (e.g., 1130, 1132, 1134 and 1136) discussed in connection with FIG. 11. The metrics data aggregated using the metric event modality allows users to easily and rapidly compute measurements across various cross-combinations of attributes. Drop-down on-screen menu 1330, corresponding to workflow, illustrates different workflows specific to the application discussed in connection with FIG. 10. A "workflow" is a type of category of dimension of the request that was processed; a workflow may be conceptualized as a type of "global tag" that is attributed to each span in a given trace. A workflow may, for example, be associated with a type of business action, e.g., "checkout," that is generated on the back-end in response to a request.

Similarly, drop down on-screen menus 1334, 1336 and 1332, relating to incident, tenant-level and environment respectively, provide further categories of dimensions across which SLIs may be computed. Each of the drop down on-screen menus 1330, 1332, 1334 and 1336 comprises various dimensions (associated with the respective categories) across which aggregations may be made. For example, the user may submit a query asking for the number of requests in a trace where "Workflow=frontend:/cart" and "incident=instance_errors" and "tenant-level=gold." By aggregating metrics data associated with the indexed tags, the metric events modality is able to respond to the user's query rapidly and efficiently.

Note that SLIs may be computed for each attribute of the categories in FIG. 13 and also for each combination of attributes associated with the categories. In an embodiment, for each combination of attributes selected using one or more of the drop-down menus, the client may be able determine the computed SLIs (e.g., by hovering a cursor over the various nodes and edges of the graph after the dimensions have been selected using, for example, the drop-down menus shown in FIG. 11). In this way, embodiments of the present invention enable a client to use the metric events modality to slice the application topology graph across several different attributes.

It should be noted that clients might have different attributes or dimensions that may be of interest for their respective application. In an embodiment, the monitoring platform may be configured to provide insight into client-specific dimensions. Consequently, the specific attributes or dimensions available in each of the drop-down menus may vary by client.

4.2.1. Metric Events Data Generation and Persistence

Figure 14:
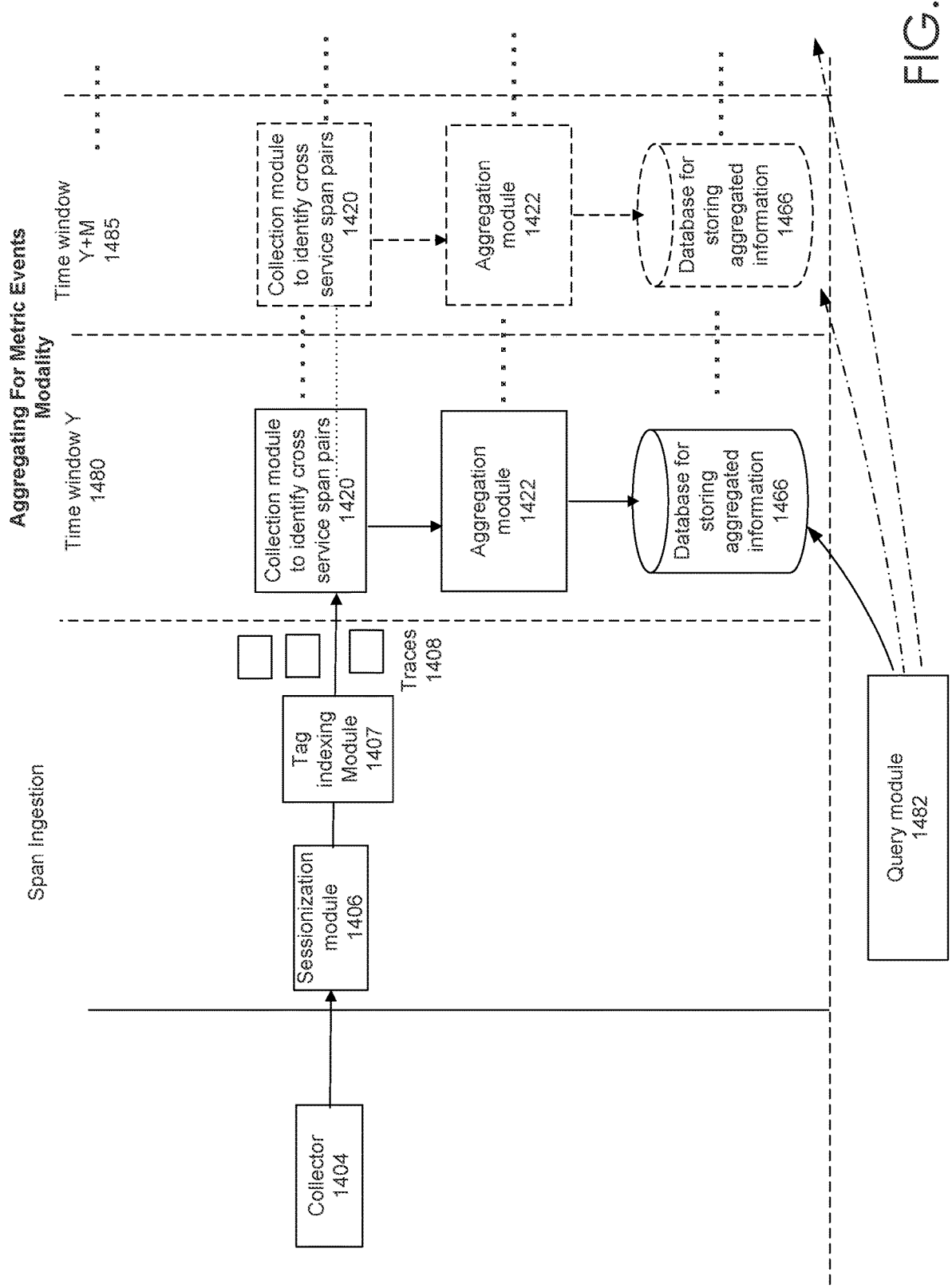
FIG. 14 is a flow diagram that illustrates an exemplary method of aggregating metrics data from ingested traces for the metric events modality, in accordance with embodiments of the present invention.

FIG. 14 is a flow diagram that illustrates an exemplary method of aggregating metrics data from ingested traces for the metric events modality, in accordance with embodiments of the present invention. As mentioned previously, span information is received at a monitoring service 306 from a collector 1404. The span information is then combined into traces 1408 in real time using module 1406 in a process called sessionization as discussed in connection with FIG. 5. The sessionization process may consolidate traces (from spans) within a first time window (associated with time window Y 1480) before transmitting the traces to the collection module 1420. Thereafter, the sessionization process may consolidate traces within the subsequent window (associated with time window "Y+M" 1485).

Subsequent to consolidation, the trace data is indexed by tag indexing module 1407, which indexes one or more tags in the trace data. The tags may be client-selected tags or tags that the monitoring platform is configured to index by default. In one embodiment, the metric events modality indexes a subset of tags associated with the spans of a trace, but indexes that set of tags with perfect accuracy because the metrics calculated take into account all the ingested spans.

In one or more embodiments, collection module 1420 receives one or more traces 1408 generated within a predetermined time window Y 1480, and traverses the traces to identify and collect cross-service span pairs that represent cross-service calls. To collect the cross-service span pairs, the collection module 1420 identifies parent-child span pairs in a given trace where the service name for the parent and the child are different. Stated differently, the collection module 1420 will collect each pair of spans that has a parent-child relationship and where each of the two spans in the pair are associated with a different service. The service name of a span may be identified in a span-level tag included with each span. Alternatively, there may be other conventions for identifying a service name associated with a span, e.g., a special field within the span for the service name.

Identifying and collecting the cross-service span pairs from the incoming spans are advantageous because they enable the monitoring platform to track information that will be most relevant to a user, e.g., to render the service graph and display the SLIs associated with the various dependencies between services. Spans associated with calls to internal operations that a service might make may not be of interest to an application owner and may, therefore, be ignored by the collection module 1420 when determining the cross-service span pairs.

It should be noted that, in one embodiment, once the cross-service span pair is identified, indexed tags may be extracted for the cross-service span pair by determining a service tier for the respective parent and child spans of the span pair. A service tier is a subset of spans in a trace that logically identifies a single request to a service. Accordingly, both a parent span and a child span in the cross-service span pair are associated with a respective subset of related spans known as a service tier. Indexed tags are extracted by the collection module 1420 from service tiers associated with a cross-service span pair. In a different embodiment, however, the tags may be extracted directly from the parent span and child span in a cross-service span pair rather than the respective service tier associated with the parent span or child span.

In one or more embodiments, once the cross-service span pairs are collected and the indexed tags extracted from the respective service tiers, the collection module 1420 maps one or more selected tags for each service in the cross-service span pair to tag attributes, e.g., selected tags in a parent span (associated with the originating service) are mapped to a "FROM" tag attribute and selected tags in a child span (associated with the target service) are mapped to a "TO" tag attribute. This enables directionality information for the cross-service calls to be preserved. It will be appreciated that while the discussion herein focuses on "FROM" and "TO" tag attributes to indicate the direction of the dependency between services in a cross-service call, there may be several different ways to record dependency information between the two services.

In one embodiment, the aggregation module 1466 of the monitoring platform aggregates across the cross-service span pairs by maintaining a count for each unique set of "FROM" tag attributes (and their corresponding values) to "TO" tag attributes (and their corresponding values) for a cross-service pair. It should be appreciated that in this embodiment, counts are maintained at the tag level for the cross-service span pair (rather than at the service level). Accordingly, a separate count is maintained for each set of parent span tags (mapped to a "FROM" tag attribute) and child span tags (mapped to a "TO" tag attribute) for a cross-service pair. The count is increased each time the aggregation module encounters the same unique set of "FROM" tag attributes (associated with tags of a parent span) and "TO" tag attributes (associated with tags of a child span) for the same cross-service span pair in one or more traces.

In a different embodiment, the count may be maintained at the service level. Accordingly, the count may be increased each time the same cross-service span pair is encountered within the trace information ingested from the client.

The aggregation module 1422 advantageously prevents duplication by storing a single instance of each unique set of "FROM" tag attributes and "TO" tag attributes for a given cross-service span pair with an associated count in the storage module 1466. The information in the storage module 1466 may be accessed by querying module 1482 where the querying module 1482 determines that the query is associated with the metric events modality. The querying module 1482 may, for example, be associated with the query engine and reporting system 324 discussed in FIG. 3.

The aggregated cross-service "FROM" and "TO" tag attribute sets and associated count values stored in the storage module 1466 may be used by the querying module 1482 to respond to queries in accordance with the metric events modality. Note that the collection and aggregation process is repeated for subsequent time windows (including window Y+M 1485) after time window Y 1480. In this way, the aggregation process is performed over time. This allows the metric events modality to deliver query results over varying time durations (as discussed, for example, in connection with the drop-down menu 1122 in FIG. 7).

FIG. 15 is a table illustrating an exemplary manner in which selected tags for each service in a cross-service span pair may be mapped to tag attributes and stored as part of a memory-resident data object associated with an edge in the service graph, in accordance with embodiments of the present invention. As noted above, in one or more embodiments, once the cross-service span pairs are collected, the monitoring platform maps selected tags associated with each service in the cross-service span pair to tag attributes, e.g., selected tags in a parent span are mapped to a "FROM" tag attribute and selected tags in a child span are mapped to a "TO" tag attribute. The mapping is performed to allow directionality information for the cross-service calls to be preserved. For example, a data object for an "edge" (corresponding to an edge or dependency in the topology graph) may be created that comprises both the FROM-type of tag attributes and the TO-type of tag attributes. In one embodiment, one or more edge data objects similar to the one shown in FIG. 15 is used to persist the data for the metric events modality (in addition to node data objects which will be discussed in connection with FIG. 16B).

The table of FIG. 15 illustrates an exemplary manner of storing a data object associated with an edge in the service graph. The table comprises two services, Service A and Service B, in an application. Both Service A and Service B comprise indexed tags "span.kind" and "region." Tag "span.kind" may have two possible values, "client" and "server." Similarly, tag "region" may have two possible values, "us-west" and "us-east."

If all possible combinations exist in Service A, there may be 4 unique tag combinations associated with the "FROM" tag attribute, e.g., {(span.kind=client, region=us-west) (span.kind=client, region=us-east) (span.kind=server, region=us-west) (span.kind=client, region=us-east). Similarly, if all possible combinations exist in Service B, there may also be 4 unique tag combinations associated with the "TO" tag attribute. Assuming there is a complete interaction between Service and Service B, there may be 16 (4×4) different edges between the two services based on the unique set of "FROM" and "TO" type tag attributes.

Note that the example in FIG. 15 illustrates information for two unique sets of "FROM" and "TO" tag attributes. Edge 1590 is associated with a TO-type attribute of "region=us-east" while edge 1592 is associated with a TO-type attribute of "region=us-west." Because the two sets of "FROM" and "TO" attributes are not identical, a separate count is maintained for each. The edge 1590 has an associated count of 2, while the edge 1592 has an associated count of 1. To determine the total number of requests or total count associated with the cross-service call from Service A to Service B, the number of counts for each set of "FROM" and "TO" tag attributes for an associated cross-service call may be summed up. In the example of FIG. 15 then, a total of 3 requests is computed to occur between Service A and Service B.

In one embodiment, data sets for the metric events mode are stored as row of metrics extracted from the indexed tags in the service tiers, where each row is associated with either an edge or a node in the service graph. In an embodiment, the edges on the service graph (e.g., the edges 1022 and 1026 of FIG. 10) are rendered using both the "FROM" and "TO" tag attribute sets because rendering the edges requires information regarding directionality. The counts for the "FROM" and "TO" tag attribute sets for a given cross-service span pair are summed up to yield the number of requests made between the two services associated with the span pair. In other words, edges are rendered in the service graph by grouping "FROM" and "TO" tag attribute sets associated with a cross-service call and summing up the request counts associated with the cross-service call. In an embodiment, this grouping may be performed using "group by" statements in a query language, e.g., SQL. In one embodiment, the value of the number of requests between two services may be used to determine the thickness of the edge between the two services in the service graph.

In one embodiment, the nodes (e.g., nodes associated with services 1002, 1004, 1006) on the service graph are also rendered using the aggregated cross-service "FROM" and "TO" tag attribute sets. However, rendering the nodes does not require directionality information and, therefore, the nodes may be rendered by collecting and extracting information from the "TO" type tag attributes. Stated differently, the nodes are rendered by grouping the "TO" tag attributes associated with a given service and summing up the request counts associated with the service. In an embodiment, this grouping may be performed using "group by" statements in a query language, e.g., SQL. The "TO" tag attributes represent new services being called within the microservices architecture. Accordingly, the counts associated with "TO" tag attributes for a given service may be summed up to determine the total number of requests made to the service. In one embodiment, the value of the number of requests may also be used to determine the size of the node when rendering the service graph.

In an embodiment, the "TO" type tag attributes for rendering the nodes may be aggregated separately from the "FROM" and "TO" tag attribute sets aggregated for rendering the edges (as will be discussed in connection with FIG. 16B). In the exemplary table of FIG. 15, information for Service B may be determined, for example, by analyzing the "TO" type tag attributes in the table.

Figure 16A:
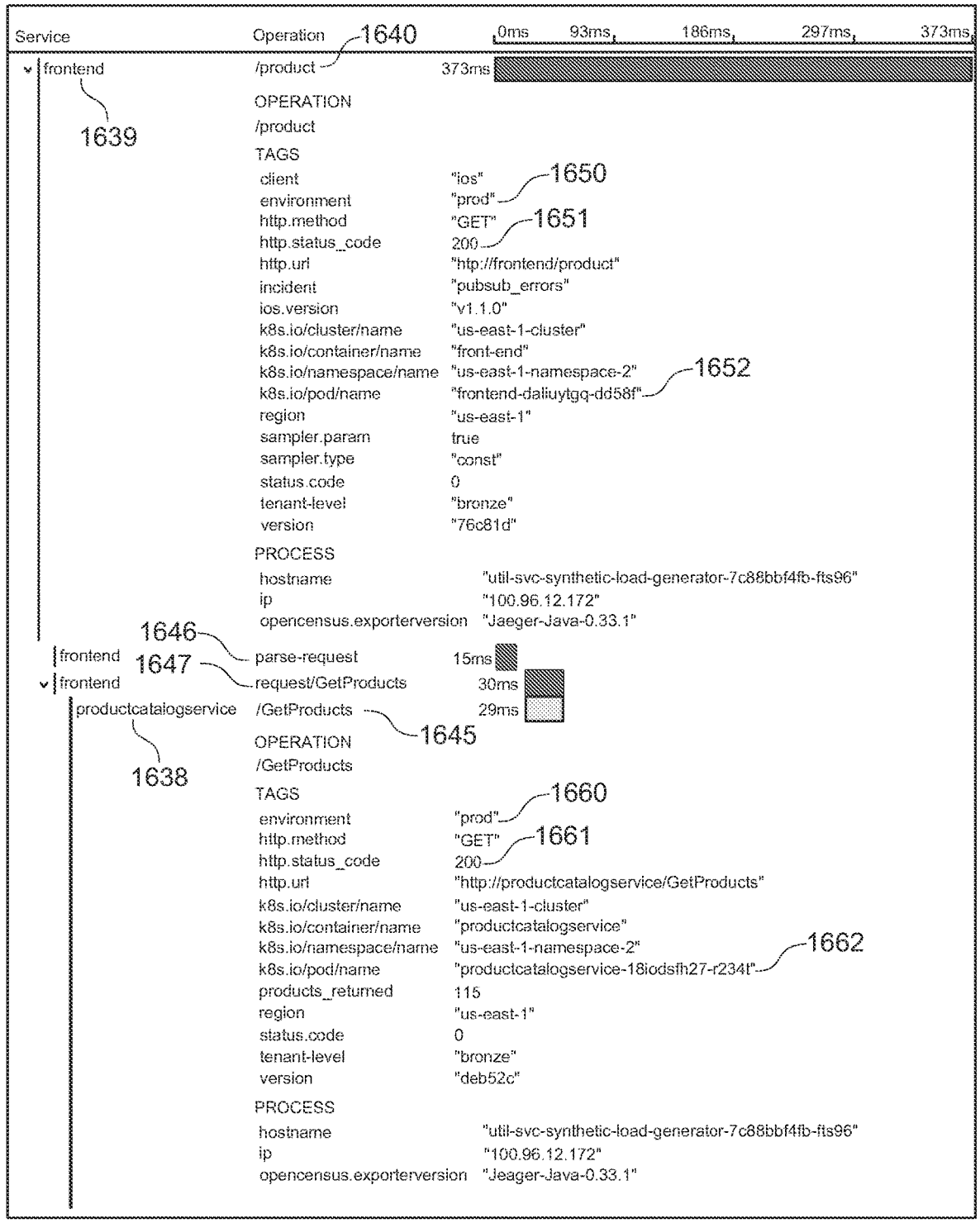
FIG. 16A illustrates an exemplary on-screen GUI showing a visual representation of a portion of an exemplary trace illustrating a cross-service call, in accordance with embodiments of the present invention.

FIG. 16A illustrates an exemplary on-screen GUI showing a visual representation of a portion of an exemplary trace illustrating a cross-service call, in accordance with embodiments of the present invention. As shown in FIG. 16A, front-end service 1639 makes a call to product catalog service 1638. Accordingly, the front-end service 1639 and the product catalog service 1638 comprise a cross-service span pair. Note that spans 1640, 1646 and 1647 may be part of the service tier for front-end service 1639. Accordingly, even though the call is made by the span 1647 ('frontend: request/GetProduct') to span 1645 ('productcatalogservice: /GetProducts), indexed tags associated with the front-end service 1639 may also be extracted from the spans that are part of the service tier for the front-end service 1639. In one embodiment, the first matching tag within a service tier is extracted. For example, indexed tag "environment=prod" 1650 may be extracted from the span 1640, even though it is repeated in the spans 1646 and 1647 because the span 1640 comprises the first matching instance of the tag 1650. Assuming tags "environment" (referred to herein as "env"), "http.status_code" (referred to herein as "code") and "k8s.io/pod/name" (referred to herein as "pod") are indexed, then tags 1650, 1651 and 1652 are extracted from the front-end service 1639 while tags 1660, 1661 and 1662 are extracted from the product catalog service 1638.

In an embodiment, the extracted indexed tags are mapped to tag attributes. The extracted tags 1650, 1651 and 1652 in the parent span (associated with the front-end service 1639) may be mapped to a "FROM" tag attribute while the extracted tags 1660, 1661 and 1662 in the child span may be mapped to a "TO" tag attribute. In one embodiment, the mapped tags may be used to create node and edge data objects that are used to persist data for the metric events modality as shown in FIG. 16B.

FIG. 16B illustrates the manner in which data in the metric events modality is persisted using an edge data object comprising a memory-resident table of tag attributes with associated counts and using a node data object comprising a memory-resident table of tags with associated counts, in accordance with an embodiment of the present invention. In one embodiment of the present invention, a memory-resident table 1601 titled "Edge Health" may be maintained to keep track of the various dependencies in the application. The table 1601 may be stored in, for example, in the storage module 1466 (in FIG. 14). A memory-resident table 1600 titled "Node Health" may be maintained to keep track of the various service nodes in the application. Both tables comprise aggregated rows comprising metrics values. In one embodiment, these rows are stored efficiently for fast aggregation.

For example, the table 1601 may comprise one or more exemplary rows related to the cross-service span pair discussed in connection with FIG. 16A. Row 1606 is one exemplary row that may be generated for the cross-service span pair of FIG. 16A. Note that for simplicity, only tag attributes "from pod" and "to pod" are illustrated in row 1606 in FIG. 16B, but row 1606 would typically also comprise information for tag attributes associated with indexed tags "code" and "env" that are also indexed. As discussed above, each row for the cross-service span pair of FIG. 16A will comprise a unique set of "FROM" and "TO" tag attributes. For example, if the front-end service (e.g., front-end service 1639 in FIG. 16A) makes multiple calls to the product catalog service (e.g., product catalog service 1638 of FIG. 16A), but any of the calls are associated with different values for the "pod" tag from the values shown in row 1606, the information would be recorded in a new row. In other words, each row records a single unique combination of tag attributes and service names. If the value of either the "from pod" or "to pod" tag attribute changes, a new row is created to record the information. Accordingly, there may be multiple rows in the table 1601 for the cross-service call discussed in connection with FIG. 16A, where each row would comprise a unique combination of "FROM" and "TO" tag attributes for a given cross-service span pair.

Each row in the table 1601 comprises a count value for number of requests 1604, errors 1605 and latency 1611. The request metric 1604 is incremented each time the same cross-service call with the same unique set of attributes for a respective row is observed on a trace. The error metric 1605 is incremented each time a request associated with a respective row is observed on a trace that has an error. The latency 1611 metric relates to a histogram of the duration that a respective request took. Further, each row comprises a timestamp 1603 to record the time of the cross-service call.

Using the metrics associated with the requests 1604, errors 1605 and latency 1611 and the timestamp 1603, aggregations on the rows may be performed quickly and efficiently to determine SLIs for varying ranges of time as discussed in connection with FIGS. 6 to 12. In response to a user query then, the numeric rows in the tables 1600 and 1601 may be summed into either timeseries buckets or into a single number depending on the query.

In one embodiment, the metric events modality may maintain a separate memory-resident table 1600 titled "Node Health" in system memory associated with the service nodes in the application. Each row in the memory-resident table 1601 comprises a unique combination of service names and associated tags. For example, row 1608 is associated with the front-end service (e.g., service 1639 in FIG. 16A) and comprises corresponding tag values for "env," "pod" and "code." Similarly, row 1607 is associated with the product catalog service (e.g., product catalog service 1638 of FIG. 16A) and comprises corresponding tag values for "env," "pod" and "code."

Each unique combination of service name and corresponding tag values is associated with metrics that are maintained in the memory-resident table 1600, e.g., request, error and latency (as discussed in connection with table 1601). These metrics may be used to perform fast and efficient aggregations. For example, if the user queried the number of times "env=prod" in the application, assuming the two exemplary services illustrated in table 1600 are the only ones where "env=prod," the request counts in each row would be aggregated to provide a result of 2.

Note that the memory-resident table 1600 may also comprise a "root cause" metric 1609 which tracks the number of times the corresponding service was the root cause of an error. For example, the "root cause" metric may be aggregated using the memory-resident table 1600 across multiple rows to determine the number of times each given service in an application was the root cause for an error.

In one embodiment, a software tool may be employed to perform faster aggregations across the rows of tables 1600 and 1601. For example, Apache Druid, which is an open-source data store designed for sub-second queries on real-time and historical data, may be used to perform the aggregations rapidly and efficiently. In different embodiments, other tools may also be used to perform aggregations. In one embodiment, the information in the memory-resident tables 1600 and 1601 may be used in the metric events modality to perform the metrics aggregations for rendering the service graph (e.g., graph 1000 of FIG. 10) and computing the associated SLIs.

In one embodiment, the metrics event modality may also store Trace IDs associated for each unique combination of cross-service span pairs and corresponding indexed tags.

In one embodiment, the aggregation module 1422 (of FIG. 14) of the monitoring platform aggregates across the cross-service span pairs by maintaining one or more exemplary Trace IDs for each unique set of "FROM" tag attributes (and their corresponding values) to "TO" tag attributes (and their corresponding values) for a cross-service pair. Accordingly, exemplary Trace IDs may be maintained for each unique cross-service call.

The exemplary Trace IDs stored with each unique set of "FROM" and "TO" tag attributes for a cross-service span pair may be used by the querying module 1482 to respond to queries requesting more particularized information pertaining to non-indexed tags associated with the spans. For example, if a user needs particularized information regarding span performance or span duration, the querying module 1482 may be able to use the aggregated rows of information stored in a database associated with the storage module 1466 to access one or more exemplary Trace IDs associated with the call. Using the Trace IDs then, the querying module may be able to access the sessionized traces 1408 and perform analytics on the retrieved exemplary traces to deliver the requisite span performance and span duration information. In one embodiment, the full trace information may be accessed from a storage set associated the full-fidelity modality, which stores the entire traces as ingested following sessionization. In a different embodiment, however, the metric events modality may save full trace information for traces associated with the exemplary Trace IDs in a separate storage from the data set associated with the full-fidelity modality. In one embodiment, because the metric events mode allows users to retrieve raw trace data, it also allows users to run an analysis on the retrieved data for an arbitrary set of tags (instead of being limited to the tags pre-indexed by indexing module 1407).

The metric events modality is particularly advantageous in circumstances where the user has identified a problem from the information provided by the metric time series. Having identified a problem either by manual monitoring of RED metrics or through an automatically generated alert, the user may be able to traverse deeper using the metric events data set and access relevant traces to receive more specific information regarding the problem. Also, the metric events mode allows the user to run an arbitrary analysis on the traces, e.g., on a set of tags that has not previously been indexed, which provides the user with specific information that may be used to diagnose and resolve the problem.

FIG. 16C illustrates the manner in which data in the metric events modality is persisted using an edge data object comprising a memory-resident table of extracted indexed tag attributes with associated Trace IDs and using a node data object comprising a memory-resident table of extracted tags with associated Trace IDs, in accordance with an embodiment of the present invention. In one embodiment of the present invention, a memory-resident table 1631 created to persist data is associated with the various dependencies in the application. Also, a memory-resident table 1630 created to persist data for the metric events modality is associated with the various service nodes in the application. Note that table 1631 is created in a similar way to table 1601 in FIG. 16B and that table 1630 is created in a similar way to table 1600 of FIG. 16B. Instead of tracking RED metrics, however, the tables in FIG. 16C comprise a column for Trace IDs 1690 and Exemplar Type 1691. It should be noted that, in one embodiment, memory-resident table 1631 may be maintained in combination with memory-resident table 1601 and that memory-resident table 1630 may be maintained in combination with memory-resident table 1600.

Row 1697 in table 1631 is one exemplary row that may be generated for the cross-service span pair of FIG. 16C. Note that for simplicity, only tag attributes "from pod" and "to pod" are illustrated in row 1697 in FIG. 16C, but row 1697 would typically also comprise information for tag attributes associated with indexed tags "code" and "env." As discussed previously, each row for the cross-service span pair of FIG. 16A will comprise a unique set of "FROM" and "TO" tag attributes. Accordingly, there may be multiple rows in table 1631 for the cross-service call discussed in connection with FIG. 16A, where each row would comprise a unique combination of "FROM" and "TO" tag attributes for a given cross-service span pair. Each row in table 1631 comprises a Trace ID column 1690, which keeps track of one or more Trace IDs associated with the unique combination of service names (and operation names) and tag attributes for the given row. In other words, the combination of service names (and operation names) and tag attributes in each row may comprise an index to access the associated Trace IDs.

In one embodiment, the Exemplar Type column 1691 tracks the type of exemplary trace associated with the Trace ID. Types of exemplars may be request, error, root cause errors or some latency bucket identifier. The Trace IDs in each row may be accessed to identify and retrieve the full trace associated with the ID for further analysis, e.g., an analysis on an arbitrary set of tags associated with the trace.

In one embodiment, the monitoring system may maintain a separate table 1630 associated with the service nodes in the application. Rows 1695 and 1696 in table 1630 are two exemplary rows that may be generated for the cross-service span pair of FIG. 16A. Each row in table 1630 comprises a unique combination of service and associated tags. For example, row 1695 is associated with the front-end service (e.g., service 1639 in FIG. 16A) and comprises corresponding tag values for "env," "pod" and "code." Similarly, row 1696 is associated with the product catalog service (e.g., product catalog service 1638 of FIG. 16A) and comprises corresponding tag values for "env," "pod" and "code."

Each unique combination of service name and corresponding tag values is associated with a Trace ID and Exemplar type that is maintained in table 1630.

As noted above, in one embodiment, metrics event data may be persisted in tables that consolidate the data shown in FIG. 16B and FIG. 16C. For example, table 1601 may comprise an additional column to track Trace IDs and similarly table 1600 may comprise an additional column to track Trace IDs.

The Trace IDs may be used in metrics events modality to retrieve full traces for more detailed analysis. In one embodiment, full traces associated with the exemplary Trace IDs may be maintained in a dedicated storage associated with the metric events. In a different embodiment, the full traces may be accessed from a data set associated with the full-fidelity mode.

It should be noted that the metric events modality can comprise higher-cardinality metrics information because a higher number of tags may be indexed for the metric events data set as compared to the dimensions associated with the metric time series. However, the metric time series modality may provide higher-fidelity information because it retains metadata associated with incoming spans (e.g., service name, operation name, count values, etc.) that are not collected in the metric events modality. Further, the metric time series modality also allows users to configure alerts against one of more time series to monitor incoming data in real-time. Because metric events are generated from post-sessionized traces, the metrics data associated with metric events may not be computed as rapidly as compared with the metric time series modality.

4.3. High-Fidelity Data

In one embodiment, the full-fidelity module 524 of FIG. 5 stores all the incoming trace data from the sessionization process in real time. Unlike the prior two modes, the full-fidelity modality stores the trace data in its raw form. In one embodiment, the data is stored in parquet-formatted batches of full traces in an unstructured format (e.g., blob storage) along with some metadata. The metadata may comprise the tags associated with the trace (both indexed and unindexed) and other properties such as service name and operation for more efficient querying. In one embodiment, the format of the metadata may comprise a map of a service name to a map of tag names, wherein each tag name may be mapped to a list of tag values. The batches of full traces in unstructured format and the metadata are queried in the full-fidelity modality using a robust data engine to search for any tag across the traces. For example, PRESTO is an open source distributed SQL query engine that may execute queries against data sources of varying sizes.

Figure 17:
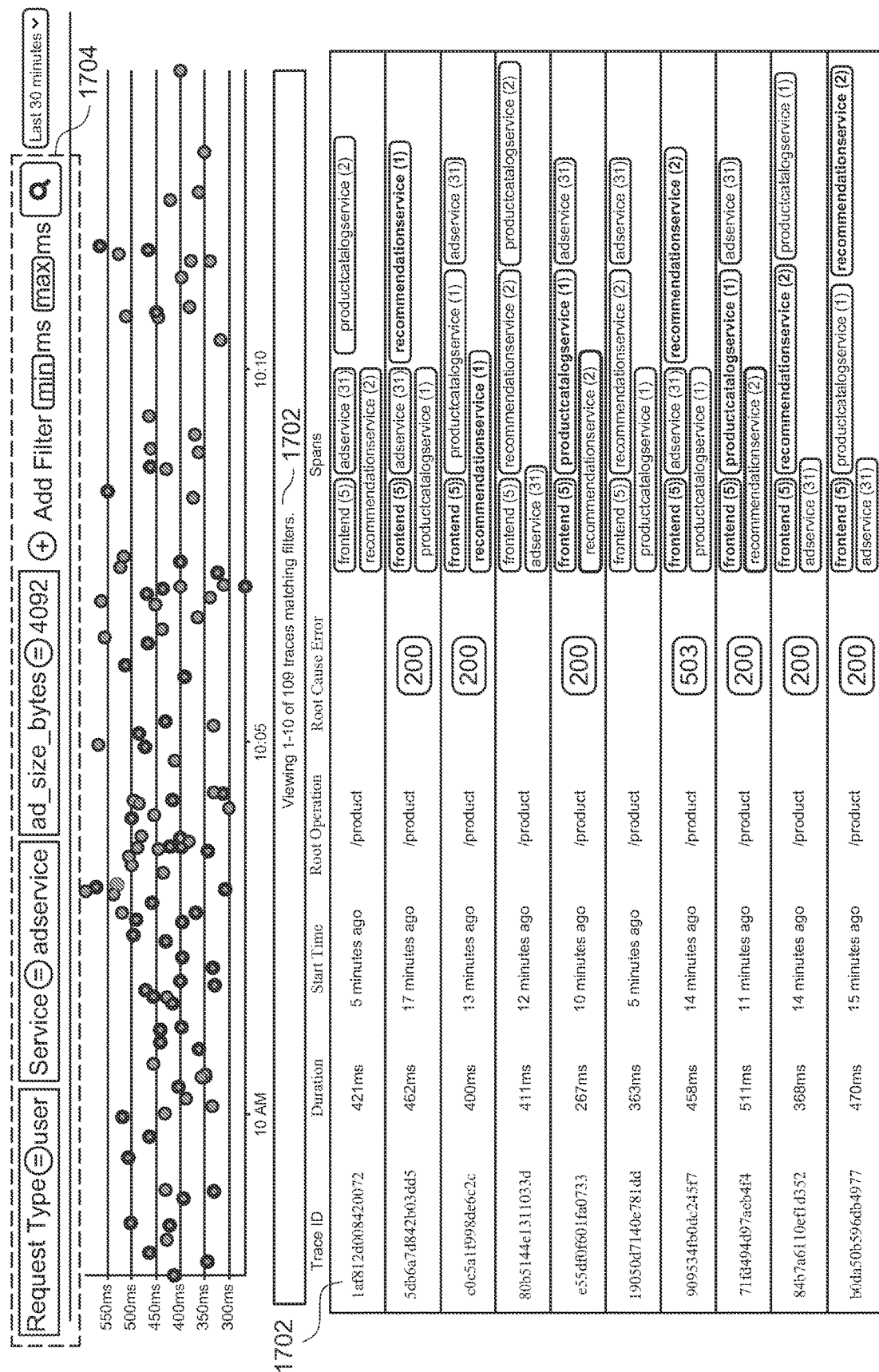
FIG. 17 is an on-screen GUI showing the manner in which a client may submit a query to be executed against the full set of traces stored in connection with the full-fidelity modality, in accordance with embodiments of the present invention.

FIG. 17 is an on-screen GUI showing the manner in which a client may submit a query to be executed against the full set of traces stored in connection with the full-fidelity modality, in accordance with embodiments of the present invention. The full-fidelity modality, in one embodiment, allows a user to execute query against arbitrary tags to receive a set of traces that matches the query. For example, in the GUI of FIG. 17, the user enters a query 1704 for traces where "Request Type=user," "Service=adservice" and the tag "ad_size_bytes=4092." In response, the platform returns a list 1702 of the traces matching the user-entered filters and, further, provides information about the traces, e.g., the Trace ID, duration, start time, root operation, root cause error status code and associated spans.

In one embodiment, the monitoring platform has the ability to run a full trace search (as shown in FIG. 17), and feed the traces collected into other modalities of analysis to get more detailed information about an arbitrary set of traces and an arbitrary set of attributes associated with the set of traces.

5.0. Real-Time Data Stream

Given the nature of the data received by the monitoring service 306 and the real-world implications of the data on the ability of a computing system to function properly, it can be helpful to view the data as it is received by the monitoring service 306. For example, by viewing the data as it is received and/or processed by the monitoring service 306, a user may be able to identify certain patterns or characteristics of the data.

While it can be helpful to view the data as it is received in real-time (e.g., as a livetail), it can be difficult to understand the data or what the implications of the data may be for the system that is being monitored. If the user has certain knowledge about the data, they may be able to create filter criteria that enables them to look at different portions of the data. While this approach may work for a time, the filter criteria is static and the feasibility of this approach is contingent on the user having pre-knowledge of the data that will be received and the structure of that data. As the data changes, the filter criteria will become outdated and lose its ability to provide meaningful information about the data and underlying system.

Given the nature of the continuous flow of data and changes to that data, it can be difficult if not impossible for a person to understand the data let alone predict what the data will look like in the future and generate the appropriate filter criteria for the data. This becomes increasingly unworkable given the nature of the real time data, the amount of data received, and the time constraints to use the data to achieve meaningful results with regard to internet security, error detection and correction, etc. As such, static filter criteria may not work given the vast amounts and disparate nature of the incoming data.

To address this, the monitoring service 306 (e.g., using the instrumentation analysis system 322) can automatically and dynamically generate filters for the data as the data is received and processed. In other words, the filter criteria used to filter the data can be based on the data itself rather than beliefs or assumptions about that data. Further, the dynamic nature of the filter creation can result in new filter criteria being created as new or different data is received. By dynamically generating filters based on the data itself, the system can improve the flexibility of the system to filter and process data. Further, as the filters are based on the data itself, they can be more meaningful and useful and result in less time querying or processing the data, thereby improving the efficiency and computational demands on the system. Information about the generated filters can also be useful to help a user understand and interpret the vast quantities of data that is being processed by the monitoring service 306. As such, the dynamic filters can result in more efficient response times, shorter down times for important or critical infrastructure, and a more efficient use of computing devices in an IT environment. In addition, dynamic filters can result in faster processing times as more data is filtered or omitted, more efficient use of data storage (e.g., discarding less relevant data or being able to discard older data sooner), and improved navigation of the data via a user interface.

In light of the description herein, it will be understood that the embodiments disclosed herein substantially improve distributed processing and query systems. Specifically, the embodiments disclosed herein enable a system to dynamically extract data from a real-time data stream, generate filter criteria from the extracted data, and apply the filter to the data in the real-time data stream. The ability to dynamically generate and apply filter criteria to streaming data in a real-time data stream enables the underlying systems to more efficiently process data and execute queries, thereby reducing the processing time of the system and processing load on the system, and improving system response to error detection and correction. Specifically, the dynamically generated filters (generated from data extracted from the real-time data stream) can provide a user with real-time suggestions for parsing the data and identifying system errors. Thus, the presently disclosed embodiments represent an improvement in the functioning of distributed systems, as well as error detection and correction. Moreover, the presently disclosed embodiments address technical problems inherent within the distributed systems that generate vast amounts of machine data; specifically, how to parse the vast amounts of machine data effectively while reducing processing load and processing time. These technical problems are addressed by the various technical solutions described herein, including the dynamic extraction of data from data entries in a data stream and generation of filters for follow-on data in the data stream. Thus, the present application represents a substantial improvement on existing distributed systems in general.

5.1. Real-Time Data Stream Interface

Figure 18A:
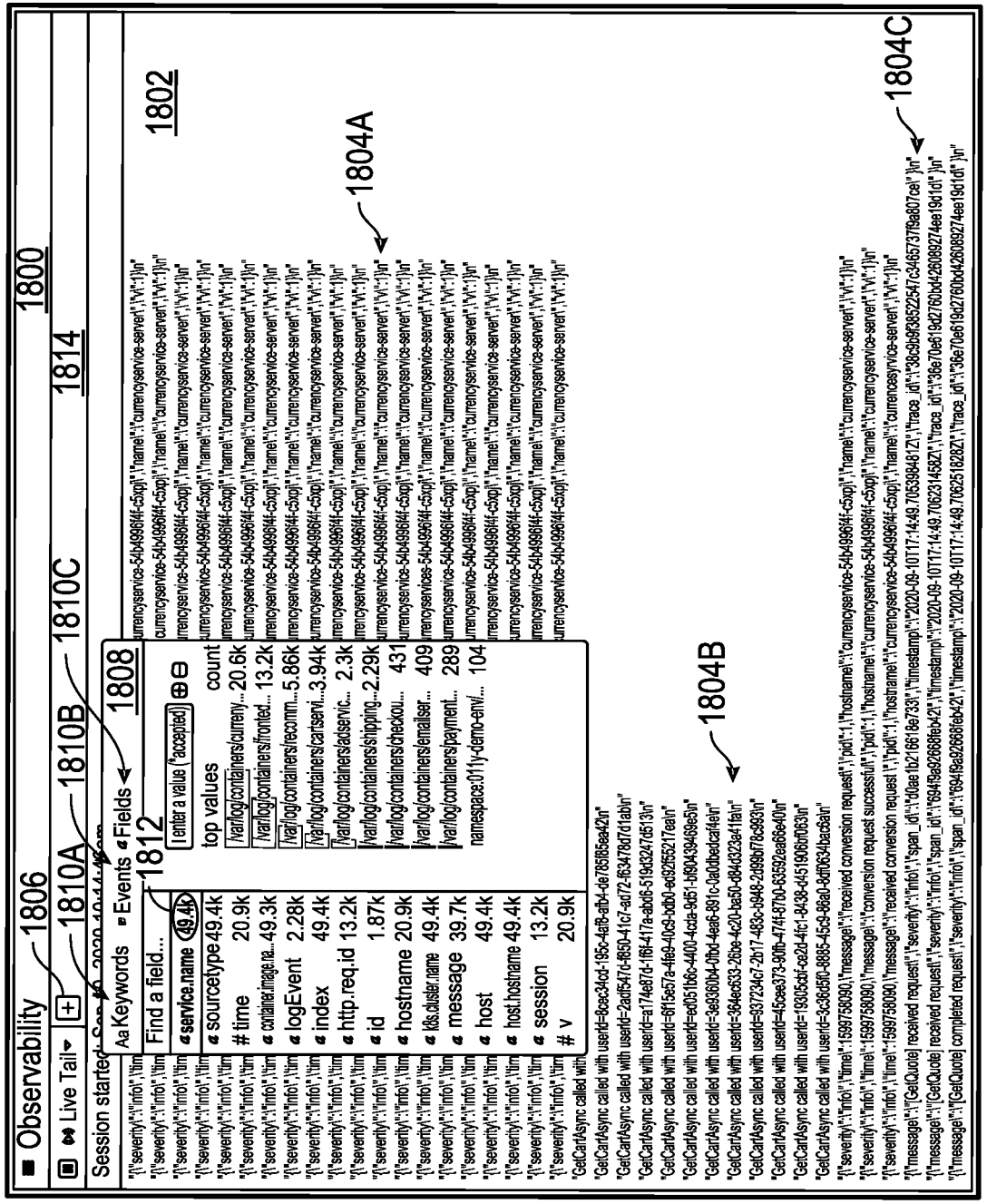
Figure 18B:
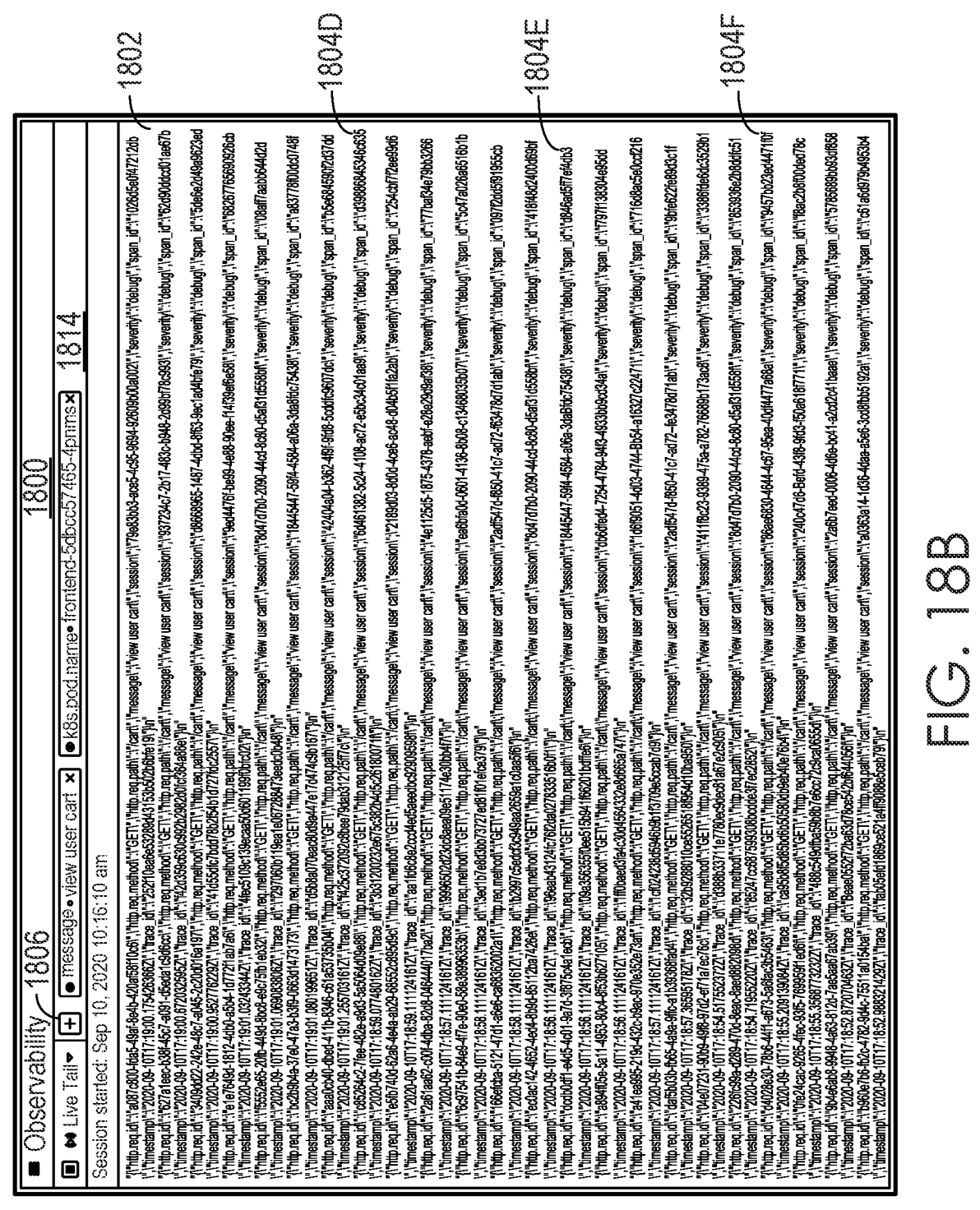

FIGS. 18A and 18B illustrate examples of a GUI 1800 that displays a stream of LTM data being processed by the monitoring service 306. In certain cases, the LTM data is processed by the instrumentation and analysis system 322 and the GUI 1800 is generated by the query engine and reporting system 324.

In the illustrated example, the GUI 1800 includes an area 1802 in which a stream of data entries (e.g., data entries 1804A, 1804B, 1804C, 1804D, 1804E, 1804F,—generically referred to as data entry/entries 1804) are displayed (also referred to herein as displayed data or displayed streaming data) as they are received/processed by the monitoring service 306. In the illustrated example, the end of a data entry 1804 is represented by a "\n." However, it will be understood that the data entries 1804 can end or be separated in a variety of ways, such as by spaces, symbols, hard returns, etc. The GUI 1800 also includes a filter selection display object 1806 that enables a user to select one or more filter criteria to apply to the stream of data entries 1804 in the area 1802. In the illustrated example, the filter selection display object 1806 has been selected resulting in the display of the filter selection window 1808. Although positioned over the stream of data 1804, it will be understood that the filter selection window 1808 can be any size and place in any location of the GUI 1800. Further, the filter selection window 1808 may be transparent or partially transparent to enable a user to view the stream of data 1804 while they select one or more filter criteria.

In some cases, the displayed streaming data can correspond to the LTM data as it is received by the monitoring service 306. In certain cases, the displayed data can correspond to LTM data after the monitoring service 306 has performed some processing on it (e.g., using the instrumentation and analysis system 322). For example, the monitoring service 306 may extract some information from the LTM data in real time as it is streamed from the collector 304. In some cases, the monitoring service 306 can extract certain field-value pairs from the LTM data. The field-value pairs may be extracted based on one or more regular expression ("regex") rules and/or based on certain terms or markers in the LTM data. For example, the monitoring service 306 can interpret the word or string before a marker (e.g., a colon) as a field identifier/name and the word or string following the marker as the field value for the identified field.

The area 1802 can correspond to a window into the stream of data being processed by the monitoring service 306. Thus, as new data is receive/processed, the data in the area 1802 can change. In some cases, as new data is received and displayed, it can push the "older" data out of the window. Accordingly, the data within the window can change over time as newer data is received. As new data is added, the older data can be pushed in any direction (e.g., up, down, left, right, etc.). In certain cases, newer data can appear at the top of the window and older data can move downward thereby creating a waterfall-type effect. Accordingly, in some cases, as a user views the displayed streaming data in the area 1802, it can appear as a continuous flow of never ending data.

The displayed streaming data can correspond to some or all the data that is received at the monitoring service 306. In some cases, the displayed streaming data can correspond to a sampling of the data received at the monitoring service 306. For example, if all of the data received by the monitoring service 306 (or all of the data for a particular tenant or customer), is shown in the area 1802, the data may move too quickly through the area 1802 for a user to read or comprehend it. For example, the data may only be in the area 1802 for <1 second, whereas it may take a user ~5-10 seconds to be able to view/read it or extract some useful information from it. In cases where not all of the data of the data stream is shown in the area 1802, the monitoring service 306 can indicate the percentage of data being shown, thereby giving the user an idea of how much data is being omitted from the area 1802.

In some cases, the monitoring service 306 can apply one or more filter criteria to the data of the data stream to determine which data to display in the area 1802. The filter criteria can include any one or any combination of filter criterion. In some cases, the filter criteria can be based on a tenant ID, user ID, priority level of the data, metadata (e.g., host, source, sourcetype) associated with the metadata and/or information extracted from the data. For example, different users may have different priority levels associated with them and the monitoring service 306 can prioritize data associated with a particular user. Similarly, tenant information can be used to determine which data is to be displayed in the window.

In some cases, the GUI 1800 can display a list of available filter criteria that can be applied to the data in the data stream. Based on a selection of the filter criteria, the monitoring service 306 can apply the filter criteria to the stream of data. For example, the GUI 1800 can include a list of fields, field values, keywords, or other information that has been extracted from the data in the data stream, and/or include a list of the metadata associated with the data.

The available filter criteria can be generated by a user (e.g., based on a user's knowledge of the streaming data and/or generated by the monitoring service 306 or other system, such as the data intake and query system 326. In some cases, the monitoring service 306 generates the available filter criteria based on information extracted from the data entries 1804 of the data stream or from metadata associated with the data entries 1804. In certain cases, another system, such as the data intake and query system 326, extracts the information from the data entries 1804 and/or corresponding metadata and provide the information to the monitoring service 306, which in turn, uses the information to generate and/or display available filter criteria.

If the information used for the available filter criteria is extracted by the monitoring service 306 (e.g., using the instrumentation and analysis system 322), the information can be extracted in real-time as the data entries 1804 are being streamed from the collector 304 and/or processed by the monitoring service 306. The extraction from a particular data entry 1804 may happen before, after, or during the display of the data entry 1804 in the area 1802. In some cases, the information extracted from a particular data entry 1804 is not available for use as filter criteria until after the particular data entry 1804 has already passed through the window the area 1802. In other words, the monitoring service 306 can extract information from a data entry 1804 received at time zero, use the extracted information to generate one or more filter criteria that, when selected by a user, can be applied to a different data entry 1804 received at time one. As such, there may exist a lag between the extraction of the information and its availability for use as filter criteria to data entries in the data stream.

In some cases, the information can be extracted before a data entry is displayed in the area 1802. In some such cases, any filter criteria generated from the data entry 1802 can be applied to the data entry 1804 to determine whether the data entry 1804 should be displayed in the area 1802. For example, if a data entry 1804 includes user_ID=310861413341221, the monitoring service 306 can extract the field "user_ID" and field value "310861413341221" from the data entry 1804, use it to create filter criteria and then apply that filter criteria to the data entry 1802. For example, if user_ID=310861413341221 is used as the filter criteria, then the particular piece of data can be included in the area 1802. If some other user ID is used as the filter criteria, then the data entry 1802 may not be shown in the area 1802.

In some cases, whether the data entry 1804 can be filtered based on information extracted from it can depend on whether the data entry 1804 is the first data entry 1804 that includes a particular field or value used as a filter criterion. As mentioned, there may exist a lag between the identification of a new field, field value, keyword, or other extractable piece of information, and its availability for use as a filter criterion. Accordingly, the first data entry 1804 that includes the field "logEvent" may not be filterable based on a filter criterion "logEvent." However, once the monitoring service 306 has extracted the field "logEvent" from that first data entry 1804 and determined that it could be used as a filter criterion, then subsequent data entries 1804 can be filtered based on the field "logEvent."

Similarly, the first data entry 1804 that includes a particular field value for a known field may not be filterable based on that field value, but may be filterable based on the known field. For example, if the data entry includes the field-value pair "user_ID=310861413341221," user_ID is extracted as a field and "310861413341221" is extracted as a field value, and the field user_ID is already known to the monitoring service 306 but the field value "310861413341221" is not, then the monitoring service 306 could apply a filter criterion "user_ID" to the data entry 1804, but may be unable to apply "310861413341221," as a filter criterion to the data entry 1804. Once the monitoring service 306 extracts the field value "310861413341221" from the data entry 1804 and determines that the field value can be used as a filter criterion, then subsequent data entries can be filtered based on the extracted field value "310861413341221."

It will be understood that the monitoring service 306 and/or data intake and query system 326 can generate multiple filter criteria from the data of (or metadata associated with) one data entry 1804. The multiple filter criteria can be applied to the data entries 1804 in the data stream as described herein.

In some cases, extracted information can be used to populate ranges or number for use as filter criteria. For example, consider a field, such as "response time" that provides a number indicating the response time of a particular request. In some such cases, each data entry that includes a "response time" field can include a number as the field value that represents the response time. Using the response time from all of the data entries, the monitoring service 306 can build a range of the response times, from the shortest response time to the longest response time. Using the determined range, the monitoring service 306 can display an available filter criterion that indicates the range of the response times and allows the user to select within that range. The range displayed in the GUI can correspond to an actual range of the received/processed data entries 1804 rather than a predetermined, random, or arbitrary range. As noted above, if a data entry 1804 includes a field value that is greater than the currently determined upper limit of the range, the monitoring service 306 can update the range and display the new upper limit. As mentioned previously, there may be a lag between the receipt of the data entry 1804 with the new upper limit and the ability of the monitoring service 306 to use the new upper limit as part of the range. As such, the new upper limit may not be usable for the data entry 1804 that included the new upper limit, but may be available for subsequent data entries 1804.

If the information used for the available filter criteria is extracted by another system, it can be extracted before or after the monitoring service 306 processes the data. In some cases, the information used for the available filter criteria is extracted by the data intake and query system 326 after the data entries 1804 have been processed by the monitoring service 306. In some such cases, the extracted information can be communicated to the monitoring service 306 for use as filter criteria. In some such cases, the lag time between a data entry 1804 being received by the monitoring service 306 and data extracted from the data entry 1804 (by the data intake and query system 326) being available as a filter criteria to be applied to the data entries 1804 in the data stream can be longer than the lag time if the data is extracted by the monitoring service 306 itself.

In some cases, the monitoring service 306 (or instrumentation and analysis system 322) can be limited in what information it can extract from data entries, whereas another system can have greater flexibility. For example, the monitoring service 306 may be limited to using metadata as filter criteria or limited in what information it is able to extract in real time from the data entries 1804. In some cases, the monitoring service 306 is able to extract field-value pairs with a known format (e.g., a ':' between the field and field value), but is not able to apply regex rules to the data and/or apply other data transformations to the data entries to determine additional fields and field values. In certain cases, another system, such as the data intake and query system 326 is able to perform additional transformation and processing on the data. For example, the data intake and query system 326 can perform data transformations and aggregations to determine additional information about the data entries. In some cases, the data intake and query system 326 can take more time to process the data than the monitoring service 306. Furthermore, the data intake and query system 326 can process the data entries, group them, and store them, whereas the monitoring service 306 may have limited time to extract information and display the data entries before streaming the data entries to the data intake and query system 326. Non-limiting examples of data ingestion, extraction, and processing by the data intake and query system 326 are described in U.S. application Ser. No. 16/777,612, entitled GENERATING A MODIFIED COMPONENT FOR A DATA INTAKE AND QUERY SYSTEM USING AN ISOLATED EXECUTION ENVIRONMENT IMAGE, and Ser. No. 16/945,646, entitled INGESTION NODES IN A DATA INTAKE AND QUERY SYSTEM, each of which is incorporated herein by reference for all purposes.

Accordingly, the data intake and query system 326 can determine additional filter criteria as it processes the data from the monitoring service 306, and communicate the filter criteria to the monitoring service 306. In turn, the monitoring service 306 can apply the generated filter criteria to the data that is receives and processes.

Notably, the monitoring service 306 (and data intake and query system 326) is able to extract information from the data entries 1804 and generate filter criteria from the extracted information without human input. Thus, a user does not need to know the content of the data, or expected values, keywords, or fields in the data. Given the amount of data being processed in real time, it is not feasible for a user to manually create filter criteria. Such an attempt by a user would invariably result in missed filter criteria, or the filter criteria being used so much later in time that it is no longer useful or viable. For example, in many cases, the issues that arise can arise in a manner of seconds or minutes and the relevant data may include gigabytes or petabytes of data coming from a continuous stream of data. Further the problems that arise may be critical to an underlying system and need to be resolved within minutes or hours. In such circumstances, it is not feasible or even possible for a human to review all of the data, let alone understand what information can be extracted from where and generate usable filter criteria to apply to the data. As such, the monitoring service 306 can provide a significant technological benefit that enables the identification and correction of system errors.

In the illustrated example of FIG. 18A, to access the available filter criteria, the user can interact with (e.g., click, hover, select, etc.) the filter selection display object 1806. Upon interacting with the filter selection display object 1806, a list of available filter criteria can be displayed in a filter selection window 1808. Given the dynamic nature of the data stream, even as a user selects the filter selection display object 1806 and the filter selection window 1808 is displayed, the displayed streaming data in the area 1802 can continue to change. As such, in some embodiments, the displayed streaming data can be a continuous stream of changing data that reflects a real-time view of data being processed by and passing through the monitoring service 306.

In the illustrated embodiment, the filter selection window 1808 includes three tabs 1810A, 1810B, 1810C for three types available filter criteria keywords, events, and fields, respectively. However, it will be understood that fewer, more, or different types of available filter criteria can be used.

In the illustrated example, a fields tab 1810C has been selected. Based on the selection, the filter selection window 1808 displays available field filter criteria, including a list of available fields for use as filter criteria and a count for each field (e.g., service.name (49.4 k), sourcetype (49.4 k), time (20.9 k), container.image.name (49.3 k), logEvent (2.28 k), index (49.4 k), http.req.id (13.2 k), id (1.87 k), hostname (20.9 k), k.8s.cluster.name (49.4 k), message (39.7 k), host (49.4 k), host.hostname (49.4 k), session (13.2 k), version or 'v' (20.9 k)).

The count can correspond to the number of events or LTM data entries that include a field value for the identified field or are associated with metadata that includes a field value for the identified field. The count can be limited to a certain window of time (e.g., last five minutes) and/or based on the aggregate number of data entries 1804 that have passed through the area 1802 (e.g., since the livetail view was accessed) or been processed by the monitoring service 306. Although not illustrated in FIG. 18A, it will be understood that selecting keyword or events can yield a similar menu to enable a user to select (or type in) certain keywords (or available keyword filter criteria) or events (or available event filter criteria) with which to filter the data stream and determine which data to display in the area 1802.

As described herein, the displayed fields of the available field filter criteria can correspond to metadata associated with the data entries 1804 and/or information extracted or derived from the data entries 1804 themselves. For example, the host, sourcetype, index, and/or k8s.lcuster name fields may correspond to metadata associated with the data entries 1804, whereas the service.name, id, message, and time fields may correspond to information extracted from the data entries 1804 themselves.

Upon selection of an available filed, the filter selection window 1808 can display a list of field values for that field that are available for use as filter criteria. In some cases, the filter selection window 1808 can include a list of some or all of the available field values. In certain cases, the filter selection window 1808 can limit the displayed available field values to the most frequent field values or. The filter selection window 1808 can also provide other information related to the field values. In the illustrated example, the field values include a list of some of the most frequent field values for the service.name field 1812 and their count (e.g., "/var/log/containers/currency . . . ," with a count of 20.6 k "/var/log/containers/frontend . . . " with a count of 13.2 k, "/var/log/containers/recomm . . . " with a count of 5.86 k, etc.). The count can correspond to the number of data entries 1804 that include or are associated with the respective field value. For example, approximately 20.6 k data entries 1804 can include the field value "/var/log/containers/currency . . . " or be associated with metadata that identifies the event as being associated with the service.name "/var/log/containers/currency . . . ."

Once a filter criteria is selected, the monitoring service 306 can apply it to the data that it receives and processes to determine which data should be displayed in the area 1802. Data that satisfies the filter criteria can be displayed in the area 1802, whereas data that does not satisfy the filter may be omitted or excluded from display in the area 1802 or not included with the displayed streaming data. In addition the GUI 1800 can display the selected filter criteria in an applied filter criteria area 1814.

In the illustrated example of FIG. 18B, the user has selected the field "k8s.pod.name," field value "frontend-5dbcc57465-4pnms," field "message" and field value "view user cart," as the filter criteria. Based on that selection, "k8s.pod.name=frontend-5dbcc57465-4pnms" and "message=view user cart" are displayed in the applied filter criteria area 1814 of the GUI 1800.

As mentioned, some of the filter criteria can correspond to data extracted from the data entries and other filter criteria can correspond to metadata associated with the data entry. In the illustrated example, the message field and field value can be extracted from the data entry and the k8s.pod.name field and field value can correspond to metadata associated with a data entry. As such, the message "view user cart," can be seen in the data entries 1804D, 1804E, 1804F within the area 1802, whereas the field value "frontend-5dbcc57465-4pnms" is not. In some cases, the monitoring service 306 (e.g., using the query engine and reporting system 324) can highlight or place emphasis on the data in a data entry 1804 that satisfies the filter criteria. With continued reference to the illustrated example, the monitoring service 306 can highlight "view user cart" in each data entry to show where "view user cart" is located within individual data entries 1804.

In some embodiments, the GUI 1800 can include the metadata associated with the data entries 1804 in the area 1802, as well. For example, with each data entry, the area 1802 can include the metadata associated with the data entry 1804 above or below the data entry 1804. If shown, the metadata that satisfies the relevant filter criteria can be highlighted, etc.

As additional filter criteria are added, the monitoring service 306 can apply them to the data stream. Similarly, if a filter criterion is removed, the monitoring service 306 can update the filter criteria applied to the data stream.

5.1. Real-Time Data Stream Flow

Figure 19:
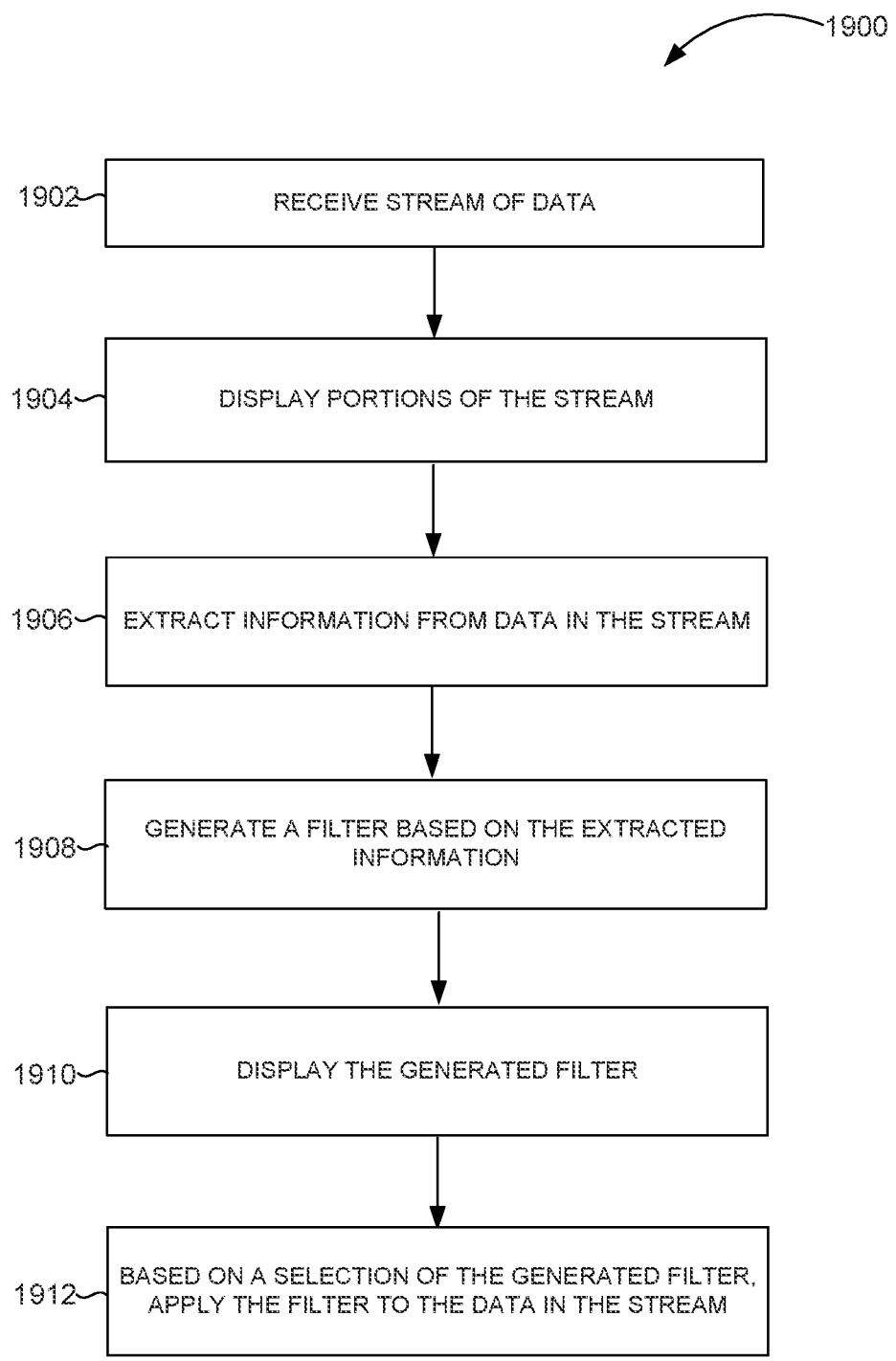
FIG. 19 is a flow diagram illustrative of an embodiment of a routine implemented by a computing device to dynamically generate filters from streaming data and apply the generated filters to the streaming data.

FIG. 19 is a flow diagram illustrative of an embodiment of a routine 1900 implemented by a computing device to dynamically generate filters from streaming data and apply the generated filters to the streaming data. Although described as being implemented by the monitoring service 306, it will be understood that the elements outlined for routine 1900 can be implemented by any one or a combination of computing devices/components that are associated with the various systems and components described herein, such as the instrumentation analysis system 322 and/or the query engine and reporting system 324. Thus, the following illustrative embodiment should not be construed as limiting.

At block 1902, the monitoring service 306 receives a stream of data. The data in the stream can include data entries in the form of log data, trace data, and/or metric data. The data entries can be generated from logs, traces, and/or metrics by a collector device prior to receipt by the monitoring device. In some cases, the different types of data may include associations or relationships with other types of data. For example, the collector device can indicate that a particular log entry is associated with certain traces and/or metrics. In certain cases, the data entries in the stream of data can include unstructured raw machine data or structured data (e.g., in tuples or otherwise including data in a structured format that indicates fields and field values for those fields). The monitoring service 306 can receive the stream of data in a continuous or semi-continuous fashion. On other words, the data in the stream of data can be changing frequently and/or continuously.

At block 1904, the monitoring service 306 displays a portion of the stream. Similar to the way in which the data entries in the stream are changing, the displayed portion of the stream (or displayed data entries of the stream) can also change frequently and/or continuously. In some cases, the displayed portion of the stream can be analogized to a window overlooking a stream of water and the data entries can be analogized to water droplets in the stream. In such a scenario, the water droplets viewable through the window are continuously moving and changing, such that over time a water droplet will appear within the window, move through the window, and eventually no longer be viewable from the window. Similarly, the data entries of the stream of data can be displayed temporarily. While displayed, the data entries can move frequently or continuously until they are no longer viewable in the window. The displayed data entries can corresponds to traces or spans, log entries or log events, and/or metrics or metric events, and so forth. Further, as new data is received and displayed, it can push the older data through the display area and out thereby creating a seemingly continuous stream of viewable data.

At block 1906, the monitoring service 306 extracts information from the data in the stream. In some cases, the extracted information can include at least one of a field or field value from a data entry in the stream. The monitoring service 306 can extract the information from some or all of the data entries in the stream. For example, the monitoring service 306 can extract field and/or field values from each data entry or its associated metadata. In some cases, the monitoring service 306 can extract the fields or field values from unstructured raw machine data. In certain cases, the monitoring service 306 can extract fields and field values using regex rules, markers in the data, or other extraction rules. In addition, in certain cases, the monitoring service 306 can extract multiple fields and/or multiple field values from the same data entry.

At block 1908, the monitoring service 306 generates a filter based on the extracted information. In some cases, the monitoring service 306 generates multiple filters based on the extracted information. Whether and how many filters are generated by the monitoring service 306 can depend on what filters currently exist. If a filter already exists for some extracted information, a filter may not be created for it. If a filter does not exist, the monitoring service 306 can generate a filter for it. For example, if the monitoring service 306 extracts a field "user ID" and user ID field value "L6523," and a filter for user ID already exists, but no filter for L6523 exists, the monitoring service 306 can generate a filter for L6523, but not generate a filter for user ID.

Accordingly, the filter(s) generated by the monitoring service 306 can depend on the extracted information and the filters that already exist within the system. In some cases, the monitoring service 306 can review all of the extracted information from each data entry to determine which fields or field values can be used to generate new filters. For example, if the extracted information include a field name, the monitoring service 306 can generate a field filter. If the extracted information includes a field value, the monitoring service 306 can generate a field value filter. In some cases, if an extracted field or field value includes a number, the monitoring service 306 can use the number to generate or update a range filter.

At block 1910, the monitoring service 306 displays the generated filter. In some cases, the monitoring service 306 displays the generated filter along with other filters. The other filters may correspond to filters generated by the monitoring service 306 and/or filters generated by another system, such as the data ingestions and query system 326. In certain cases, the other filters can correspond to information that was extracted by another system, such as the data ingestions and query system 326, and for which filters were generated by the monitoring service 306.

At block 1912, based on a selection of the generated filter, the monitoring service 306 applies the filter to the data in the stream. As the data in the stream is continuously changing, the generated filter can be applied to data that is different form the data that was used to generate the filter. In some cases, the filter is used to determine what data from the stream should be displayed. For example, data that satisfies the filter can be displayed (temporarily) and data that does not satisfy the filter may not be displayed (temporarily). In certain cases, the filter can be used to determine whether to highlight certain portions of the data in the displayed data stream. For example, data that satisfies the filter can be displayed in a different font or highlighted, etc. In some cases, whether the filter is used to determine whether to display the data or whether to highlight the data can be based on the type of filter created. For example, if the filter created is a keyword filter, it can be used to highlight certain words in the displayed data stream (but may not be used to decide what data to display). If the filter created is a field or field value filter, it can be used to determine what data to display in the displayed portion of the data stream. In certain cases, a user can determine whether a particular filter should be used to highlight data in the displayed data stream or to determine what data is to be displayed as part of the displayed portion of the data stream.

It will be understood that the blocks described herein with reference to routine 1900 can be reordered or and/or performed concurrently. In addition, fewer, more, or different blocks can be used as part of the routine 1900. In some cases, one or more blocks can be omitted. In some cases, the monitoring service 306 can communicate data from the data stream to another system for further processing, grouping, and storage. In certain cases, the monitoring service 306 can receive information from another system, such as the data intake and query system 326, and use the received information to generate and display filters. In some such cases, the data intake and query system 326 can extract the information (e.g., field and/or field values), from data entries themselves and/or from metadata associated with the data entries. The information received from another system can be in addition to or in place of the monitoring service 306 extracting the information as described herein at least with reference to block 1906.

6.0. Related Content

As described herein, the monitoring service 306 can include one or more content generators 350 to process different types of machine-generated data and/or generate content for one or more GUIs.

6.1. Related Content User Interfaces

FIGS. 20A, 20B, 20C, and 20D illustrate examples of GUIs 2000, 2020, 2040, 2060, respectively, that display content generated by different content generators 350 or content generated from different types of data entries. By using different content generators 350 to generate content from the different types of data and/or entities, the monitoring service 306 can more efficiently generate content to enable a user to understand the data.

As described herein, the content generators 350 can be configured to generate content based on the type of underlying data that is being processed and/or based on a type of an entity associated with the underlying data. For example, if the underlying data includes traces and spans, a trace content generator 350 can aggregate and process the data to generate trace-related content. In some such cases, the generated content can include services or microservices-related content that is associated with the traces/spans. Similarly, if the underlying data is metrics data or metric events, the generated content can include metric content associated with one or more machines, processors, virtual machines, container, pods, etc. If the underlying data is log data or events, the generated content can include log or event content.

Figure 20A:
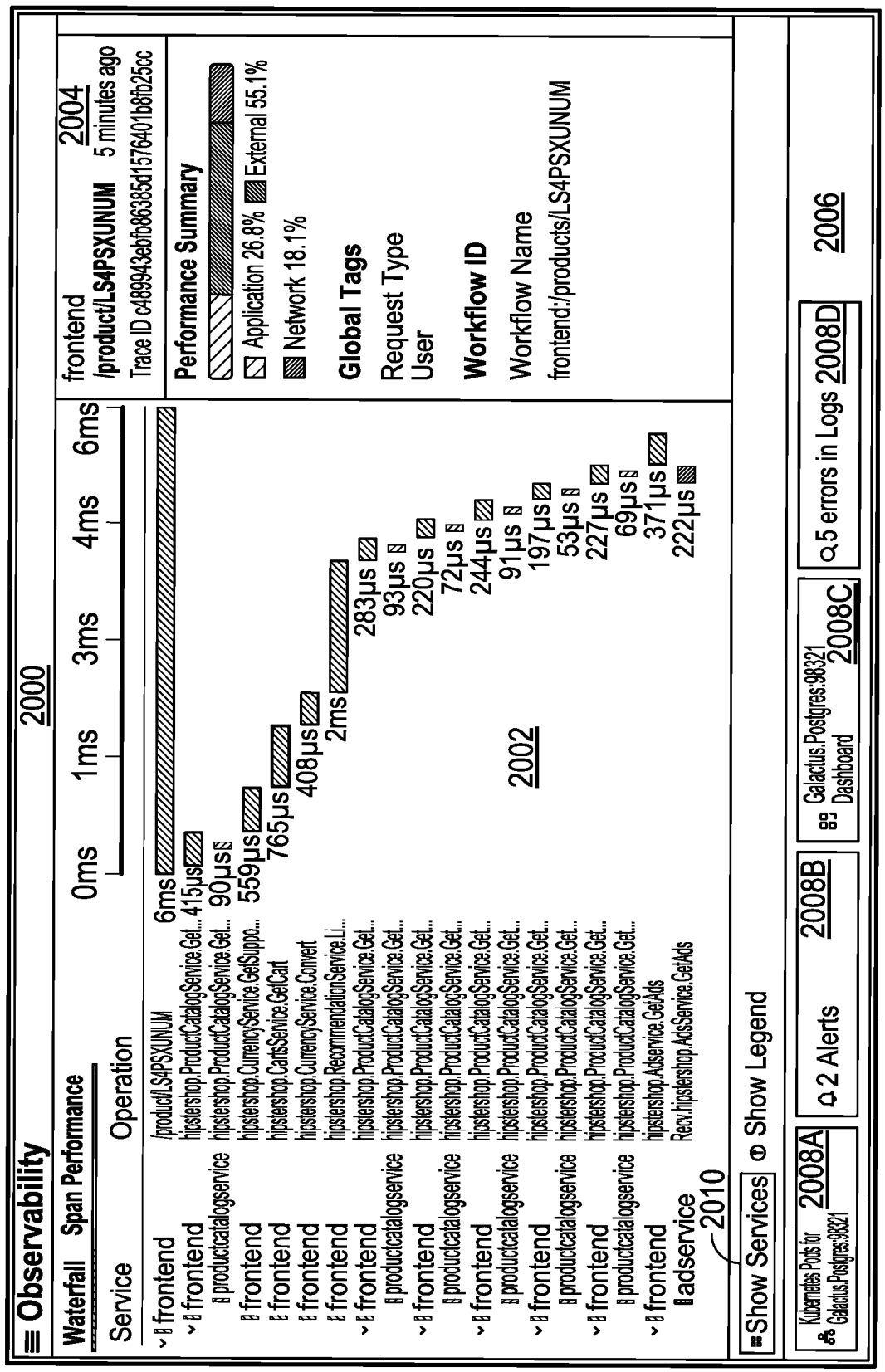
FIGS. 20A, 20B, 20C, and 20D illustrate examples of GUIs that display content generated by different content generators or content generated from different types of data entries.

FIG. 20A illustrates an example of a GUI 2000 that includes trace/span-related content. The GUI 2000 includes a display area 2002, a summary information area 2004, and a related content area 2006 (described in greater detail below).

The display area 2002 can provide graphical information about a selected trace (trace ID: c489943ebfb8685d1576401b8fb25cc) and the spans of the selected trace. In the illustrated example of FIG. 20A, the display area 2002 identifies different spans of the selected trace, and the services and operations associated with the different spans. The display area 2002 also identifies the duration of individual spans of the trace, and the duration of the trace as a whole.

The summary information area 2004 includes performance summary information about the selected trace, such as the trace ID, performance percentages, etc.

As described herein, the information in the display area 2002 and summary information area 2004 can be generated by a trace content generator 350. To generate the content, the trace content generator 350 can obtain various trace data entries (including trace data entries with span data) and group them by trace ID. The trace content generator 350 can then generate the content for the display area 2002 and summary information area 2004 based on the underlying trace data. In the illustrated example, the GUI 2000 includes information about a single trace and its underlying spans, however, it will be understood that the trace content generator 350 can generate and display information about multiple traces, spans, etc.

Figure 20B:
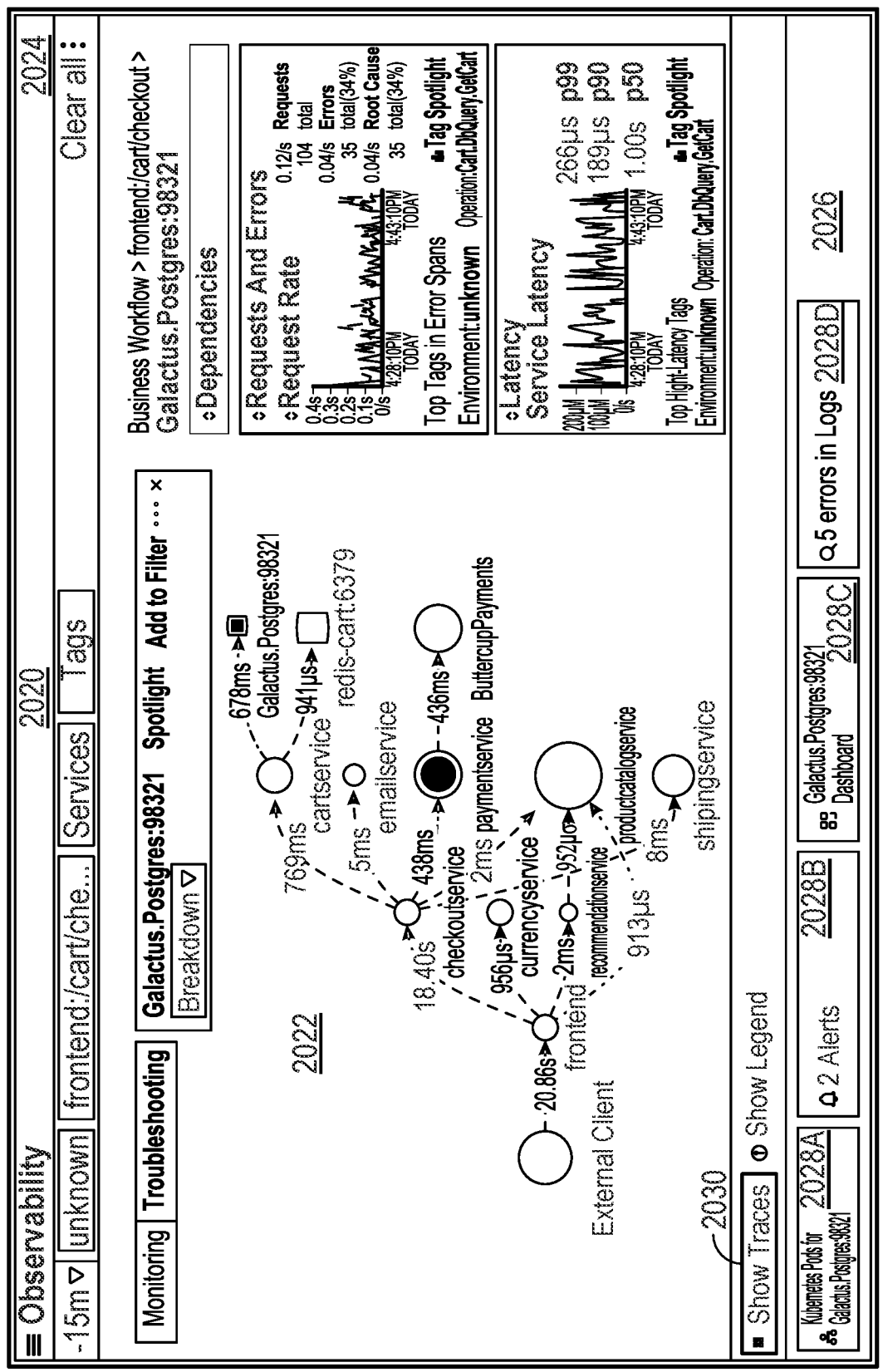

FIG. 20B illustrates an example of a GUI 2020 that includes services-related content. The GUI 2020 includes a display area 2022, summary information area 2024, and related content area 2026 (described in greater detail below).

The display area 2022 provides graphical information about various services or microservices executing within a distributed system. In the illustrated example, the display area 2022 identifies various services of the system and shows potential pathways between the services as well as the amount of time spent in different services. In the illustrated example, two services (Galatcus.Postgres:98321 and paymentservice) are highlighted indicating potential underlying issues.

The summary information area 2024 includes summary information about a selected microservice (Galatcus.Postgres:98321). In the illustrated example, the summary information includes information about requests and errors within the selected service and latency associated with the selected service.

The information in the display area 2022 and summary information area 2024 can be generated by a services content generator 350 and/or the trace content generator 350. To generate the information for the display area 2022 and/or for the summary information area 2024, the relevant content generator 350 can obtain various trace data entries (including trace data entries with span data) and group them by trace ID and/or services ID. The trace data entries can include information about the services associated with the trace. Using the information about different services obtained from the trace data, the relevant content generator 350 can determine services of the system, pathways between the services, and timing information about the services. For example, using the different services identifiers in the different traces, the relevant content generator 350 can identify the services associated with the different traces and using the different spans can determine how the different services are traversed. The relevant content generator 350 can use the determined information to generate the content for the GUI 2020.

Figure 20C:
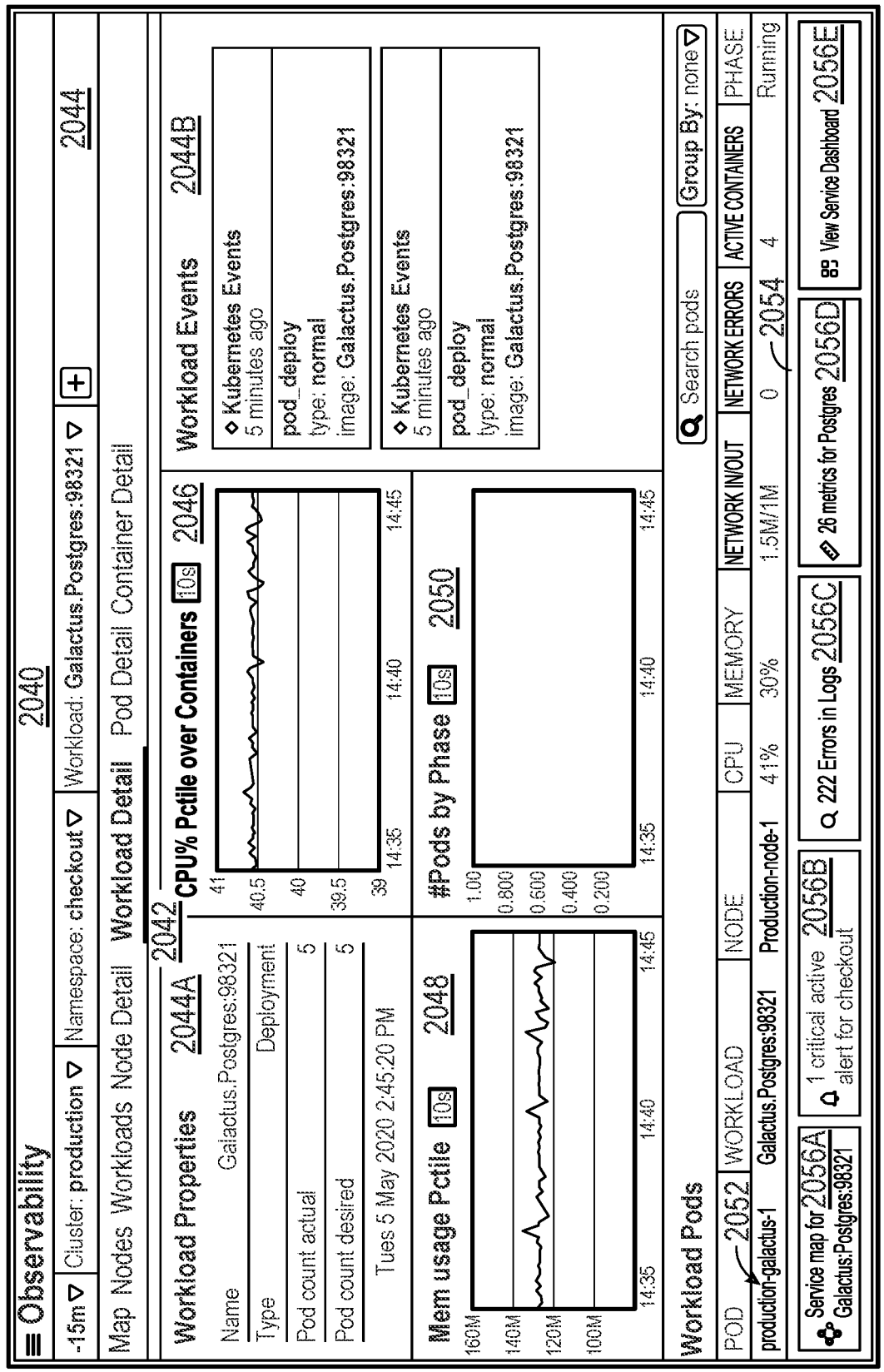

FIG. 20C illustrates an example of a GUI 2040 that includes metrics-related content. The GUI 2040 includes a display area 2042, a summary information area 2052, and a related content area 2054 (described in greater detail below).

The display area 2042 provides graphical information about various metrics of a selected entity or host device, such as summary information 2044A and 2044B (e.g., service implemented on the entity, number of pods or groups of isolated execution environments instantiated and/or desired, related events that include information about the entity or isolated execution environments, such as what image was used and when a pod was deployed on a host device, etc.), CPU usage of the instantiated isolated execution environments 2046, memory usage of the host 2048, pods or group of isolated execution environments by phase 2050.

The additional summary information area 2052 includes information about individual pods or groups of isolated execution environments instantiated on an entity or host device. The summary information can include the name of the pod or group of isolated execution environments, workload name, node name, CPU usage, memory, network information, containers or isolated execution environments within the pod, etc.

The information in the display area 2042 and summary information area 2052 can be generated by a metrics content generator 350. To generate the information for the display area 2042 and/or summary information area 2052, the metrics content generator 350 can obtain various metrics data entries or metric events and group them based on a related entity identifier (e.g., host ID, pod ID, container ID, etc.) and a type of the metric (e.g., CPU, memory, number of pod or containers, etc.). Metrics of the same type and associated with the same entity identifier can be grouped together to provide the information in the display area 2042 and/or summary information area 2052. Using the different groups, the metrics content generator 350 can generate the summaries and display objects for the GUI 2040 based on the underlying metrics data. In some cases, the summary information 2044B can be generated by a log content generator 350 and communicated to the metrics content generator 350 for inclusion in the GUI 2040.

Figure 20D:
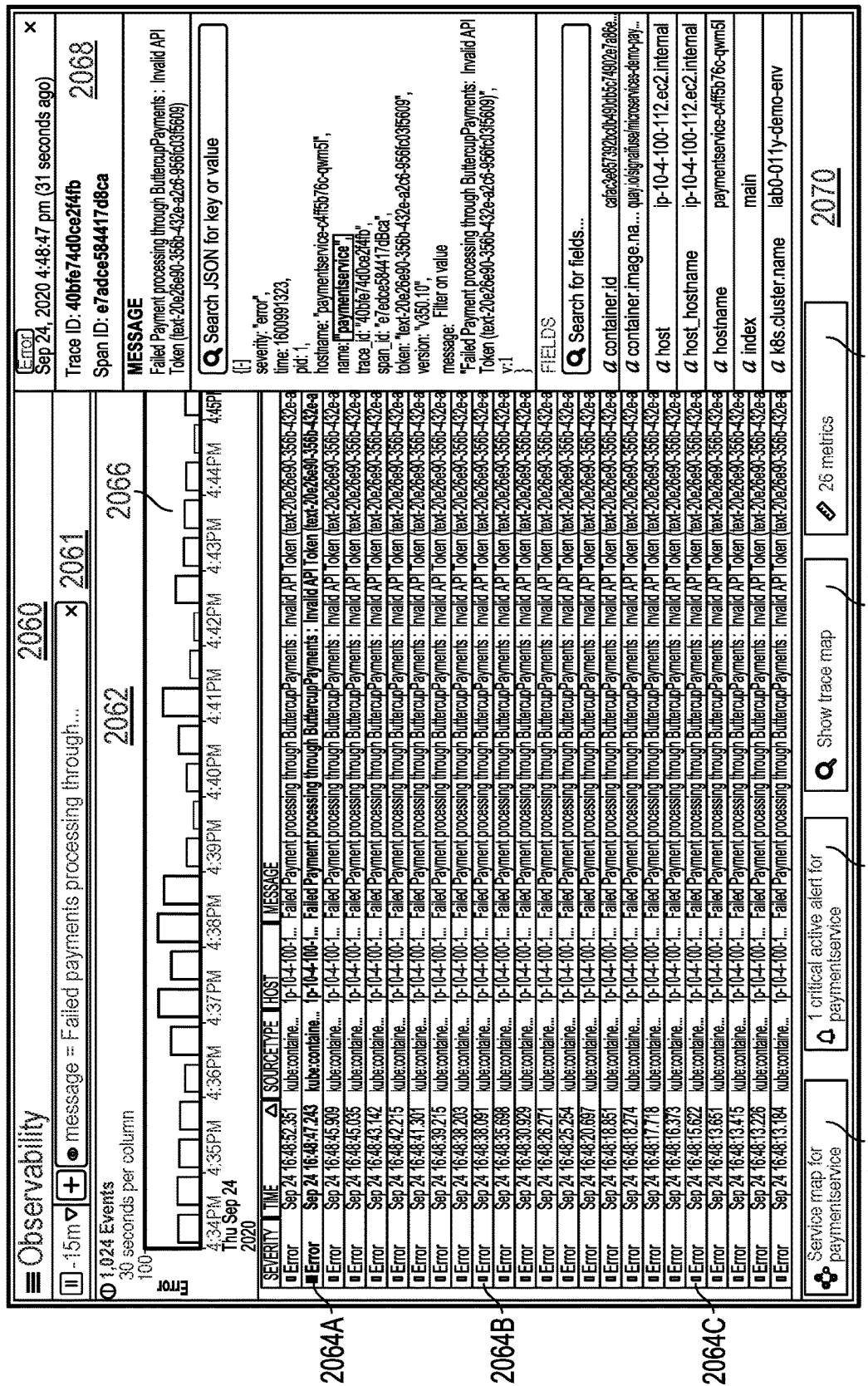

FIG. 20D illustrates an example of a GUI 2060 that includes log-related content. The GUI 2060 includes a display area 2062, a summary information area 2068, and a related content area 2070 (described in greater detail below). The GUI 2060 can also include an applied filter criteria area 2061 that displays filter criteria that has been applied to the data. In some cases, the data displayed in the display area 2062 satisfies the filter criteria displayed in the applied filter criteria area 2061.

The display area 2062 provides graphical information about various log entries or log data entries received and/or processed by the monitoring service 306. In some cases, the log data entries can be associated with metadata that provide or enriches the data in the log data entry. For example, metadata associated with a log data entry may indicate a source of the log data, the host from which the log data came from, or the sourcetype of the log data. As described herein, in some cases, the collector 304 can enrich the log data with metadata regarding traces, services, spans, and/or metrics associated with a log data entry.

The log data entries can include machine-generated data that may be unstructured. The machine-generated data in the log data entries can include a wide variety of types of information. To extract data from the log data entries, the monitoring service 306 and/or data intake and query system 326 can, in certain cases, apply one or more regex rules to the data in the log data entries. The extracted information can be used as field, field values, and/or keywords. In some cases, information regarding traces, hosts, spans, or entities can be extracted from unstructured raw machine data of a log data entry and/or obtained from metadata associated with the log data entry. As described herein, in some cases, this information can be extracted or at least partially extracted by the monitoring service 306 and/or the data intake and query system 326.

The display area 2062 can include information about individual log data entries and/or information about groups of log data entries. In the illustrated example, the display area 2062 includes various log data entries (including, e.g., log data entries 2064A, 2064B, 2064C) and information about those log data entries (error severity, timestamp, sourcetype, host, message or machine-generated data, etc.). The display area 2062 also includes a time bar graph 2066 showing collective information about multiple log data entries. In the illustrated example, the log data entries 2064 satisfy the filter criteria "message=Failed payments processing through ButtercupPayments" displayed in the applied filter criteria area 2061.

The summary information area 2068 includes information regarding a selected log data entry 2064A. The summary information area 2068 can include information about the log data entry 2064A and the machine-generated data within the log data entry. In the illustrated example, the summary information area 2068 identifies a trace (40bfe74d0ce2f4fvb) and span (e7adce584417d8ca) associated with the log data entry 2064A, and other information (e.g., severity, time, pid, hostname, name, token, software version, message), etc. As mentioned, the displayed information corresponds to metadata associated with the log data entry 2064A or to data extracted from the log data entry by the monitoring service 306 or some other system, such as the data intake and query system 326.

The information in the display area 2062 and summary information area 2068 can be generated by a log content generator 350. To generate the information for the display area 2062 and/or summary information area 2068, the log content generator 350 can obtain various log data entries and display them in a variety of ways (e.g., based on time, or other criteria). In addition, based on filter criteria, the log data entries can be filtered, and log data entries that satisfy the filter criteria can be displayed. In the illustrated example, logs that satisfy the log filter criteria "Failed payment processing through ButtercupPayments" are displayed in the display area 2062. In some cases, the log content generator 350 can obtain the log data entries from another system, such as the data intake and query system 326.

While helpful individually, collectively the combination and correlation of logs, traces, and metrics can significantly improve the effectiveness of a distributed system and the identification and resolution of computer and distributed system problems and errors. Notwithstanding the synergistic effect of correlating logs with traces and metrics, it can be difficult, if not impossible for a user to associate or map the various relationships between the different types of data given the number of entities or sources in a distributed system, the amount of data generated by the various entities and sources, the complexities associated with the different types of data, the lack of structure or similarity between the different types of data, and the complexities of the underlying system that gives rise to the different types of data. For example, while a user may be able to identify there is a problem using metrics, it may be difficult or impossible for the user alone to determine how the identified problems correlate or are associated with relevant logs and/or traces, let alone do so in real-time or within a reasonable time period in order to take appropriate action.

To improve the correlation between different types of data entries, the monitoring service 306 can auto-determine relationships between the different types of data and generated content. In addition, as a user interacts with one type of data, the monitoring service 306 can automatically determine relationships between the data being reviewed and content related to other types of machine-generated data. In addition, the monitoring service 306 can dynamically link different types of machine-generated data and content generated from those different types of machine-generated data. The monitoring service 306 can provide suggestions and/or links to a user to enable the user to understand the relationships between the different types of data and effectively navigate between the different types of data to identify root causes of failures in a distributed system.

To aid in the understanding and correlation of the different types of machine data, the monitoring service 306 can automatically, without human intervention, determine associations between different types of machine data, generate content for the different types of machine data, and provide suggestions for the related content to the user via one or more GUIs, such as the GUIs 2000, 2020, 2040, and 2060.

In light of the description herein, it will be understood that the embodiments disclosed herein substantially improve the usefulness and efficiency of distributed computing systems. Specifically, the embodiments disclosed herein enable a system to automatically determine relationships and correlate different types of machine-generated data generated or processed by different types of content generators 350, and provide suggestions to a user based on the determined relationships and correlations. The ability to autonomously determine relationships and correlations between different types of machine-generated data enable the underlying system to more efficiently identify system errors and provide a user with actionable data using fewer computing resources. Specifically, the dynamically determined relationships, correlations, and corresponding display objects can provide a user with real-time information regarding errors and other systemic issues in a distributed processing system in a focused manner without the user having to generate unnecessary queries that can tax the compute resources of the distributed system. Thus, the presently disclosed embodiments represent an improvement in the functioning of distributed systems. Moreover, the presently disclosed embodiments address technical problems inherent within distributed processing systems and shared computing resource environments; specifically, how to associate and correlate related content generated from disparate data types and found within seemingly infinite quantities of data generated or processed by a distributed system. These technical problems are addressed by the various technical solutions described herein, including the dynamic identification of entity identifiers and types of entities, and dynamic identification of related content generated by different content generators 350. Thus, the present application represents a substantial improvement on existing distributed systems in general. Further, the improvements described herein improve GUI interfaces by providing a more seamless transition between GUIs that include data generated from different data types.

As described with reference to FIGS. 20A-20D, the GUIs 2000, 2020, 2040, and 2060 can include related content areas 2006, 2026, 2054, and 2070, respectively, with various display objects that provide access to related content generated by different content generators 350. As described herein, the related content can be useful in understanding the architecture of a distributed and/or microservice system, its services, identifying issues and errors within the system, and more efficiently using a query system to identify the errors within the monitored system. As the user interacts with the content of one GUI, the monitoring service 306 can identify related content generated by other content generators 2050, and provide the user access to the automatically generated content in real-time.

Returning to FIG. 20A, the related content area 2006 identifies related content generated by other content generators 350 and/or generated based on different types of machine data. The identified related content is identified as being related to or associated with at least a portion of the content displayed in the GUI 2000. For example, the related content area 2006 can identify content generated by a metrics content generator 350, log content generator 350, or a service content generator 350, that is associated with the trace c489943ebfb8685d1576401b8fb25cc.

In the illustrated example, the related content area 2006 includes four display objects 2008A, 2008B, 2008C, 2008D, generated by one or more content generators 350. In some cases, interacting with (e.g., clicking, hovering, or otherwise selecting) one of the display objects 2008A, 2008B, 2008C, 2008D can take the user to a different GUI. For example, interacting with display object 2008A can take the user to GUI 2040 and interacting with display object 2008D can take the user to the GUI 2060. Interacting with display object 2008B can take the user to a different (not shown) GUI that includes content generated by multiple content generators 350 and/or can cause one or more alerts to be displayed on the GUI 2000. In addition, interacting with display object 2010 can take the user to GUI 2020.

The display object 2008A can include a link to information about a pod associated with the trace shown in the GUI 2000. For example, the linked information can include metrics data regarding the pod, containers, or host device within which the trace "c489943ebfb8685d1576401b8fb25cc" or spans were executed. In some cases, the content associated with the display object 2008A can be generated by a metrics content generator 350 and/or be based on metrics data entries or metrics events. As mentioned, interacting with the display object 2008A can, in some cases, take the user to a different GUI, such as the GUI 2040.

The display object 2008B can include a link to information about alerts associated with the trace shown in the GUI 2000. In some cases, the content associated with the display object 2008B can be generated by any one or any combination of the trace content generator 350, metrics content generator 350, services content generator 350, or log content generator 350 and/or be based on metrics data entries or metrics events, log data entries or events, or trace data entries. Interacting with the display object 2008B can, in some cases, take the user to a different GUI that displays alert information associated with the trace c489943ebfb8685d1576401b8fb25cc.

The display object 2008C can include a link to information about a service (Galactus.Postrgres:98321) associated with the trace c489943ebfb8685d1576401b8fb25cc. In some cases, the content associated with the display object 2008C can be generated by multiple content generators 350 to provide an overview or dashboard of the service based on different types of data entries. For example, the dashboard can include certain metrics associated with a pod on which the service is executing, traces or spans that use the service, and/or logs that identify the service. As mentioned, interacting with display object 2008C can, in some cases, take the user to a different GUI that includes the content generated by multiple content generators 350.

The display object 2008D can include a link to information about logs associated with the trace shown in the GUI 2000. In some cases, the content associated with the display object 2008D can be generated by a log content generator 350 and/or be based on log data entries. For example, the linked information can include logs data entries that include the trace ID "c489943ebfb8685d1576401b8fb25cc" or have metadata that identifies the trace ID. As mentioned, interacting with the display object 2008D can, in some cases, take the user to a different GUI, such as the GUI 2060.

The display object 2010 can include a link to information about a service associated with the trace shown in the GUI 2000. In some cases, the content associated with the display object 2010 can be generated by the trace content generator 350 and/or be based on trace data entries. For example, the spans or trace data entries can include information about associated services. The trace content generator 350 can collect the various trace data entries and use the information about the related services to generate content for the service "Galactus.Postrgres:98321." As mentioned, interacting with display object 2010 can, in some cases, take the user to a different GUI, such as the GUI 2020.

Returning to FIG. 20B, the related content area 2026 includes display objects 2028A-2028C linked to content generated by other content generators 350, content generated by multiple content generators 350, or content generated from different types of data entries (or machine data).

The display object 2028A can include a link to information about a pod associated with the selected service (Galactus.Postrgres:98321), including metrics data regarding the pod, containers, or host device one which the service operates or spans is provided. In some cases, the content associated with the display object 2028A can be generated by a metrics content generator 350 and/or be based on metrics data entries or metrics events. As mentioned, interacting with display object 2028A can, in some cases, take the user to a different GUI, such as the GUI 2040.

In like manner, the display object 2028B can include a link to information about alerts associated with the selected service (Galactus.Postrgres:98321). The display object 2028C can include a link to information about the selected service that is generated by multiple content generators 350. The display object 2028D can include a link to information about logs associated with the selected service. In addition, similar to the display object 2010, the display object 2030 can include a link to information about a trace associated with the selected service, and interacting with the display object 2030 can, in some cases, take the user to the GUI 2000.

With reference to FIG. 20C, the related content area 2054 includes display objects 2048A-2048D linked to content generated by other content generators 350, content generated by multiple content generators 350, or content generated from different types of data entries.

The display object 2056A can include a link to information about a service (Galactus.Postrgres:98321) instantiated on the entity or host device associated with the metrics 2046, 2048, 2060. In some cases, the content associated with the display object 2056A can be generated by a service or trace content generator 350 and/or be based on service or trace data entries. As mentioned, interacting with the display object 2056A can, in some cases, take the user to a different GUI, such as the GUI 2020.

In like manner, the display object 2056B can include a link to information about alerts associated with the selected entity or host device and interacting with the display object 2056B can take the user to a different GUI or cause a window to appear. The display object 2056C can include a link to information about logs associated with the selected entity or host device, such as the GUI 2060. For example, the information can include logs generated on or stored by the entity or host device, or logs that identify the entity or host device as the source of the log or host from which the log was generated. The display object 2056D can include a link to information that includes various metrics associated with a service implemented on the selected entity or host device. The display object 2056E can include a link to information generated by multiple content generators 350 and that includes information about one or more services executing on the selected entity or host device.

With reference to FIG. 20D, the related content area 2070 includes display objects 2072A-2072D linked to content generated by other content generators 350, content generated by multiple content generators 350, or content generated from different types of data entries. In some cases, the GUI 2060 can display the display objects 2072A, 2072B, 2072C, 2072D in response to a selection of a log data entry. In the illustrated example, the display objects 2072A, 2072B, 2072C, 2072D are displayed in response to the selection of the log data entry 2064A.

The display object 2072A can include a link to information about a service (paymentservice) associated with the selected log entry 2064A. For example, the service can be identified in the log data entry 2065A or in metadata associated with the selected log data entry 2064A. As shown in the summary area 2068 the log data entry 2064A is related to or was generated as a result of the execution of the service "paymentservice." Based on that relationship, the display object 2068A is provided and related content generated. As described herein, interacting with the display object 2072A can, in some cases, take the user to a different GUI, such as the GUI 2020.

In like manner, the display object 2072B can include a link to information about alerts associated with the selected log data entry and interacting with the display object 2072B can take the user to a different GUI or cause a window to appear showing the related alerts.

The display object 2072C can include a link to information about traces associated with the selected log data entry. For example, the trace ID "40bfe74d0ce2f4fvb" is shown in the summary information area 2068 indicating that it is included in the log data entry 2064A or included in metadata associated with the log data entry 2064A. Based on that relationship, the display object 2072C is provided and related content generated (or made available). As described herein, interacting with the display object 2072C can, in some cases, take the user to a different GUI, such as the GUI 2000.

The display object 2072D can include a link to information that includes various metrics associated with the log data entry 2064A, and interacting with the display object 2072D can take the user to a different GUI or cause a window to appear showing the related metrics. In some cases, selecting the display object 2072D can take the user to a different GUI, such as the GUI 2040.

To facilitate understanding of the display objects in the related content areas, consider the GUI 2060, which displays log data entries in the display area 2062. When a user selects a particular log data entry (e.g., log data entry 2064A), the monitoring service 306 can display information about the selected log data entry 2064 in the summary information area 2068. In addition, the monitoring service 306 can parse the data in the log data entry to identify an entity related to the log data entry, such as a pod name, container name, trace identifier, service name, etc. The entity may be the entity that generated the log data, for which the log data was generated. The monitoring service 306 can then determine a type of the entity, such as a pod, container, trace, service, etc. Based on the determined type, the monitoring service 306 can communicate with one or more content generators 350. For example, if the entity type is a pod or container, the monitoring service 306 can communicate with the metrics content generator 350. If the entity type is a service or trace, the monitoring service 306 can communicate with the trace content generator 350 or service content generator 350.

As the monitoring service 306 communicates with the various content generators 350, it can determine if the content generators 350 have information relating to the identified entity. For example, the monitoring service 306 can communicate the service name "paymentservice" to the services content generator 350 (or trace content generator 350) and query whether it has any trace or span data associated with the "paymentservice" service. Similarly, the monitoring service 306 can communicate the trace identifier "40bfe74d0ce2f4fvb" to the trace content generator 350 to determine if the trace content generator 350 has any information about the trace ID "40bfe74d0ce2f4fvb."

Based on the results, the monitoring service 306 can generate various display objects that indicate that additional information or content is available for the selected data entry. In the illustrated example of FIG. 20D, the monitoring service 306 can, upon consulting with a trace content generator 350 and metrics content generator 350, determine that the content generators 350 include data associated with the selected log data entry 2064A and have generated or can generate additional content related to the log data entry 2064A using data entries of a different type (e.g., using trace data entries, span data entries, metrics data entries, etc.).

Based on this determination, the monitoring service 306 adds the display objects 2072A-2072D to the related content area 2070 of the GUI 2060.

As shown and described with reference to FIGS. 20A-20D, the monitoring service can identify a source of a data entry (or entity associated with the data entry), determine a type of the source (or entity), identify content generators 350 that may generate content for that type of source (or entity), communicate with the identified content generators 350 to determine if they have content related to the identified source (or entity), and, if so, make the generated content available to the user via one or more display objects.

As described herein, the monitoring service 306 can perform these functions regardless of the type of data being displayed or the associated GUI. For example, despite the differences between the GUIs 2000, 2020, 2040, and 2060, and the content generators 350 that generated the data for those GUIs, the monitoring service 306 can include a related content area at the bottom of each indicating identified relationships between the different types of machine data.

In some cases, the monitoring service 306 can communicate with the different content generators 350 concurrently or simultaneously. For example, if the initial data entry is a log data entry and the monitoring service identifies trace and metrics data from the log data entry, the monitoring service 306 can concurrently communicate with a trace content generator 350 and a metrics content generator 350 to identify potentially related data or content.

In certain cases, the monitoring service 306 can communicate with the different content generators 350 sequentially. With continued reference to the example above, the monitoring service 306 may first communicate with the trace content generator 350 and thereafter communicate with the metrics content generator 350. When communicating with the metrics content generator 350, the monitoring service 306 may use information obtained from the trace content generator 350 to more effectively identify related content generated by the metrics content generator 350 (e.g., the monitoring service 306 may use data obtained from the initial data entry and data obtained from a second content generator to identify related data and content from a third content generator).

As another example, if the initial data is trace data, the monitoring service 306 may first communicate with a log content generator 350 to determine if there is any log data associated with the trace data. If there is, the monitoring service 306 may parse the related log data to determine if there is any metrics data associated with the log data (and therefore associated with the trace data). If so, the monitoring service 306 can interact with the metrics content generator 350 to determine if there are any metrics associated with the (initial) trace data and/or the identified log data. In a similar fashion, if the underlying data is metrics data, the monitoring service 306 may first interact with a trace content generator 350, and use data from the trace content generator 350 (e.g., a trace ID) to identify related log data, etc. In addition, as the monitoring service 306 interacts with the various content generators 350 it can determine if there are alerts or other content related to the underlying data. In some such cases, the monitoring service 306 can recursively identify different data entries from different content generators 350 to identify data and content associated with a selected data entry.

6.2. Related Content Flow

Figure 21:
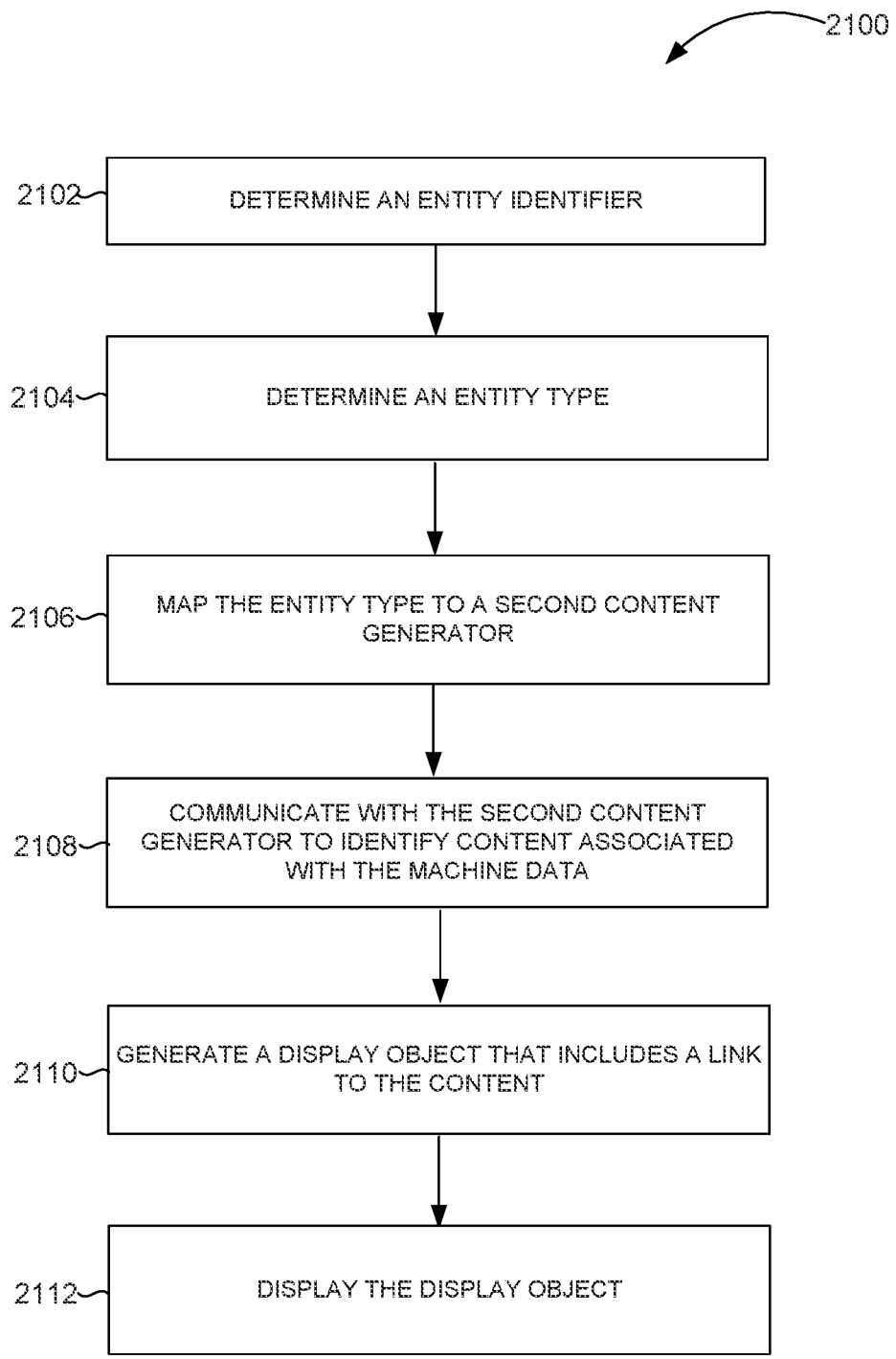
FIG. 21 is a flow diagram illustrative of an embodiment of a routine implemented by a computing device to dynamically link data associated with a first content generator with content generated by a second content generator and provide a link to the content generated by the second content generator to a GUI.

FIG. 21 is a flow diagram illustrative of an embodiment of a routine 2100, implemented by a computing device to dynamically link data associated with a first content generator 350 with content generated by a second content generator 350 (or to content generated using a different type of machine-generated data) and provide access to the additional content via a GUI. Although described as being implemented by the monitoring service 306, it will be understood that the elements outlined for routine 2100 can be implemented by any one or a combination of computing devices/components that are associated with the various systems and components described herein, such as the instrumentation analysis system 322 and/or the query engine and reporting system 324. Thus, the following illustrative embodiment should not be construed as limiting.

At block 2102, the monitoring service 306 determines an entity identifier associated with machine-generated data. The machine-generated data can include log data, trace data, metrics data or other types of machine-generated data. In some cases, the machine-generated data is structured as field-value pairs or tuples. In certain cases, the machine-generated data is raw machine data or unstructured raw machine data that has no easily identifiable format or structure.

In some cases, the machine-generated data or content generated therefrom can be displayed on a graphical user interface. The content can be generated by a content generator configured to generate content using one or more types of machine-generated data. For example, if the machine-generated data is log data, the log data can be included on a graphical user interface that includes content generated by a log content generator.

In certain cases, the monitoring service 306 determines the entity identifier based on an interaction with the machine-generated data. For example, a user may click on, select, or otherwise interact with machine-generated data displayed on a user interface or with content generated from the machine-generated data. Based on the interaction with the machine-generated data (or corresponding display object), the monitoring service 306 can determine an entity identifier associated with the machine-generated data. In some cases, this interaction may include clicking on a log data entry, metrics data entry, or trace data entry, selecting a particular span or trace from a GUI, or selecting a particular metric displayed in a GUI.

In some cases, the entity identifier can be determined based on the type of machine-generated data and/or structure (or lack thereof) of the machine-generated data. For example, if the machine-generated data is unstructured or raw machine data, the monitoring service 306 can use one or more regex rules to extract the entity identifier from the machine-generated data. The regex rules may define how to parse the raw machine data to identify information therein. For example, the monitoring service 306 can use a regex rule that defines how to extract a pod name from raw machine data to extract the name of the pod associated with the raw machine data.

If the machine-generated data is structured, such as being in the form of rows and columns with field-value pairs or tuples, the monitoring service 306 can review the data to determine the entity identifier associated with the machine-generated data. For example, the monitoring service 306 may review the field names to identify a pod name, host name, trace identifier, etc. In certain cases, the machine-generated data may have metadata associated with it. In some such cases, the monitoring service 306 can review the metadata to determine the entity identifier. For example, if the machine-generated data is raw machine data, it may have metadata that identifies the host, source, or sourcetype of the data.

In some cases, the entity identifier can be a pod name/identifier, isolated execution environment identifier, container name/identifier, host name/identifier, cluster name/identifier, virtual machine name, span identifier, trace identifier, etc. The entity identifier may indicate the identity of the entity that generated the machine-generated data or was the reason the machine-generated data was generated, etc.

In some cases, the monitoring service 306 can identify multiple entity identifiers from the machine-generated data. In certain cases, the monitoring service 306 may apply multiple regex rules to raw machine data (e.g., based on a determination that multiple regex rules are relevant) or identify multiple entity identifiers in the metadata or other data of a data entry. For example, raw machine data may include a pod name, trace identifier, and container name, or a metric data entry may identify a pod, container, and node that corresponds to the metric.

At block 2104, the monitoring service 306 determines an entity type for the entity identifier. In some cases, the monitoring service 306 can determine the entity type based on the name of the entity identifier and/or a field associated with the entity identifier. For example, if the field name for the entity identifier is pod_name, the monitoring service 306 can determine that the entity type is a pod. Similarly, if a regex rule indicates that it is used for extracting a trace_id from raw machine data, the monitoring service 306 can determine that the entity type is a trace. In some cases, the monitoring service 306 can determine the entity type as one of an isolated execution, such as a software container or virtual machine, pod, service, host, node, trace, span, namespace, etc. In some cases, such as when there are multiple entity identifiers, the monitoring service 306 can determine the entity type for each entity identifier.

At block 2106, the monitoring service 306 maps the entity type to a second content generator 350. In some cases, the monitoring service 306 identifies content generators 350 that generate content associated with the identified entity type. For example, if the entity type is a pod, host, container, or node, the monitoring service 306 can identify a metrics content generator 350 that generates content based on metrics associated with pods, hosts, containers, and nodes. In certain cases, if the entity type is a trace, span, or service, the monitoring service 306 can identify a trace content generator 350 that generates data associated with traces. In some cases, such as where one content generator generates content from different types of machine-generated data, the monitoring service can map the entity type to different content using the type of machine-generated data identified by the entity type.

In some cases, the monitoring service 306 can identify multiple content generators 350 that generate data (or multiples types of content) associated with a particular entity type. For example, the monitoring service 306 can determine that a log content generator 350 and metrics content generator 350 generate content associated with traces. Specifically, the log content generator 350 may generate content based on logs that include trace identifiers and the metrics content identifier may generate content based on metrics associated with different traces.

In certain cases, such as when multiple entity identifiers and entity types are identified, the monitoring service 306 can identify one or more content generators 350 for each entity type and/or entity identifier. For example, if the monitoring service 306 identified trace data and metrics data from a log data entry, the monitoring service 306 may identify one or more content generators 350 for the trace data and one or more content identifiers for the metrics data (or content generated using the trace data and/or metrics data).

At block 2108, the monitoring service 306 communicates with the second content generator 350 to identify related content. The second content generator 350 can, based on the communication, identify content related to the machine-generated data. In some cases, the monitoring service 306 communicates the entity identifier to the second content generator 350. Using the entity identifier, the second content generator 350 determines if it has machine-generated data that includes the entity identifier or is associated with the entity identifier.

In certain cases, the data that is searched and the method of searching can be based on the type of content generator 350 and the entity type. For example, if the entity identifier is a container name, pod name, service name, namespace name, span identifier, trace identifier, etc., and the second content generator 350 is a log content generator 350, the log content generator 350 can determine if there are any log data entries that include the entity identifier. As part of this, the log content generator 350 may send a query to another system, such as the data intake and query system 326, requesting any log data entries or events that include the given entity identifier. The data intake and query system 326 can respond to the query with the relevant log data entries (if any). In some cases, the log content generator 350 can query a local database rather than querying a separate system to identify relevant log data entries that include the entity identifier. Non-limiting examples of query execution by the data intake and query system 326 are described in U.S. application Ser. No. 16/777,612, entitled GENERATING A MODIFIED COMPONENT FOR A DATA INTAKE AND QUERY SYSTEM USING AN ISOLATED EXECUTION ENVIRONMENT IMAGE, and Ser. No. 16/945,646, entitled INGESTION NODES IN A DATA INTAKE AND QUERY SYSTEM, each of which is incorporated herein by reference for all purposes.

Similarly, if the second content generator 350 is a trace content generator 350 or metrics content generator 350, the trace content generator 350 or metrics content generator 350 can determine if there are any trace data entries or metrics data entries, respectively, that include the entity identifier. In some cases, the trace content generator 350 or metrics content generator 350 may review a local database or query a remote database that is part of a distinct system.

As mentioned, in some cases, multiple content generators 350 may have relevant data. In some such cases, each queried content generator 350 can determine whether it has machine-generated data that includes or is associated with the entity identifier.

In the event the second content generator 350 includes machine-generated data related to the entity identifier, it can access or generate content associated with the entity identifier. For example, if the second content generator 350 is a trace content generator 350 and it identifies trace data entries that match or include a trace identifier received from a log content generator 350, the trace content generator 350 can generate (or provide access to) content, such as a trace map (e.g., as shown in FIG. 20A) or services map (e.g., as shown in FIG. 20B), using the trace data entries that include the trace identifier received from the log content generator 350 Similarly, the metrics content generator 350 and log content generator 350 can generate (or provide access to) content, such as a metrics display (e.g., shown in FIG. 20C) or logs display (e.g., shown in FIG. 20D), respectively, using the data entries that include or are associated with the entity identifier received from the monitoring service 306.

In certain cases, one content generator 350 can generate multiple content or GUIs based on the machine data related to the entity identifier. For example, the trace content generator 350 may be able to generate different GUIs or content based on the related machine-generated data. In some cases, the trace content generator 350 can generate trace-related content and/or service-related content based on the identification of trace data entries associated with an entity identifier.

At block 2110, the monitoring service 306 generates a display object. The display object can include a link to the additional content, or content generated by a different content generator 350. In some cases, the monitoring service 306 can generate multiple display objects. For example, if multiple content generators 350 include content associated with the entity identifier (or initial machine data) or if one content generator 350 generates or includes multiple content pages or GUIs associated with the entity identifier, the monitoring service 306 can generate a display object or each content or content page.

At block 2112, the monitoring service 306 displays the display object. In some cases, the monitoring service 306 displays the display object on a GUI. In certain cases, the GUI is the same GUI used to interact with the machine-generated data. For example, the GUI may include the machine-generated data, and following the interaction with the machine-generated data, and communication with other content generators 350, the monitoring service 306 may include the generated display object(s) on the GUI. In this way, the monitoring service 306 can automatically provide suggestions and correlation information to the user to facilitate the understanding of the underlying system, detect and address failures, and improve the efficiency and effectiveness of the system.

In certain cases, such as when there are multiple display objects, the monitoring service 306 can sort the display objects in a particular order. The order can be based on the size or amount of content associated with a particular display object, time taken to generate the display object, name of the content generator 350 associated with the display object, user preference, etc.

It will be understood that the blocks described herein with reference to routine 2100 can be reordered or and/or performed concurrently. For example, blocks 2102 and 2104 can be performed together, concurrently, or in any order. In certain cases, the monitoring service 306 can communicate with multiple content generators 350 concurrently, generate multiple display objects concurrently, and/or display the display objects concurrently.

In addition, fewer, more, or different blocks can be used as part of the routine 2100. In some cases, one or more blocks can be omitted. In certain cases, the routine 2100 can include the generation of content by the second content generator 350 (or a third content generator 350 as the case may be). In some cases, the system can use one content generator to generate content for the different types of data. In some such cases, rather than identifying different content generators that generate content associated with an entity type, the monitoring service 306 can identify the different content or underlying machine-generated data used to generate the different content. Based on the identification, the content generator can generate the different content and/or provide access to it.

7.0. Terminology

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method, comprising:
   identifying an entity associated with machine-generated data based on a determined interaction with a first display object that corresponds to the machine-generated data, wherein the first display object is generated by a first content generator;
   determining an entity type for the entity;
   identifying a second content generator based on the determined entity type for the entity, wherein the second content generator is configured to generate content associated with the entity type;
   identifying first content of the content generated by the second content generator, wherein the first content is associated with the machine-generated data;
   generating a second display object that includes a link to the first content associated with the machine-generated data; and
   causing display of the second display object.

2. The method of claim 1, wherein the determined interaction includes a selection of the first display object on a graphical user interface.

3. The method of claim 1, wherein the entity is an isolated execution environment executing in a shared computing resource environment, and wherein the entity type for the entity is determined to be an isolated execution environment type.

4. The method of claim 1, wherein the entity type for the entity is determined to be at least one of: a software container, pod, service, trace, or span.

5. The method of claim 1, wherein the machine-generated data is first machine-generated data of a first type, and wherein the first content associated with the first machine-generated data is generated based on second machine-generated data of a second type.

6. The method of claim 1, wherein the machine-generated data is first machine-generated data, wherein identifying the first content comprises identifying, via the second content generator, an entity identifier in second machine-generated data that corresponds to an entity identifier in the first machine-generated data, and wherein the first content is generated by the second content generator using the second machine-generated data.

7. The method of claim 1, wherein the machine-generated data is first machine-generated data,
   wherein identifying the first content comprises identifying, via the second content generator, an entity identifier in second machine-generated data that corresponds to an entity identifier in the first machine-generated data,
   wherein the first content is generated by the second content generator using the second machine-generated data,
   wherein the first content generator is a log content generator configured to generate content using log data for display with the first display object, the log data comprising raw machine data, and
   wherein the entity identifier in the first machine-generated data is extracted from the raw machine data using a regular expression rule.

8. The method of claim 1, wherein the machine-generated data is first machine-generated data,
   wherein identifying the first content comprises identifying, via the second content generator, an entity identifier in second machine-generated data that corresponds to an entity identifier in the first machine-generated data,
   wherein the first content is generated by the second content generator using the second machine-generated data,
   wherein the first content generator is a log content generator configured to generate content using log data for display with the first display object, the log data comprising raw machine data, and
   wherein the entity identifier in the first machine-generated data is determined using metadata associated with the raw machine data.

9. The method of claim 1, wherein the first content generator is a log content generator configured to generate content using log data for display with the first display object, the log data comprising raw machine data, and wherein the second content generator is a metrics content generator configured to generate the first content using metrics data.

10. The method of claim 1, wherein the first content generator is a log content generator configured to generate content using log data for display with the first display object, the log data comprising raw machine data, and wherein the second content generator is a trace content generator configured to generate the first content using trace data.

11. The method of claim 1, wherein the link is a first link, the method further comprising:
   identifying a third content generator based on the determined entity type for the entity, wherein the third content generator is configured to generate data associated with the entity type;
   identifying second content generated by the third content generator, wherein the second content is associated with the machine-generated data;

generating a third display object that includes a second link to the second content associated with the machine-generated data; and causing display of the third display object.

12. The method of claim 1, wherein the link is a first link, the method further comprising:
identifying a third content generator based on the determined entity type for the entity, wherein the third content generator is configured to generate content associated with the entity type;
identifying second content of the content generated by the third content generator, wherein the second content is associated with the machine-generated data;
generating a third display object that includes a second link to the second content associated with the machine-generated data; and
causing display of the third display object,
wherein the first content generator is a log content generator configured to generate content using log data for display with the first display object, the log data comprising raw machine data,
wherein the second content generator is a trace content generator configured to generate the first content using trace data, and
wherein the third content generator is a metrics content generator configured to generate the second content using metrics data.

13. The method of claim 1, wherein the link is a first link, the method further comprising:
identifying second content generated by the second content generator, wherein the second content is associated with the machine-generated data;
generating a third display object that includes a second link to the second content associated with the machine-generated data; and
causing display of the third display object.

14. The method of claim 1, wherein the first content generator is a trace content generator configured to generate content using trace data for display with the first display object, and wherein the second content generator is a metrics content generator configured to generate the first content using metrics data.

15. The method of claim 1, wherein the first content generator is a trace content generator configured to generate content using trace data for display with the first display object, and wherein the second content generator is a log content generator configured to generate the first content using log data.

16. The method of claim 1, wherein the first content generator is a metrics content generator configured to generate content using metric data for display with the first display object, and wherein the second content generator is a trace content generator configured to generate the first content using trace data or a log content generator configured to generate the first content using log data.

17. Non-transitory computer-readable media having computer-executable instructions that, when executed by a computer system, cause the computer system to:
identify an entity associated with machine-generated data based on a determined interaction with a first display object that corresponds to the machine-generated data, wherein the first display object is generated by a first content generator;
determine an entity type for the entity;
identify a second content generator based on the determined entity type for the entity, wherein the second content generator is configured to generate content associated with the entity type;
identify first content of the content generated by the second content generator, wherein the first content is associated with the machine-generated data;
generate a second display object that includes a link to the first content associated with the machine-generated data; and
cause display of the second display object.

18. The non-transitory computer-readable media of claim 17, wherein the machine-generated data is first machine-generated data, wherein to identify the first content, the computer-executable instructions further cause the computer system to identify, via the second content generator, an entity identifier in second machine-generated data that corresponds to an entity identifier in the first machine-generated data, and wherein the first content is generated by the second content generator using the second machine-generated data.

19. A computer system, comprising:
one or more processing devices communicatively coupled with memory, the one or more processing devices configured to:
identify an entity associated with machine-generated data based on a determined interaction with a first display object that corresponds to the machine-generated data, wherein the first display object is generated by a first content generator;
determine an entity type for the entity;
identify a second content generator based on the determined entity type for the entity, wherein the second content generator is configured to generate content associated with the entity type;
identify first content of the content generated by the second content generator, wherein the first content is associated with the machine-generated data;
generate a second display object that includes a link to the first content associated with the machine-generated data; and
cause display of the second display object.

20. The computer system of claim 19, wherein the machine-generated data is first machine-generated data, wherein to identify the first content, the one or more processing devices are configured to identify, via the second content generator, an entity identifier in second machine-generated data that corresponds to an entity identifier in the first machine-generated data, and wherein the first content is generated by the second content generator using the second machine-generated data.

\* \* \* \* \*